(12) United States Patent
Rice et al.

(10) Patent No.: US 12,060,906 B2
(45) Date of Patent: Aug. 13, 2024

(54) PANEL FASTENER

(71) Applicant: Sky Climber Fasteners LLC, Delaware, OH (US)

(72) Inventors: Donald Wayne Rice, Ripley, NY (US); Raymond Disantis, Vinton, VA (US)

(73) Assignee: BPC LG 2, LLC, Charlotte, NC (US)

( * ) Notice: Subject to any disclaimer, the term of this patent is extended or adjusted under 35 U.S.C. 154(b) by 141 days.

(21) Appl. No.: 17/881,967

(22) Filed: Aug. 5, 2022

(65) Prior Publication Data
US 2023/0045579 A1 Feb. 9, 2023

Related U.S. Application Data

(60) Provisional application No. 63/230,102, filed on Aug. 6, 2021.

(51) Int. Cl.
*F16B 5/02* (2006.01)

(52) U.S. Cl.
CPC .......... *F16B 5/0208* (2013.01); *F16B 5/0266* (2013.01); *F16B 5/02* (2013.01)

(58) Field of Classification Search
CPC ........ F16B 5/02; F16B 5/0208; F16B 5/0266; F16B 35/00; F16B 37/04; F16B 37/14
USPC .............................. 411/337, 372.5–373, 383
See application file for complete search history.

(56) References Cited

U.S. PATENT DOCUMENTS

| | | |
|---|---|---|
| 2,878,543 A | 3/1959 | Newcomer |
| 2,967,593 A | 1/1961 | Cushman |
| 3,019,865 A | 2/1962 | Rohe |
| 3,042,156 A | 7/1962 | Rohe |
| 3,078,002 A | 2/1963 | Rodgers |
| 3,141,487 A * | 7/1964 | Boyd ............ F16B 5/0208 411/953 |
| 3,192,980 A * | 7/1965 | Sauter ............ F16B 41/002 411/964 |
| 3,197,854 A | 8/1965 | Rohe |
| 3,241,591 A | 3/1966 | Rosan |
| 3,285,311 A | 11/1966 | Cushman |
| 3,305,996 A | 2/1967 | Shapiro |
| 3,313,078 A | 4/1967 | Rohe |
| 3,339,609 A | 9/1967 | Cushman |
| 3,355,850 A | 12/1967 | Rohe |
| 3,384,142 A | 5/1968 | Phelan |
| 3,392,225 A | 7/1968 | Phelan |

(Continued)

FOREIGN PATENT DOCUMENTS

| | | |
|---|---|---|
| DE | 102011002031 | 10/2012 |
| EP | 2852765 | 2/2016 |
| JP | H1151018 A | 2/1999 |

OTHER PUBLICATIONS

International Search Report and Written Opinion of the International Searching Authority—PCT application No. PCT/US2022/039564 ; dated Oct. 31, 2022 , 10 pages.

*Primary Examiner* — Roberta S DeLisle
(74) *Attorney, Agent, or Firm* — Dawsey Co., LPA; David J. Dawsey

(57) ABSTRACT

A fastener for attachment to a panel, having an inner skin and an outer skin, via a panel aperture in the outer skin. The fastener including an insert pillar, a base plate, a spring, and a top insert arranged and configured to allow longitudinal compression of the spring resulting in movement and deflection of components to promote ease of use, security, and durability.

20 Claims, 50 Drawing Sheets

(56) References Cited

U.S. PATENT DOCUMENTS

| | | |
|---|---|---|
| 3,434,262 A | 3/1969 | Lawrence |
| 3,443,473 A | 5/1969 | Tritt |
| 3,451,181 A | 6/1969 | Neuschotz |
| 3,455,201 A | 7/1969 | Ryder |
| 3,504,723 A | 4/1970 | Cushman |
| 3,508,592 A | 4/1970 | Rosan |
| 3,526,072 A | 9/1970 | Campbell |
| 3,579,942 A | 5/1971 | Cole |
| 3,621,557 A | 11/1971 | Cushman |
| 3,662,805 A | 5/1972 | Sygnator |
| 3,678,980 A | 7/1972 | Gutshall |
| 3,716,092 A | 2/1973 | Serewicz |
| 3,771,272 A | 11/1973 | Mihaly et al. |
| 3,884,006 A | 5/1975 | Dietlein |
| 3,977,146 A | 8/1976 | Wiley |
| 4,269,106 A | 5/1981 | Leibhard et al. |
| 4,296,586 A | 10/1981 | Heurteux |
| 4,405,272 A | 9/1983 | Wollar |
| 4,428,705 A | 1/1984 | Gelhard |
| 4,717,612 A | 1/1988 | Shackelford |
| 4,729,705 A | 3/1988 | Higgins |
| 4,846,612 A | 7/1989 | Worthing |
| 4,863,326 A * | 9/1989 | Vickers ............... F16B 41/002 411/105 |
| 4,981,735 A | 1/1991 | Rickson |
| 4,984,947 A | 1/1991 | Flauraud |
| 5,074,730 A * | 12/1991 | Duran ................ F16B 5/0208 411/374 |
| 5,093,957 A | 3/1992 | Do |
| 5,147,167 A | 9/1992 | Berecz et al. |
| 5,240,543 A | 8/1993 | Fetterhoff et al. |
| 5,259,689 A | 11/1993 | Arand et al. |
| 5,542,777 A | 8/1996 | Johnson |
| 6,055,790 A | 5/2000 | Lunde et al. |
| 6,264,412 B1 | 7/2001 | Nakamura et al. |
| 6,298,633 B1 | 10/2001 | McCorkle et al. |
| 6,309,158 B1 | 10/2001 | Bellinghausen et al. |
| 6,394,722 B1 | 5/2002 | Kunt et al. |
| 6,488,460 B1 | 12/2002 | Smith et al. |
| 7,195,436 B1 | 3/2007 | Stephen |
| 7,891,151 B2 | 2/2011 | Sano |
| 8,075,234 B2 | 12/2011 | McClure |
| 8,393,124 B2 | 3/2013 | Zimmer et al. |
| 8,393,601 B2 | 3/2013 | de Mola |
| 8,409,395 B2 | 4/2013 | Schumacher, Jr. et al. |
| 8,434,983 B2 | 5/2013 | Chen |
| 8,640,428 B2 | 2/2014 | Naik et al. |
| 8,763,753 B2 | 7/2014 | Kray et al. |
| 8,876,450 B1 | 11/2014 | Campau |
| 8,950,159 B2 | 2/2015 | Cove et al. |
| 9,175,474 B2 | 11/2015 | May et al. |
| 9,441,660 B2 | 9/2016 | Meyers |
| 9,446,488 B2 | 9/2016 | Coronado |
| 9,457,540 B2 | 10/2016 | Lewis et al. |
| 9,611,877 B1 | 4/2017 | Attanasio |
| 9,682,529 B2 | 6/2017 | Schoke et al. |
| 9,803,668 B2 | 10/2017 | Reeves et al. |
| 9,822,808 B2 | 11/2017 | Rajeev |
| 9,874,306 B2 | 1/2018 | Burkhard et al. |
| 9,975,309 B2 | 5/2018 | Patel et al. |
| 9,976,583 B2 | 5/2018 | Lopez et al. |
| 9,981,446 B2 | 5/2018 | Holemans |
| 10,016,955 B2 | 7/2018 | Mills |
| 10,018,209 B2 | 7/2018 | Burd et al. |
| 10,092,986 B2 | 10/2018 | Coronado |
| 10,099,767 B2 | 10/2018 | Lewis et al. |
| 10,197,078 B2 | 2/2019 | Richardson et al. |
| 10,228,003 B2 | 3/2019 | Nipper et al. |
| 10,228,684 B2 | 3/2019 | Coon et al. |
| 10,309,434 B2 | 6/2019 | Kleshchev et al. |
| 10,400,804 B2 | 9/2019 | Cheynet De Beaupre et al. |
| 10,487,864 B2 | 11/2019 | Schmidt et al. |
| 10,514,053 B2 | 12/2019 | Holzinger et al. |
| 10,730,604 B2 | 8/2020 | Lewis et al. |
| 2005/0155305 A1 | 7/2005 | Cosenza et al. |
| 2023/0045579 A1 * | 2/2023 | Rice ..................... F16B 5/0266 |

\* cited by examiner

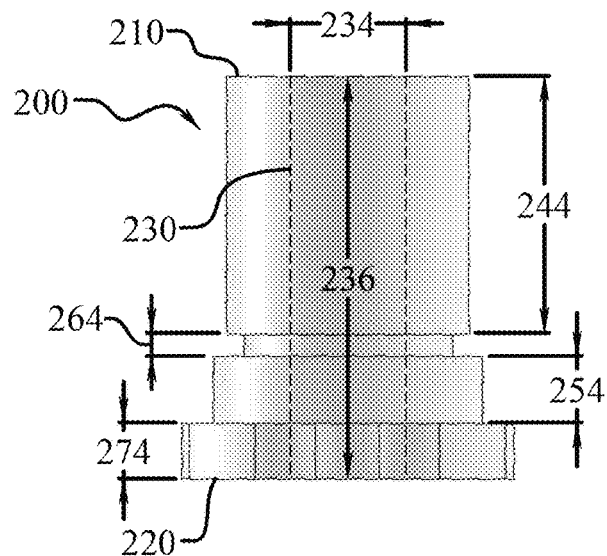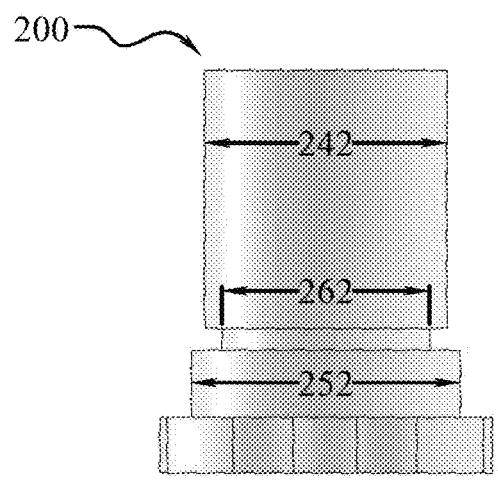
*Fig. 5a*     *Fig. 5b*
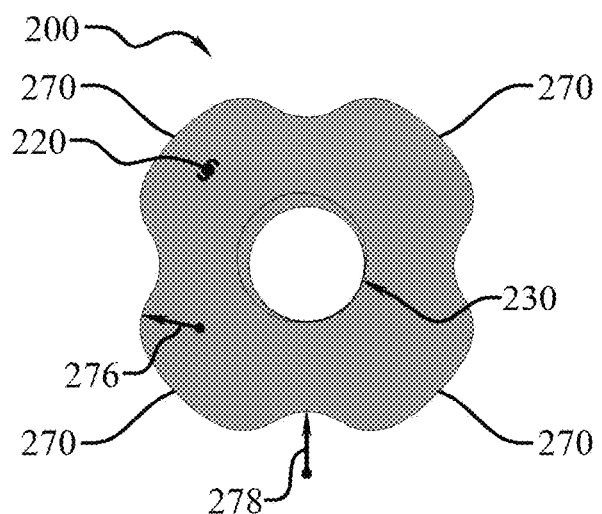
*Fig. 6*

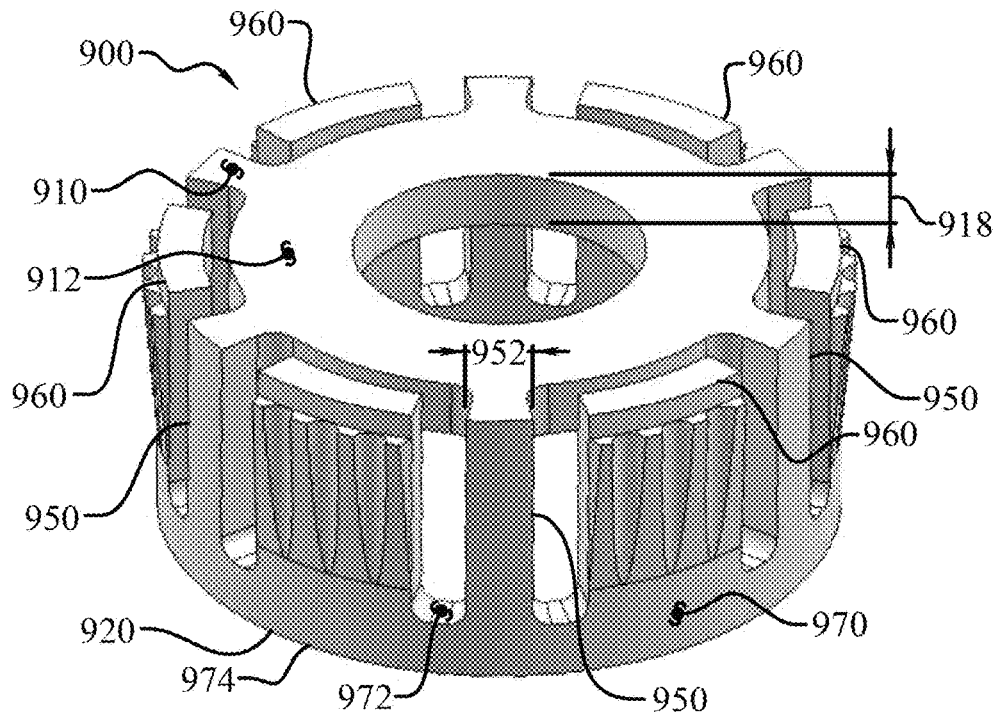
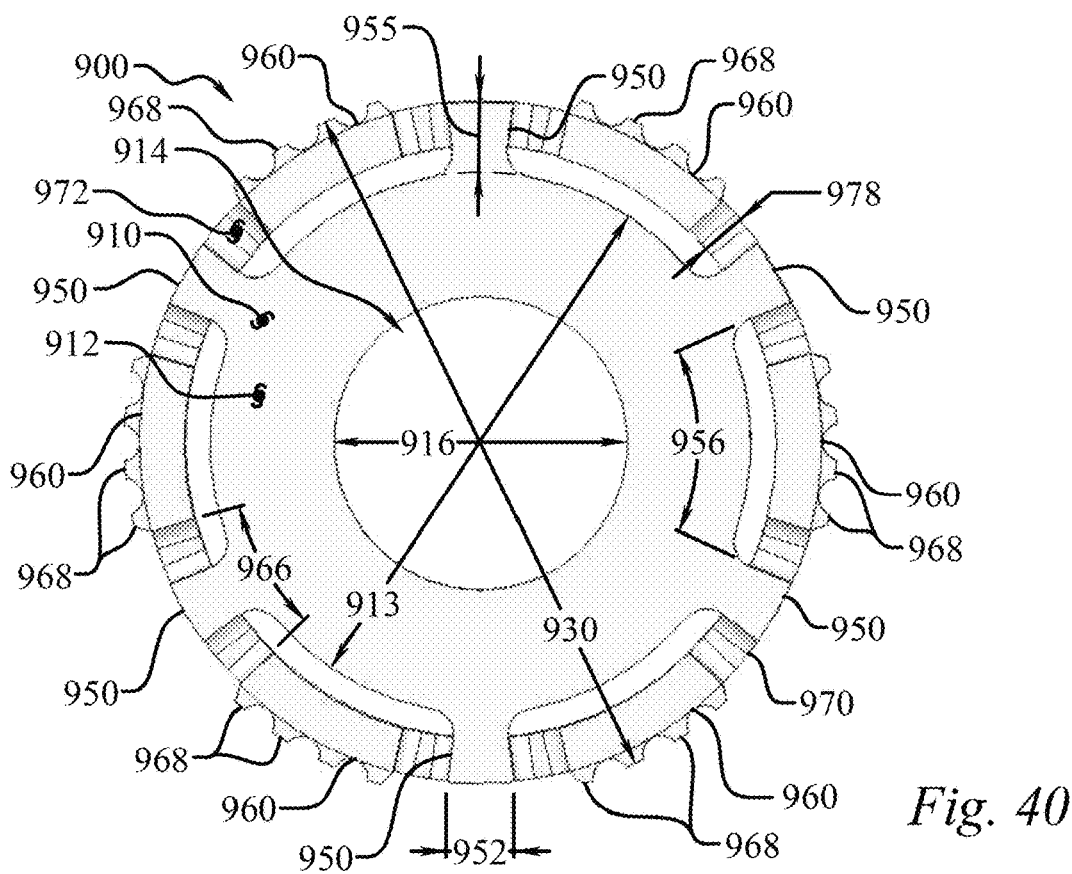
Fig. 39
Fig. 40

PANEL FASTENER

CROSS-REFERENCE TO RELATED APPLICATIONS

This application claims the benefit of U.S. provisional patent application Ser. No. 63/230,102, filed on Aug. 6, 2021, all of which is incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to panel fasteners.

BACKGROUND OF THE INVENTION

Honeycomb cored sandwich panels are commonly used in a multitude of applications because they offer the advantages of being high strength, inherently rigid, and a reduction of weight. Furthermore, honeycomb cored sandwich panels have highly effective thermal and acoustical insulating properties. In order for honeycomb cored sandwich panels to be useful they require structural load attachment points. Generally honeycomb cored sandwich panels cannot carry concentrated unit loading well. Early techniques for mounting panels included solid sectional fillers such as voids filled with epoxy or wooden blocks placed in the panels during the manufacturing process in order to form mounting points. These techniques have severe shortcomings, such as being heavy, difficult to implement, non-customizability, and also required the removal of sufficient core honeycomb material which results in a weakened panel.

Later other fasteners were created to overcome the issues previously mentioned. One embodiment of fastener required a panel aperture to be bored through one of the panel's skins and honeycomb core. Next, epoxy was then injected into the void and a threaded insert is pressed into place. This embodiment of panel fastener had the disadvantages of being heavy, which negated some of the benefits of using a honeycomb cored panel, and required the fastener insert to be held in place until the epoxy set up. In another embodiment, a mechanical fastener requires a panel aperture to be bored through one of the panel's skins and the honeycomb core. The other panel's skin would have a smaller panel aperture bored into it. An insert is then placed into the original panel aperture, and a smaller secondary insert with a conical flange is placed in the second panel aperture. The smaller secondary insert has threads that engage with threads located in the bore of the first insert. As the two inserts are rotated the inserts draw together and deform the second panel skin to match the conical flange. Such designs also have the draw backs of being heavy, and also require special training to properly install.

BRIEF DESCRIPTION OF THE DRAWINGS

Without limiting the scope of the present invention as claimed below and referring now to the drawings and figures:

FIG. 5A is a side elevation view of an embodiment of an insert pillar;

FIG. 5B is another side elevation view of an embodiment of an insert pillar;

FIG. 6 is a bottom plan view of an embodiment of an insert pillar;

FIG. 39 is an isometric view of an embodiment of a top insert;

FIG. 40 is a top plan view of an embodiment of a top insert;

Figure 1:
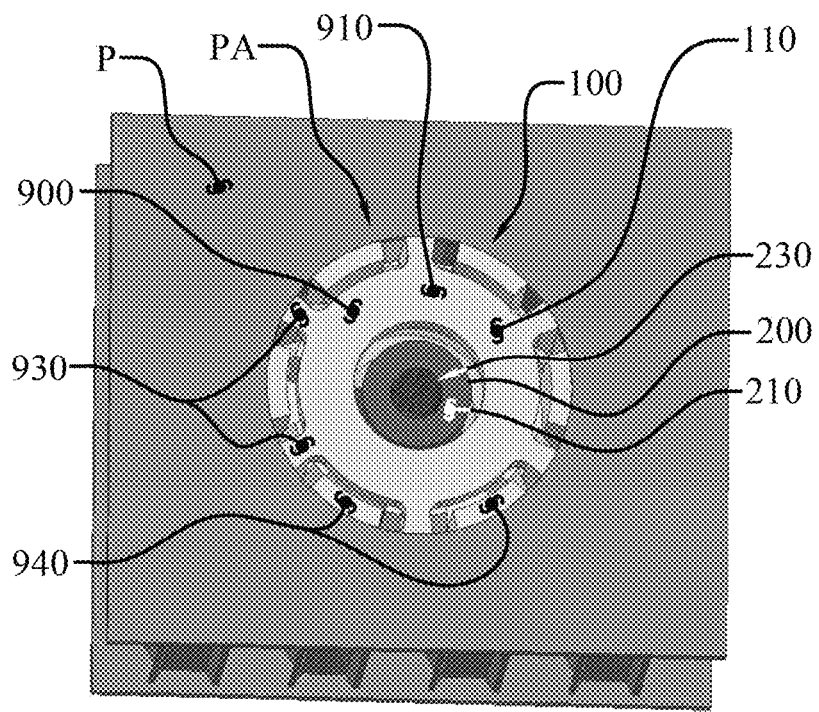
FIG. 1 is an isometric view of an embodiment of a panel fastener installed in a honeycomb panel.

These illustrations are provided to assist in the understanding of the exemplary embodiments of panel fasteners as described in more detail below and should not be construed as unduly limiting the specification. In particular, the relative spacing, positioning, sizing, and dimensions of the various elements illustrated in the drawings may not be drawn to scale and may have been exaggerated, reduced, or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

Honeycomb cored sandwich panels are commonly used in a multitude of applications because they offer the advantages of being high strength, inherently rigid, and a reduction of weight. Furthermore, honeycomb cored sandwich panels have highly effective thermal and acoustical insulating properties. In order for honeycomb cored sandwich panels to be useful they require structural load attachment points. Generally honeycomb cored sandwich panels cannot carry concentrated unit loading well. Early techniques for mounting panels included solid sectional fillers such as voids filled with epoxy or wooden blocks placed in the panels during the manufacturing process in order to form mounting points. These techniques have severe shortcomings, such as being heavy, difficult to implement, non-customizability, and also required the removal of sufficient core honeycomb material which results in a weakened panel.

Later other fasteners were created to overcome the issues previously mentioned. One embodiment of fastener required a panel aperture to be bored through one of the panel's skins and honeycomb core. Next, epoxy was then injected into the void and a threaded insert is pressed into place. This embodiment of panel fastener had the disadvantages of being heavy, which negated some of the benefits of using a honeycomb cored panel, and required the fastener insert to be held in place until the epoxy set up. In another embodiment, a mechanical fastener requires a panel aperture to be bored through one of the panel's skins and the honeycomb core. The other panel's skin would have a smaller panel aperture bored into it. An insert is then placed into the original panel aperture, and a smaller secondary insert with a conical flange is placed in the second panel aperture. The smaller secondary insert has threads that engage with threads located in the bore of the first insert. As the two inserts are rotated the inserts draw together and deform the second panel skin to match the conical flange. Such designs also have the draw backs of being heavy, and also require special training to properly install.

An embodiment of the present invention, as seen in FIG. 1, is a snap-in honeycomb panel fastener (100) that has the advantage over the prior art of not only being easy to install, but also limits the amount of weight added to the panel (P). One major advantage of the current invention over the prior art, is that the fastener (100) locks into place when pressed into a panel aperture (PA). In the embodiment illustrated in FIG. 2, the fastener (100) may include an insert pillar (200), a clip (300), a base plate (400), a support ring (500), seen best in FIGS. 15-20, a spring (600), a prong ring (700), a retainer latch (800), seen best in FIGS. 34-37, and/or a top insert (900). Various embodiments will be disclosed throughout, some of which may contain all of these elements while others only require a few of these elements.

Figure 2:
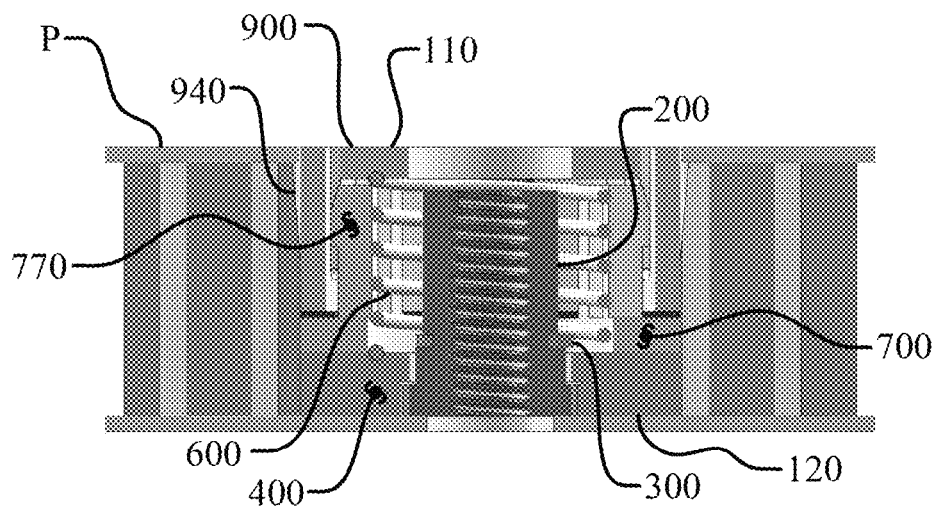
FIG. 2 is a cross-section view of an embodiment of a panel fastener installed in a honeycomb panel.

Generally, the fastener (100) may have a fastener proximal end (110) and a fastener distal end (120), as seen in FIG. 2. FIG. 1 shows an embodiment in an installed state within a honeycomb panel (P). FIG. 2 shows a cross-section of an embodiment in an installed state within a honeycomb panel (P).

The insert pillar (200), as seen in FIGS. 3-6, and 9 forms the core of the fastener (100). The insert pillar (200) may include a pillar proximal end (210), a pillar distal end (220), seen in FIG. 5a a pillar bore (230) having pillar bore threads (232), seen in FIG. 19, a pillar bore width (234) and a pillar bore length (236), seen in FIG. 5a, a pillar bore body portion (240), abbreviated PBP throughout, having a PBP width (242) and a PBP length (244), seen in FIGS. 3, 5a, and 5b, a pillar spacing portion (250), abbreviated PSP throughout, seen in FIG. 3, having a PSP width (252) and a PSP length (254), seen in FIGS. 5a and 5b, a pillar clip receiving portion (260), abbreviated PCRP throughout, seen in FIG. 3, having a PCRP width (262) and a PCRP length (264), seen in FIGS. 5a and 5b, and a plurality of pillar lobes (270) with each pillar lobes (270) having a pillar lobe first width (272), a pillar lobe second width (273), seen in FIG. 4, a pillar lobe length (274), seen in FIG. 5a, a pillar lobe first radius (276), and a pillar lobe second radius (278), seen in FIG. 6. In one embodiment the PSP length (254) is greater than the PRCP length (264), while in a further embodiment the PSP length (254) is at least 50% greater than the PRCP length (264), and at least 75%, 100%, 150%, and 200% greater in additional embodiments. A further series of embodiments caps this range such that the PSP length (254) is no more than 10 times the PRCP length (264), and no more than 8 times and 6 times in further embodiments.

The plurality of pillar lobes (270) interact with the base plate (400) to prevent the rotation of the insert pillar (200) with respect to the base plate (400). Thus, the pillar lobes (270) may be configured in any complimentary geometry, however any of the disclosed embodiments provide the benefit of improved stress distribution, ease of manufacturing, and easy of assembly. The pillar bore length (236) is the distance between the pillar proximal end (210) and the pillar distal end (220), as seen in FIG. 5a. Additionally, it should be noted that in the illustrated through-bore embodiment the pillar bore length (236) is the equivalent of the sum of the PBP length (244), the PSP length (254), the PCRP length (264) and the pillar lobe length (274), as seen in FIG. 5a, however, the pillar bore need not extend all the way from the pillar proximal end (210) to the pillar distal end (220). In one embodiment the pillar lobe length (274) is less than the PSP length (254), and in a further embodiment the pillar lobe length (274) is greater than the PCRP length (264), and in still another embodiment the pillar lobe length (274) is no more than 50% of the PBP length (244), and no more than 40%, and 30% in further embodiments.

In one embodiment of the insert pillar (200), the pillar bore threads (232) extend at least 25 percent of the pillar bore length (236) from the pillar proximal end (210). In another embodiment, the pillar bore threads (232) extend at least 25 percent of the pillar bore length (236) from the pillar distal end (220). In still a further embodiment the pillar bore threads (232) extend 25-75 percent of the pillar bore length (236) from either the pillar proximal end (210) or the pillar distal end (220). In yet another embodiment, the pillar bore threads (232) extend the full length of the pillar bore (230).

Figure 3:
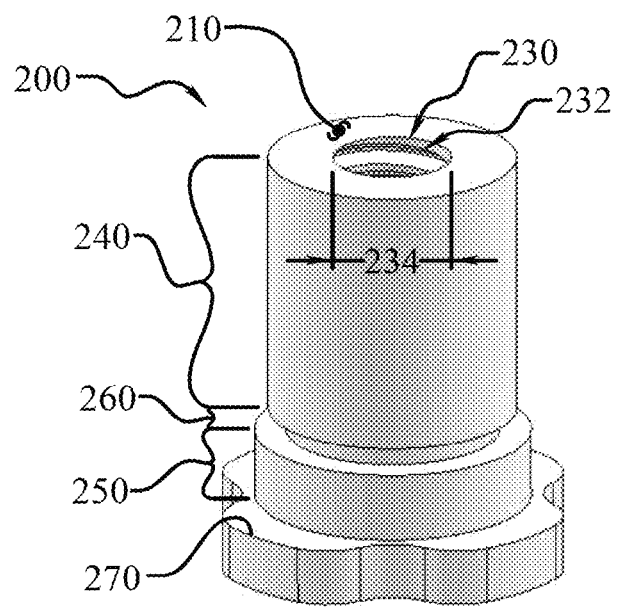
FIG. 3 is an isometric view of an embodiment of an insert pillar.
Figure 4:
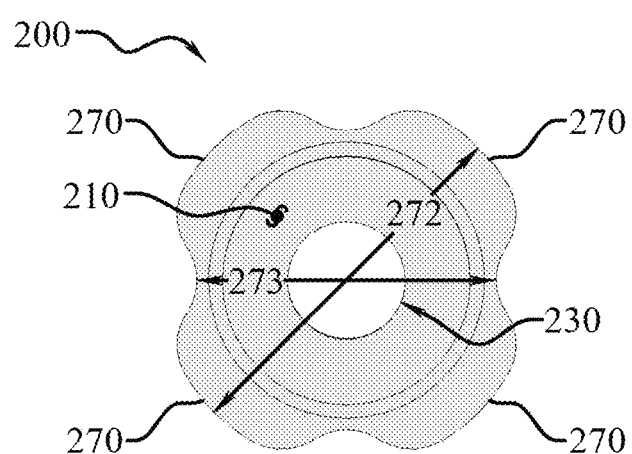
FIG. 4 is a top plan view of an embodiment of an insert pillar.

Additionally, in one embodiment of insert pillar (200), the pillar bore width (234) is 15 to 85 percent of the PBP width (242), seen in FIGS. 3 and 5b. In another embodiment, the pillar bore width (234) is 30 to 50 percent of the PBP width (242). In still yet another embodiment, the pillar bore width (234) is less than 60 percent of the PBP width (242). The pillar spacing portion (250), in one embodiment, has a PSP width (252) that is greater than the PBP width (242). While in another embodiment, the PSP width (252) is 101-150 percent of the PBP width (242). In yet another embodiment, the PSP width (252) is 105-125 percent of the PBP width (242). Furthermore, in one embodiment of the plurality pillar lobes (270), the pillar lobe second width (273), seen in FIG. 4, is 50 to 95 percent of the pillar lobe first width (272). In another embodiment, the pillar lobe second width (273) is 60 to 90 percent of the pillar lobe first width (272). In still yet another embodiment, the pillar lobe second width (273) is less than 85 percent of the pillar lobe first width (272).

Figure 7:
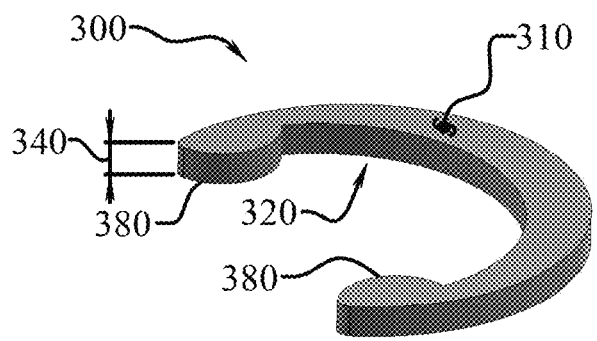
FIG. 7 is an isometric view of an embodiment of a clip.
Figure 8:
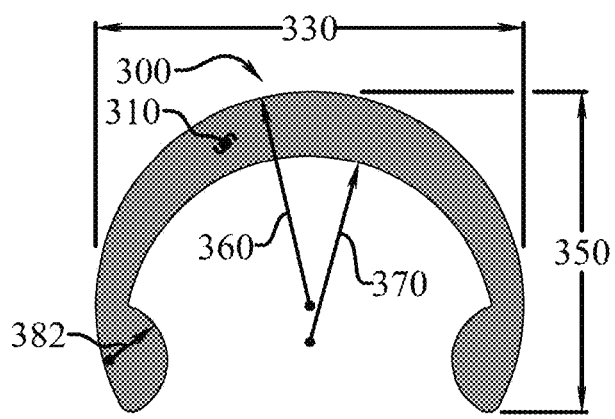
FIG. 8 is a top plan view of an embodiment of a clip.
Figure 9:
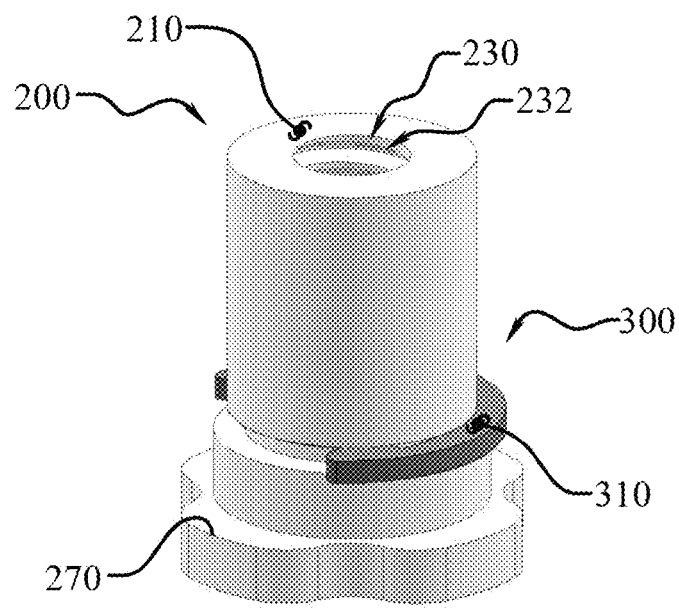
FIG. 9 is an isometric view of an embodiment of a base plate.

The previously mentioned clip (300), as seen in FIGS. 7-9, engages the insert pillar (200) at the pillar clip receiving portion (260) and keeps the pillar (200) and the base plate (400) connected together, as seen in FIGS. 14 and 19-21. As seen in FIGS. 7-9, the clip (300) may further include a clip proximal end (310), a clip distal end (320), a clip width (330), a clip length (340), a clip height (350), a clip first radius (360), a clip second radius (370), and a clip retention protrusion (380) having a clip retention protrusion radius (382). The clip length (340) is the distance between the clip proximal end (310) and the clip distal end (320), as seen in FIG. 7. When the clip (300) is installed on the insert pillar (200), the clip width (330) is 115 to 200 percent larger than the PBP width (242), seen in FIG. 5b, in one embodiment. In another embodiment, the clip width (330) is 120 to 175 percent larger than the PBP width (242). In yet another embodiment, the clip width (330) is less than 150 percent of the PBP width (242). Furthermore, in one embodiment of clip (300) installed on the insert pillar (200), the clip height (350) is 40 to 90 percent of the clip width (330). Yet in another embodiment, the clip height (350) is 60 to 75 percent of the clip width (330). In still yet another embodiment, the clip height (350) is greater than 65 percent of the clip width (330). The clip first radius (360) is located along the clip's (300) outside edge, and the clip second radius (370) is located along the clip's (300) internal edge, as seen in FIG. 8. In one embodiment of clip (300) the clip second radius (370) is 55 to 90 percent of the clip first radius (360). In another embodiment, the clip second radius (370) is 65 to 85 percent of the clip first radius (360). In yet another embodiment, the clip second radius (370) is greater than 70 percent of the clip first radius (360). The earlier mentioned clip retention protrusions (380) engage the insert pillar (200) in the pillar clip receiving portion (PCRP) (260), as seen in FIG. 9. Furthermore, each clip retention protrusion (380) has a clip retention protrusion radius (382), as illustrated in FIG. 8. In one embodiment of clip (300), the clip retention protrusion radius (382) is 12 to 30 percent of the clip first radius (360). In another embodiment, the clip retention protrusion radius (382) is 15 to 25 percent of the clip first radius (360). In still another embodiment, the clip retention protrusion radius (382) is less than 27 percent of the clip first radius (360).

Figure 10:
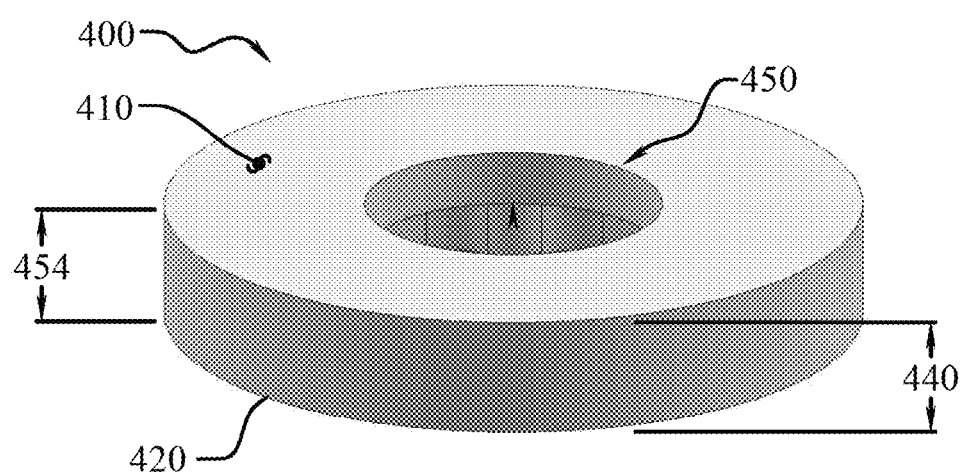
FIG. 10 is an isometric view of an embodiment of a base plate.
Figure 11:
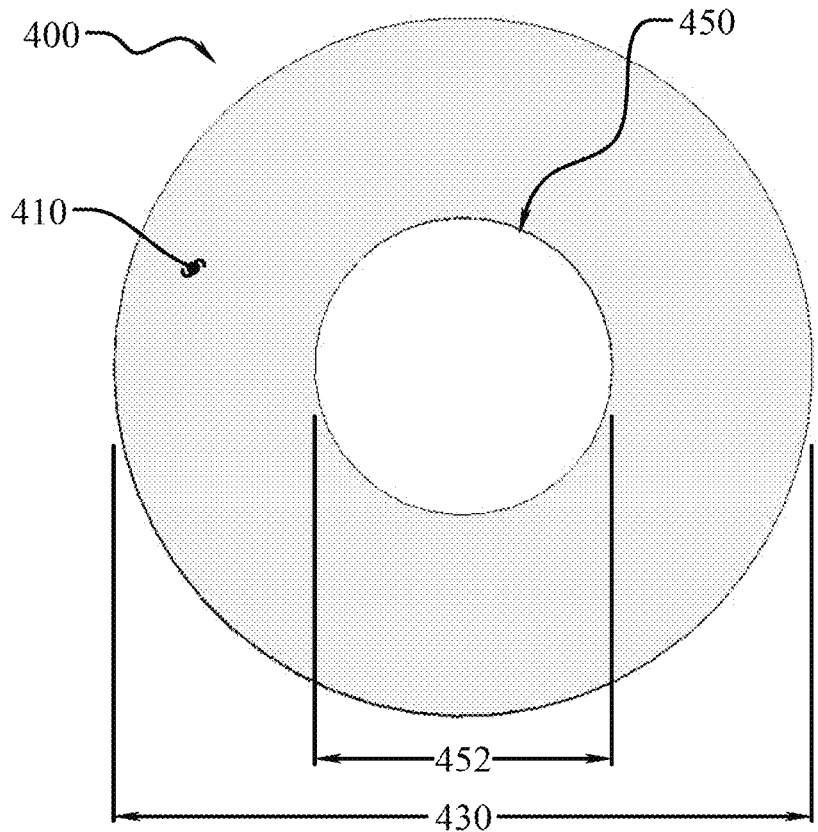
FIG. 11 is a top plan view of an embodiment of a base plate.
Figure 12:
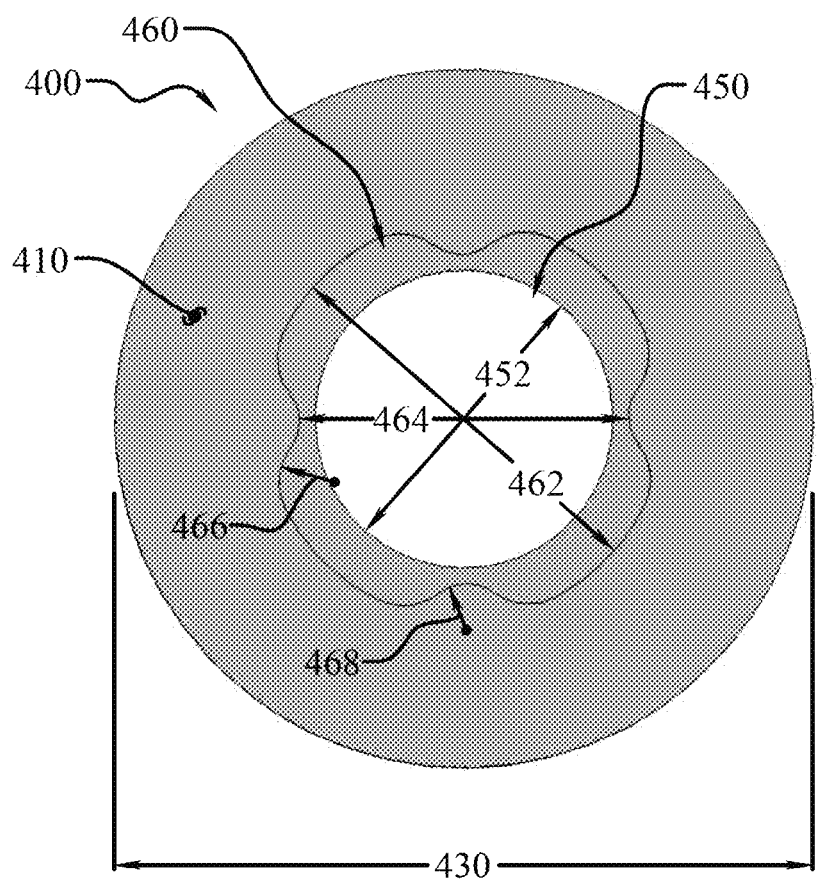
FIG. 12 is a bottom plan view of an embodiment of a base plate.

Now referring to FIGS. 10-14, the base plate (400) may include a base plate proximal end (410), a baseplate distal end (420), a base plate width (430), a base plate length (440), defined as the distance between the base plate proximal end (410) and the baseplate distal end (420), a base plate bore (450) having a base plate bore width (452), seen in FIG. 12, and a base plate bore length (454), seen in FIG. 10. The base plate bore (450) extends through the base plate (400), which is why the base plate bore length (454) is the same as the base plate length (440) in FIG. 10. The base plate bore (450) may be formed with a plurality of base plate pillar lobe engagement recesses (460), abbreviated BPPLER, or other complimentary geometry designed to engage the pillar lobes (270). Many of the disclosed embodiments offer the additional benefit of improved stress distribution, ease of manufacturing, and easy of assembly. As seen in FIG. 12, in various embodiments the plurality of base plate pillar lobe engagement recesses (460) may form an overall non-circular recess having a BPPLER first width (462), a BPPLER second width (464), a BPPLER first radius (466) located on each of the plurality of base plate pillar lobe engagement recesses (460), and a BPPLER second radius (468) is located on each of the plurality of base plate pillar lobe engagement recesses (460). The plurality of base plate pillar lobe engagement recesses (460) extend radially outward from the base plate bore (450) and extend a BBPLER length into the base plate (400) from the baseplate distal end (420), and the BBPLER length is less than the base plate bore length (454) thereby creating a pocket within the base plate (400) to receive the plurality of pillar lobes (270), and in one embodiment the BBPLER length is at least 25% less than the base plate bore length (454), and the BBPLER length is 30-70% of the base plate bore length (454) in a further embodiment.

Figure 13:
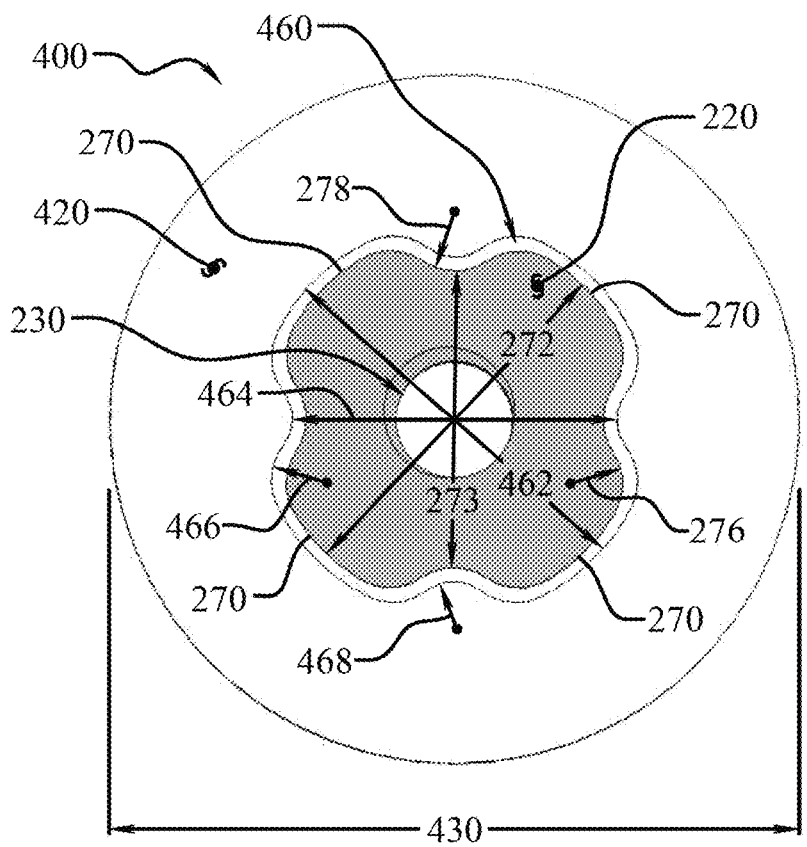
FIG. 13 is a bottom plan view of an embodiment of a base plate with an installed pillar.
Figure 14:
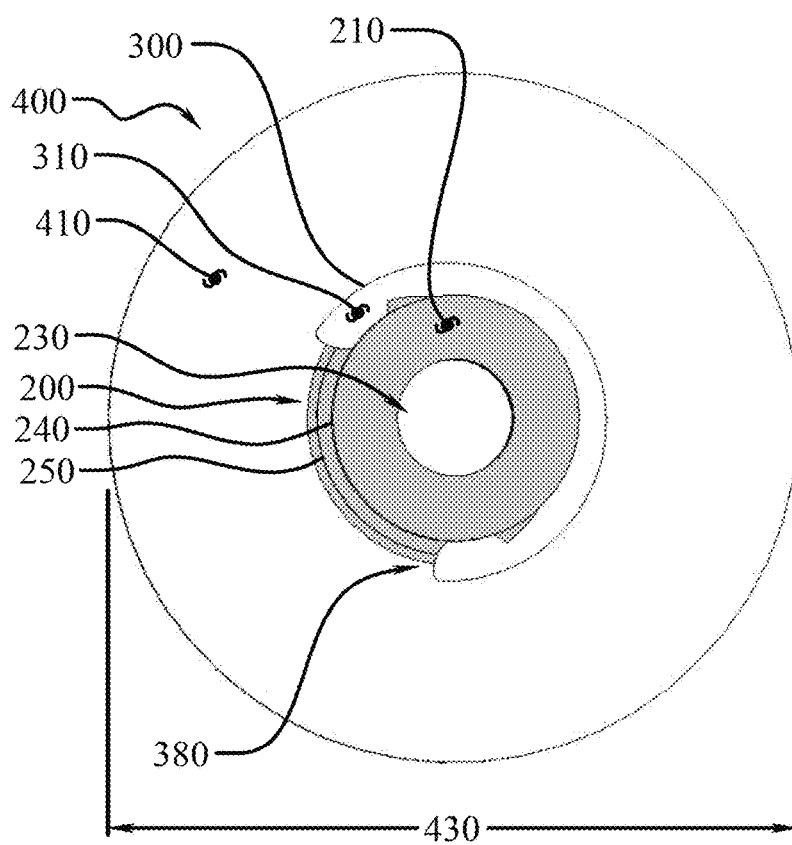
FIG. 14 is a top plan view of an embodiment of a base plate with an installed pillar and clip.

The base plate (400) receives the pillar (200) from the base plate distal side (420) through the base plate bore (450), as seen in FIG. 13. Additionally in one embodiment of base plate (400), the base plate bore width (452), seen in FIG. 11, is 20 to 70 percent of the base plate width (430). While in another embodiment, the base plate bore width (452) is 25 to 60 percent of the base plate width (430). In yet another embodiment, the base plate bore width (452) is less than 55 percent of the base plate width (430). The plurality of base plate pillar lobe engagement recesses (460) are designed to receive and cooperate with the plurality of pillar lobes (270) to prevent the pillar (200) from rotating with respect to the base plate (400), as seen in FIGS. 12 and 13. In one embodiment of pillar (200) and base plate (400), the pillar lobe first width (272) is 55 to 97.5 percent of the BPPLER first width (462). In another embodiment, the pillar lobe first width (272) is 70 to 95 percent of the BPPLER first width (462). In yet another embodiment, the pillar lobe first width (272) is greater than 85 percent of the BPPLER first width (462). Similarly, one embodiment has a pillar lobe second width (273) that is 55 to 97.5 percent of the BPPLER second width (464). In another embodiment, the pillar lobe second width (273) is 70 to 95 percent of the BPPLER second width (464). In yet another embodiment, the pillar lobe second width (273) is greater than 85 percent of the BPPLER second width (464). Additionally, in one embodiment the pillar lobe first radius (276) is approximately equal to the BPPLER first radius (466), while in a further embodiment the pillar lobe first radius (276) is less than the BPPLER first radius (466), and in another embodiment the pillar lobe first radius (276) is 65 to 97.5 percent of the BPPLER first radius (466), as seen in FIG. 13. In another embodiment, the pillar lobe first radius (276) is 80 to 95 percent of the BPPLER first radius (466). While in yet another embodiment, the pillar lobe first radius (276) is greater than 85 percent of the BPPLER first radius (466).

Furthermore, in one embodiment the pillar lobe second radius (278) is approximately equal to the BPPLER second radius (468), while in a further embodiment the pillar lobe second radius (278) is less than the BPPLER second radius (468), and in another embodiment the pillar lobe second radius (278) is 65 to 97.5 percent of the BPPLER second radius (468). In another embodiment, the pillar lobe second radius (278) is 80 to 95 percent of the BPPLER second radius (468). In yet another embodiment, the pillar lobe second radius (278) is greater than 85 percent of the BPPLER second radius (468).

It should be noted that the illustrated embodiments show a pillar (200) having four pillar lobes (270) and a base plate (400) having four base plate pillar lobe engagement recesses (460); however, that the pillar lobes (270) and base plate pillar lobe engagement recesses (BPPLER) (460) are not limited to four pillar lobes (270) and four base plate pillar lobe engagement recesses (BPPLER) (460), in fact one embodiment only has two lobes and recessed, while another embodiment has three to twelve. Further, one embodiment has just one pillar lobe (270) and one base plate pillar lobe engagement recess (460). In still yet another embodiment, there may be a plurality of pillar lobes (270) resembling a gear with up to 24 lobes and recesses. However, as previously mentioned, the disclosed relationships and geometries improve stress distribution throughout this multi-component system.

Figure 15:
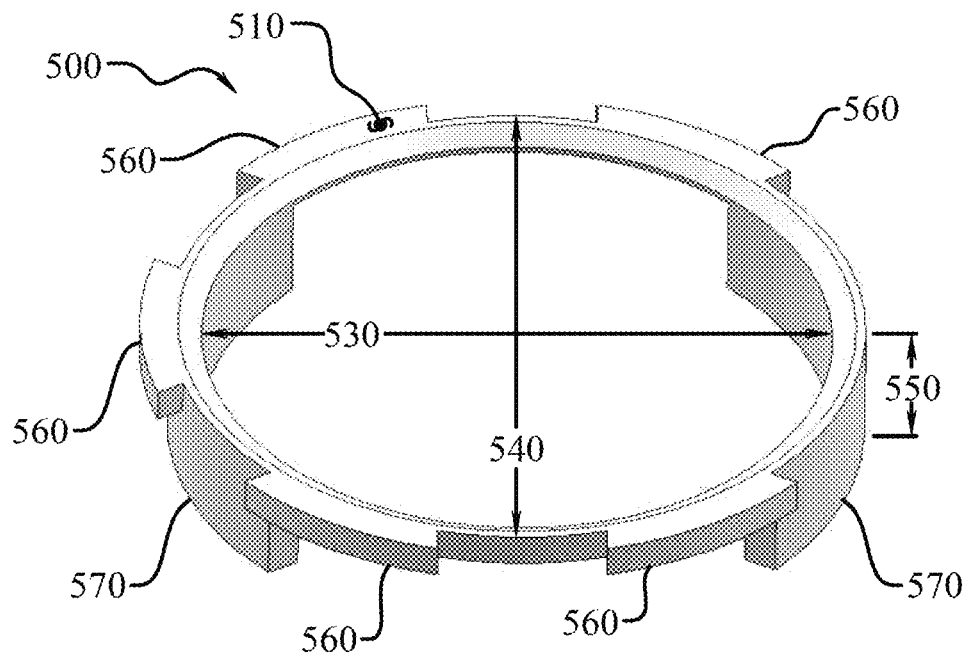
FIG. 15 is an isometric view of an embodiment of a support ring.
Figure 16:
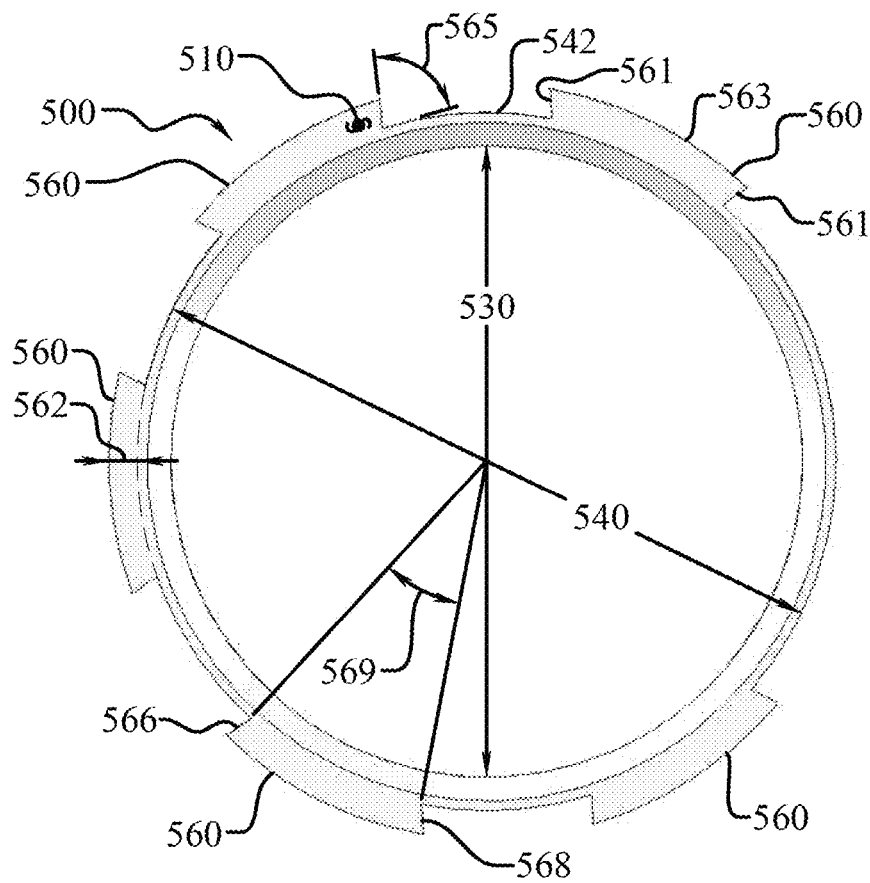
FIG. 16 is a top plan view of an embodiment of a support ring.
Figure 17:
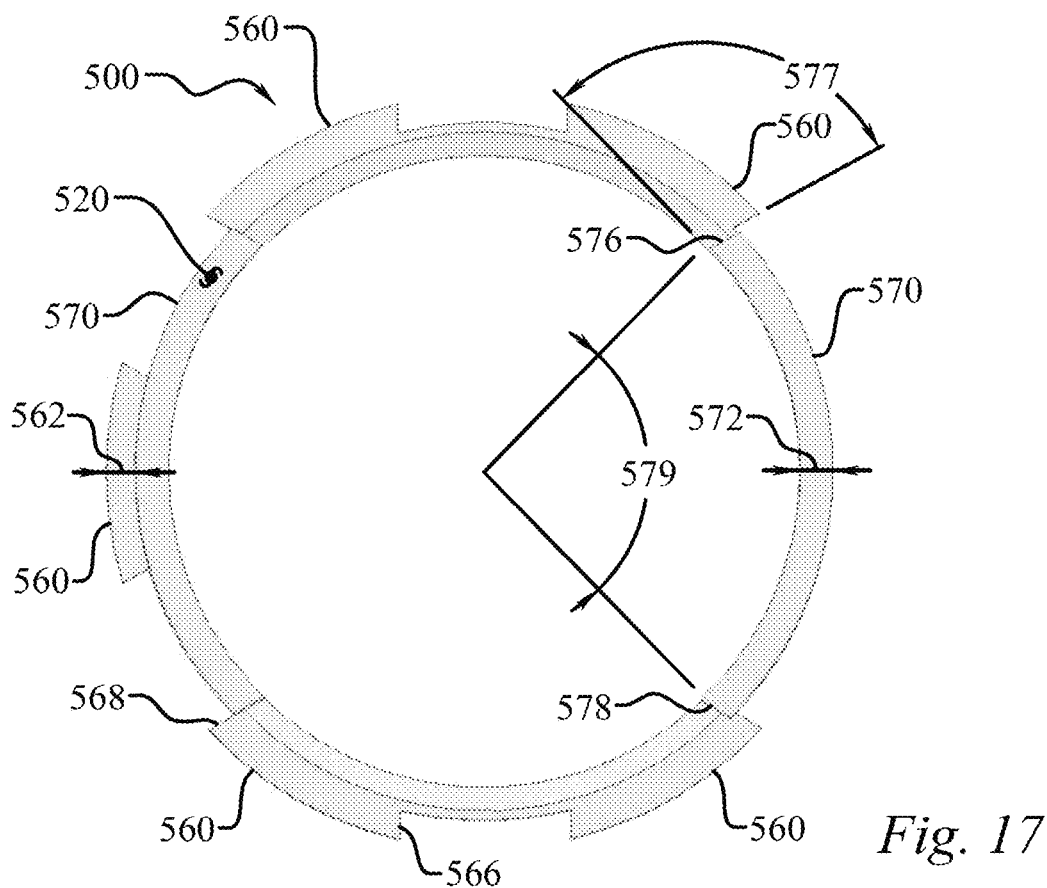
FIG. 17 is a bottom plan view of an embodiment of a support ring.
Figure 18:
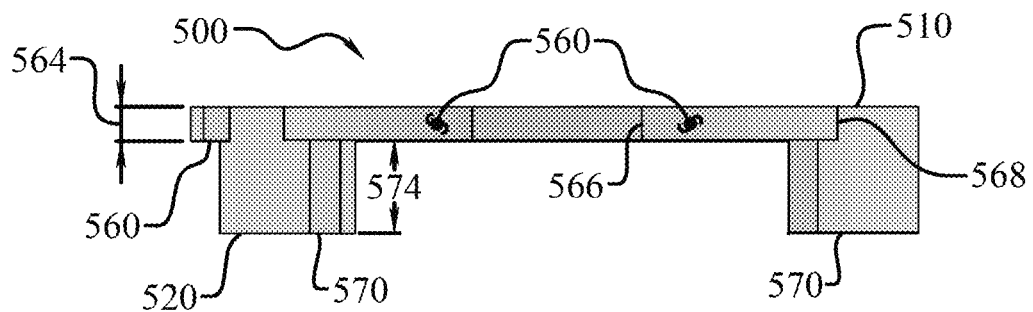
FIG. 18 is side elevation view of a support ring.
Figure 19:
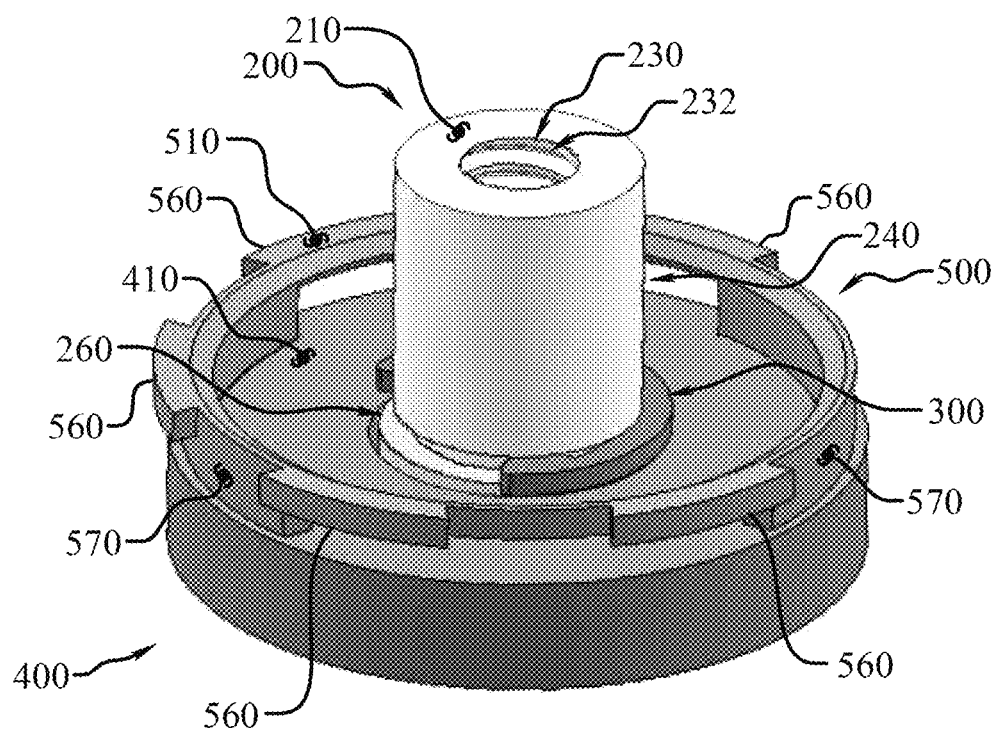
FIG. 19 is an isometric view of an embodiment of a pillar, clip, base plate and support ring.
Figure 20:
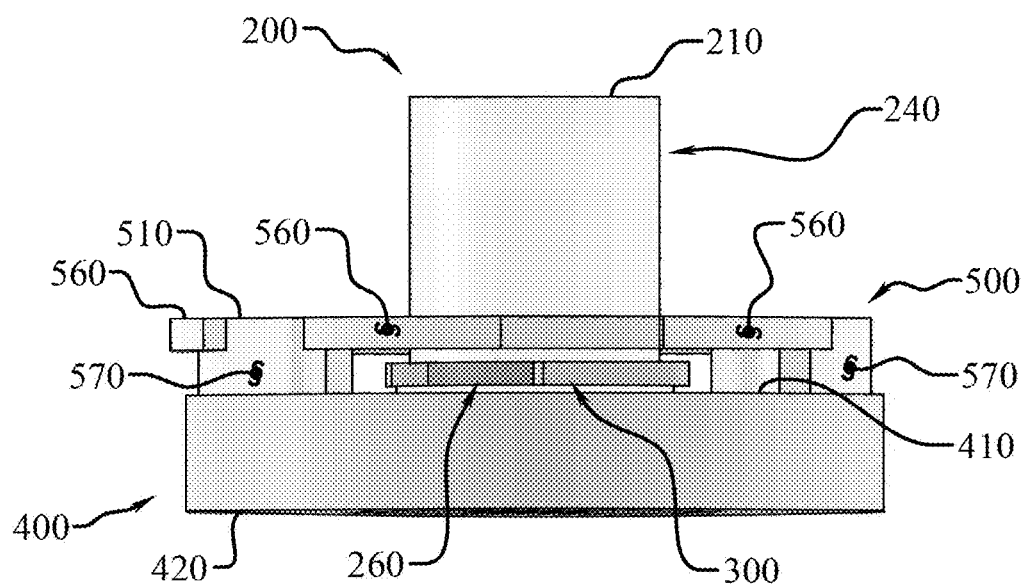
FIG. 20 is a side elevation view of an embodiment of a pillar, clip, base plate and support ring.
Figure 21:
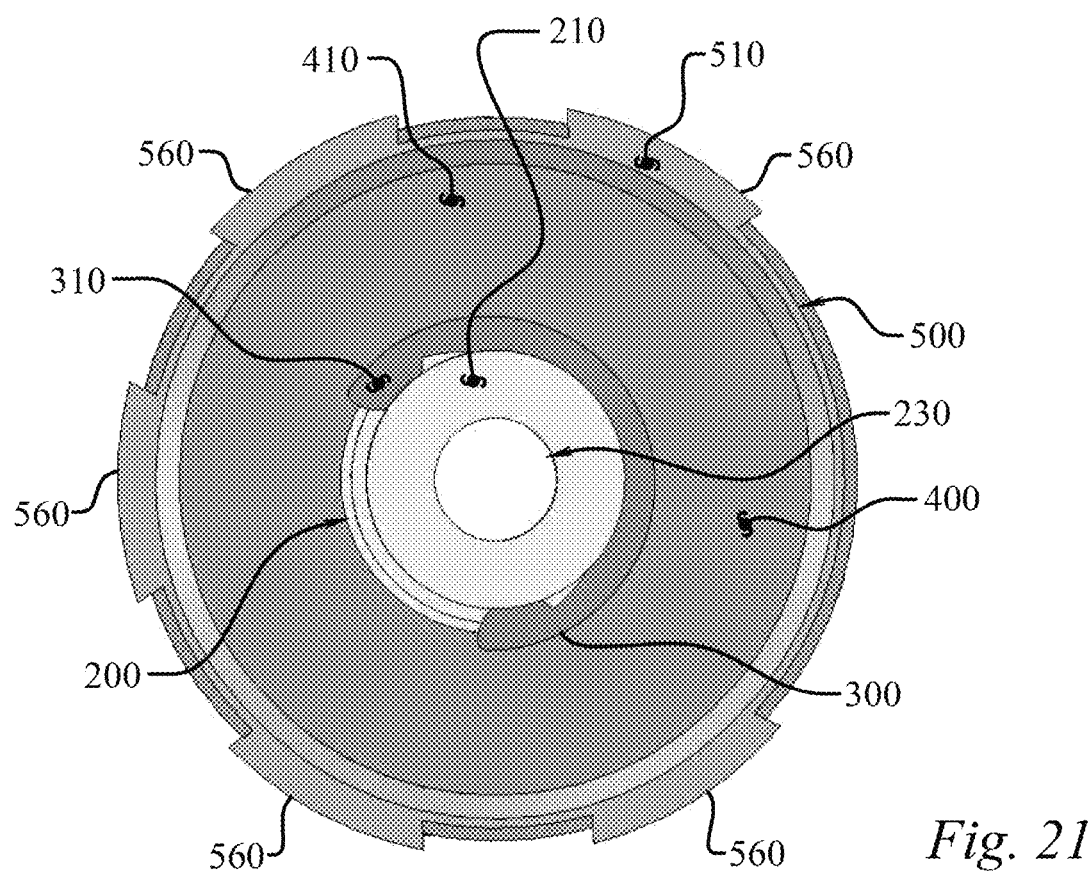
FIG. 21 is a top plan view of an embodiment of a pillar, clip, base plate and support ring.

FIGS. 15-18 show various views of the support ring (500). The support ring (500) sits on the base plate proximal end (410), as seen in FIGS. 19-21, and supports and aligns both the prong ring (700) and the retainer latch (800) and prevents them from rotating in respect to each other, as seen in FIGS. 31-33 and 37-38. As seen in FIGS. 15 and 16, the support ring (500) may include a support ring proximal end (510), a support ring distal end (520), a support ring inner width (530), a support ring outer width (540), a support ring length (550), as defined as the distance between the support ring proximal end (510) and the support ring distal end (520), and a plurality of support ring alignment protuberances (560), abbreviated SRAP. The plurality of support ring alignment protuberances (560) have a SRAP width (562), seen in FIG. 16, which is the distance that the support ring alignment protuberances (560) extends radially away from a support ring exterior surface (542) defining the support ring outer width (540), a SRAP length (564), seen in FIG. 18, a SRAP sinistral edge (566), a SRAP dextral edge (568), and a SRAP sinistral to dextral edge angle (569), as seen in FIG. 17. The support ring (500) may include a support ring standoff (570), abbreviated SRS, having a SRS width (572), seen in FIG. 17, a SRS length (574), seen in FIG. 18, a SRS sinistral edge (576), a SRS dextral edge (578), and a SRS sinistral to dextral edge angle (579). In one embodiment of support ring (500), the support ring inner width (530) is 60 to 95 percent of the support ring outer width (540), seen in FIG. 15. In another embodiment, the support ring inner width (530) is 70 to 90 percent of the support ring outer width (540). Additionally, the support ring length (550) is 25 to 85 percent of the base plate length (440), in one embodiment of support ring (500). In another embodiment, the support ring length (550) is 35 to 70 percent of the base plate length (440). In still yet another embodiment, the support ring length (550) is less than 60 percent of the base plate length (440).

Furthermore, in one embodiment of support ring alignment protuberances (560) and support ring standoff (570), the SRAP width (562) is 50 to 200 percent of the SRS width (572), seen in FIG. 17. In another embodiment, the SRAP width (562) is 75 to 150 percent of the SRS width (572). In still another embodiment, the SRAP width (562) is less than 125 percent of the SRS width (572). Additionally, in another embodiment the SRAP length (564), seen in FIG. 18, is 20 to 80 percent of the support ring length (550), seen in FIG. 15, and 30 to 70 percent in another embodiment, and no more than 60 percent in still a further embodiment.

In the embodiment of FIG. 16, each of the plurality of support ring alignment protuberances (560) have SRAP sidewalls (561) extending from the support ring exterior surface (542) to a SRAP exterior surface (563). A SRAP sidewall angle (565) exists between a SRAP sidewall (561) and a line tangent to the support ring exterior surface (542) at its intersection with the SRAP sidewall (561), as shown in FIG. 16. In one embodiment the SRAP sidewall angle (565) is acute, while in a further embodiment it is no more than 85 degrees, and in still another embodiment it is at least 70 degrees, or at least 75 degrees. The intersection of the SRAP sidewall with the support ring exterior surface (542) establishes the points for determining the SRAP sinistral to dextral edge angle (569). Further, as seen in the embodiment of FIG. 17, a support ring inner surface (544) intersects with the SRS sinistral edge (576) and the SRS dextral edge (578). An imaginary line tangent to the support ring inner surface (544) at the intersection defines a SRS edge angle (577) measured to the SRS sinistral edge (576) or the SRS dextral edge (578). In one embodiment the SRS edge angle (577) is obtuse. The intersection of the support ring inner surface (544) with the SRS sinistral edge (576) and the SRS dextral edge (578) also establishes the points used to define the SRS sinistral to dextral edge angle (579).

In one embodiment the SRAP sinistral to dextral edge angle (569) is approximately equal to the SRS sinistral to dextral edge angle (579), while in another embodiment the SRS sinistral to dextral edge angle (579) is greater than the SRAP sinistral to dextral edge angle (569), and in a further embodiment the SRS sinistral to dextral edge angle (579) is at least twice the SRAP sinistral to dextral edge angle (569). Further embodiments cap this relationship recognizing diminishing returns and negative consequences such that the SRS sinistral to dextral edge angle (579) is no more than six times the SRAP sinistral to dextral edge angle (569), no more than five time in another embodiment, no more than four times in a further embodiment, and no more than three times in still another embodiment. The SRS length (574), seen in FIG. 18, is 40 to 95 percent of the support ring length (550), seen in FIG. 15, in one embodiment. In another embodiment, the SRS length (574) is 50 to 85 percent of the support ring length (550), while in an even further embodiment the SRS length (574) is at least 60 percent of the support ring length (550). As with all of the disclosed relationships, these relationships are far more than mere optimization of a variable, and they recognize trade-offs and negative consequences of merely optimizing a single component in a complex multi-component system to achieve improved stress distribution, ease of manufacturing, and easy of assembly.

Figure 22:
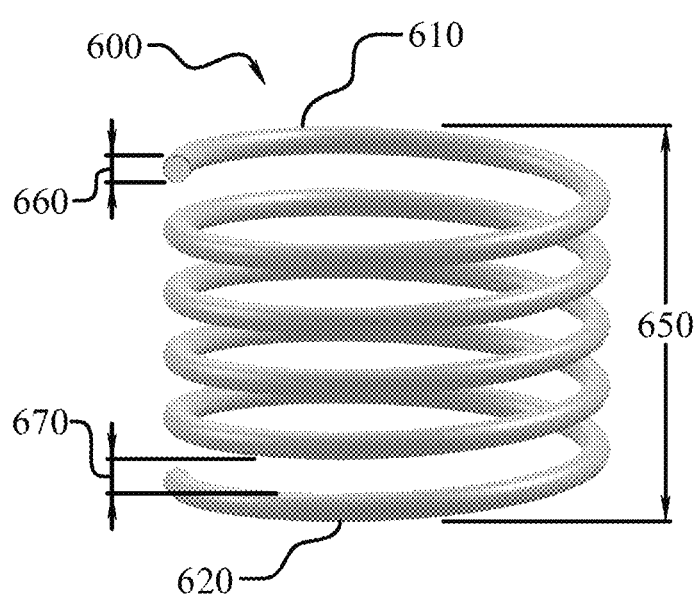
FIG. 22 is a side elevation view of a spring.
Figure 23:
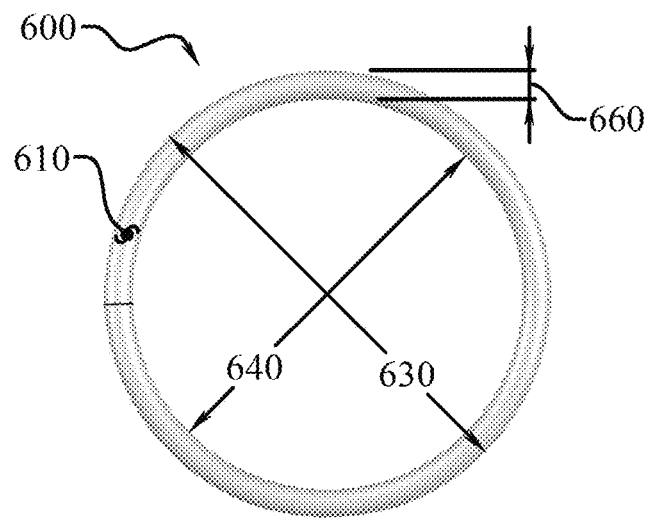
FIG. 23 is a top plan elevation view of a spring.
Figure 24:
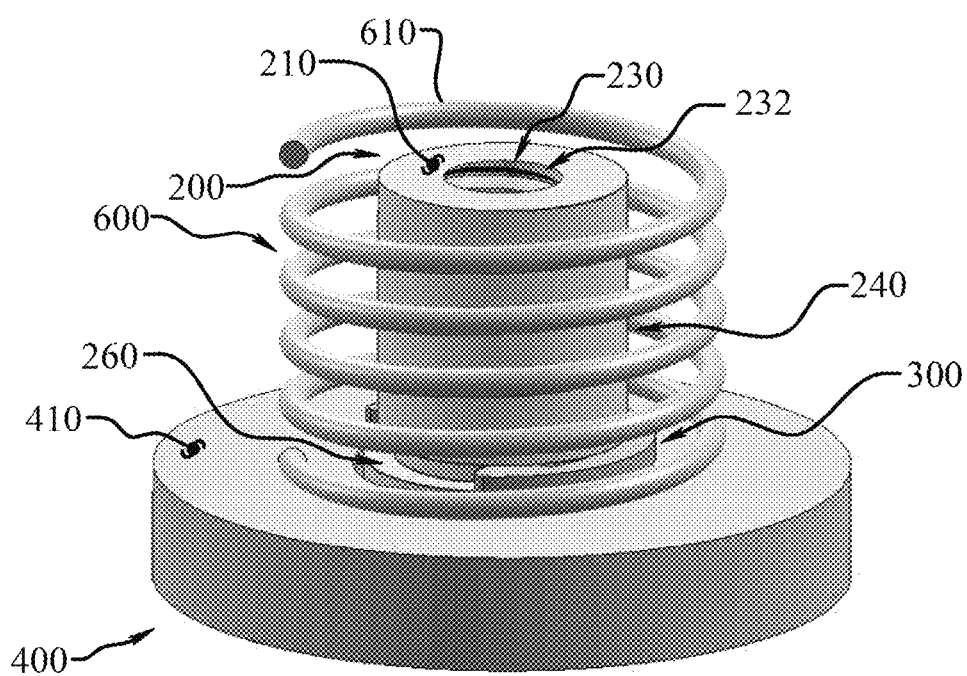
FIG. 24 is an isometric view of an embodiment of a pillar, clip, base plate and spring.

In the embodiment of FIGS. 22-24, the spring (600) encircles the pillar (200) and is used to bias the top insert (900) in a direction away from the base plate (400). The spring (600) may include a spring proximal end (610), a spring distal end (620), a spring outer width (630), a spring inner width (640), a spring length (650), defined as the distance between the spring proximal end (610) and the spring distal end (620), a spring material width (660) defined as the spring outer width (630) minus the spring inner width (640) and afterwards dividing the difference by two, and a coil space distance (670), defined as the distance between adjacent turns of the wire forming the spring (600) when in an unloaded state. The term spring (600) is meant to encompass any biasing mechanism, unless specifically stated to incorporate features and attributes such as those disclosed with respect to the illustrated embodiments.

Figure 25:
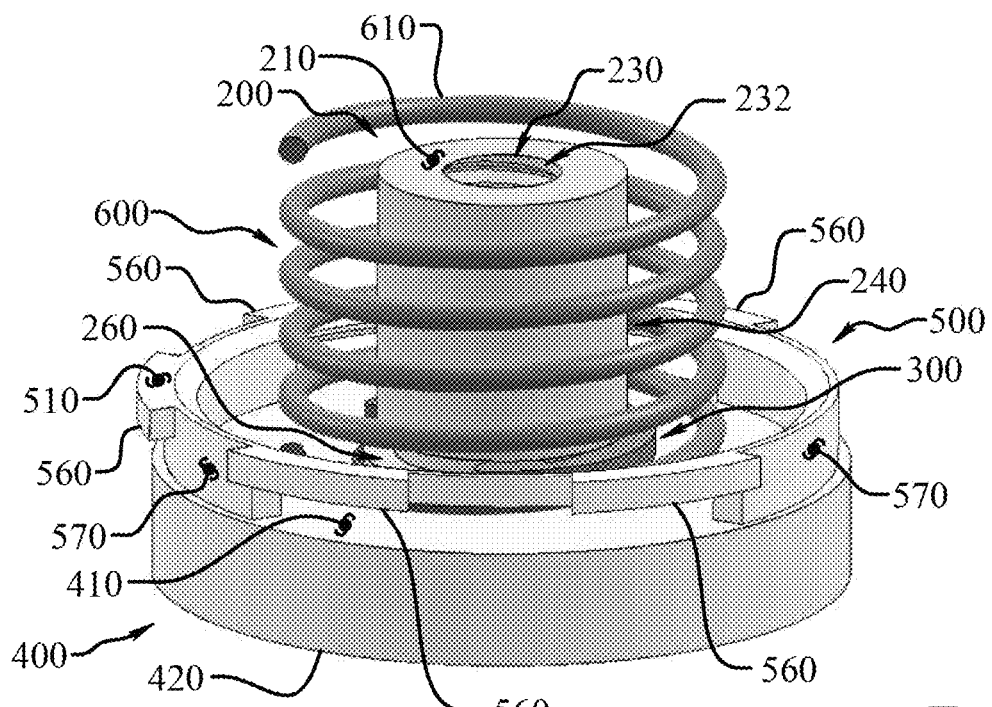
FIG. 25 is an isometric view of an embodiment of a pillar, clip, base plate, support ring and spring.
Figure 26:
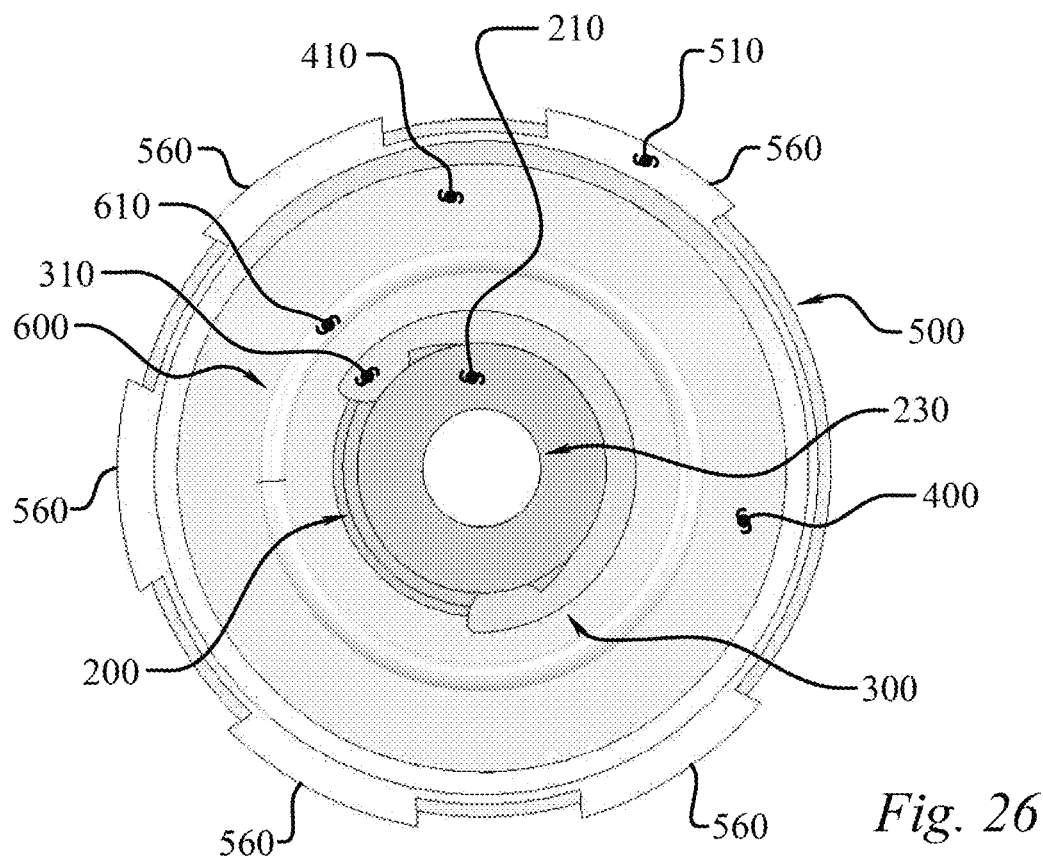
FIG. 26 is a top plan view of an embodiment of a pillar, clip, base plate, support ring and spring.
Figure 27:
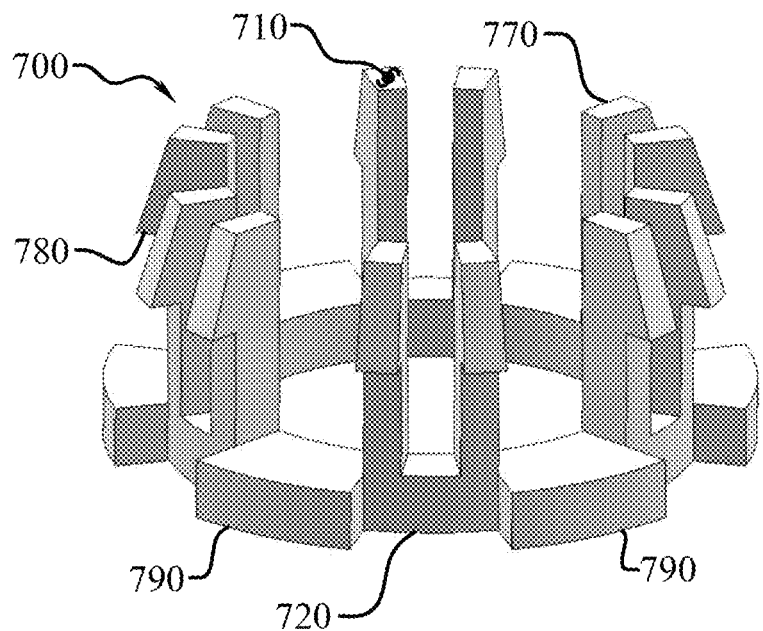
FIG. 27 is an isometric view of an embodiment of a prong ring.

The spring proximal end (610) abuts against the top insert (900), as seen in FIG. 2. The spring distal end (620) abuts against the base plate proximal end (410), with the pillar traversing the center of the spring (600), as seen in FIG. 24. The spring outer width (630) is 100 to 250 percent of the PBP width (242), in one embodiment. In another embodiment, the spring outer width (630) is 120 to 190 percent of the PBP width (242). In still another embodiment, the spring outer width (630) is greater than 140 percent of the PBP width (242). Similarly, in another embodiment the spring inner width (640) is 100 to 240 percent of the PBP width (242). In another embodiment, the spring inner width (640) is 105 to 180 percent of the PBP width (242). In yet another embodiment, the spring inner width (640) is greater than 110 percent of the PBP width (242). Furthermore, one embodiment of spring (600) may have a spring length (650) that is 110 to 250 percent of the PBP length (244). In another embodiment, the spring length (650) is 125 to 200 percent of the PBP length (244). In yet another embodiment, the spring length (650) is greater than 150 percent of the PBP length (244). The spring coil space distance (670) may be 50 to 300 percent larger than the spring material width (660) in one embodiment. While in another embodiment, the spring coil space distance (670) may be 755 to 200 percent larger than the spring material width (660). In yet another embodiment, the spring coil space distance (670) is at least 100 percent larger than the spring material width (660). It should be noted that the spring (600) does not have to be a helical wound spring. For instance in one embodiment, not shown in the drawings, the spring (600) mechanism may be, but not limited to a wave spring, a leaf spring, a tension spring, an air bladder biasing mechanism, and/or a viscoelastic biasing mechanism. Furthermore, it should be noted that some embodiments of fastener (100) may forgo a separate and distinct spring (600) mechanism. For example, an embodiment may have a biasing mechanism that is an un-separable and innate part of the top insert (900), base plate (400), and/or support ring (500), not illustrated in the drawings. FIG. 25 is an isometric drawing, and FIG. 26 is top plan view of an embodiment showing how the pillar (200), clip (300), base plate (400), support ring (500), and the spring (600) are positioned in respect to each other. It should be noted that during the assembly of the fastener (100) other parts not discussed may be installed, and the drawings should not be considered to be order of assembly sequence.

Figure 30:
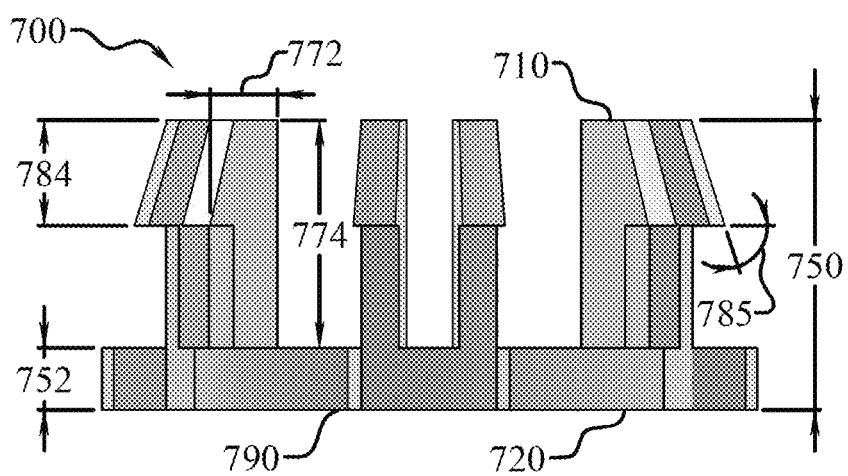
FIG. 30 is a side elevation view of an embodiment of a prong ring.
Figure 31:
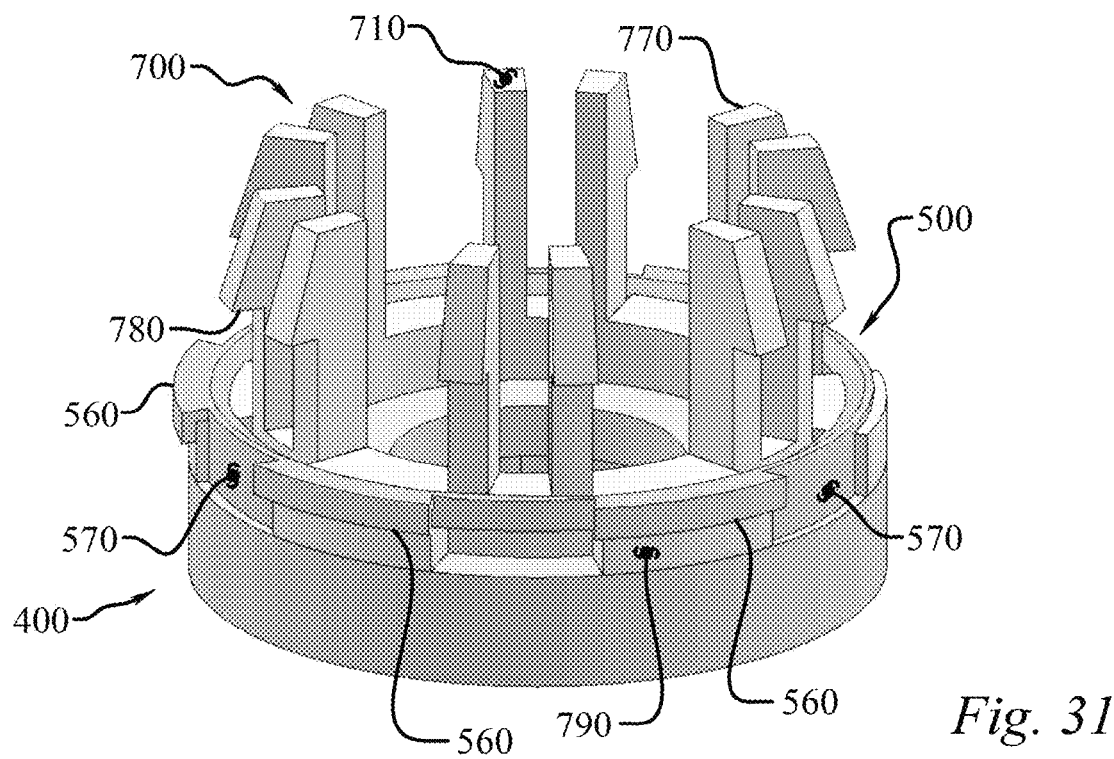
FIG. 31 is an isometric view of an embodiment of a base plate, support ring and prong ring.
Figure 32:
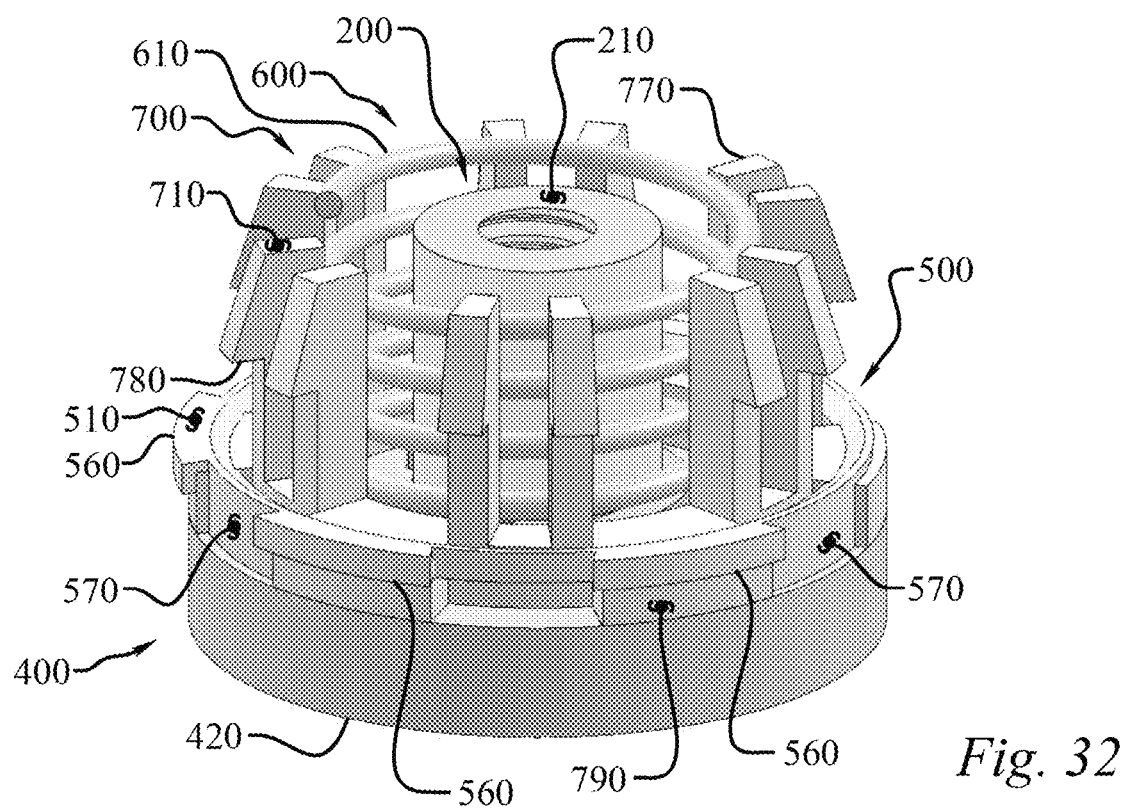
FIG. 32 is an isometric view of an embodiment of a pillar, clip, base plate, support ring, spring and prong ring.

The prong ring (700), as seen in FIGS. 27-33, may include a prong ring proximal end (710), a prong ring distal end (720), a prong ring first width (730), a prong ring second width (740), a prong ring first length (750), seen in FIG. 30, a prong ring second length (752), a prong ring bore (760), having a prong ring bore width (762), and a plurality of prongs (770), each having a prong width (772), a prong length (774), a prong first separation angle (776), a prong second separation angle (778), which in some embodiments defines the extend of an interlocking mechanism (790), and a prong latch (780). The prong latch (780) may have a prong latch width (782); a prong latch length (784), and a prong latch angle (785). In the illustrated embodiments the prong ring proximal end (710) is positioned towards the top insert (900), and the prong ring distal end (720), and/or interlocking mechanisms (790), rests upon the base plate (400), as seen in FIGS. 31 and 32. The prong ring first width (730) is substantially the same as the base plate width (430). Additionally in one embodiment of prong ring (700), the prong ring second width (740) is 70 to 97.5 percent of the prong ring first width (730). In another embodiment, the prong ring second width (740) is 75 to 95 percent of the prong ring first width (730). While in another embodiment, the prong ring second width (740) is less than 85 percent of the prong ring first width (730). The prong ring first length (752) is 100 to 150 percent of the PBP length (244) in one embodiment of prong ring (700). In another embodiment, the prong ring first length (752) is 120 to 140 percent of the PBP length (244). While in another embodiment, the prong ring first length (752) is greater than 125 percent of the PBP length (244). Additionally, in one embodiment the prong ring second length (752) is 125 to 200 percent of the SRAP length (564). While in another embodiment, the prong ring second length (752) is 140 to 180 percent of the SRAP length (564). In yet another embodiment, the prong ring second length (752) is greater than 150 percent of the SRAP length (564).

Figure 33:
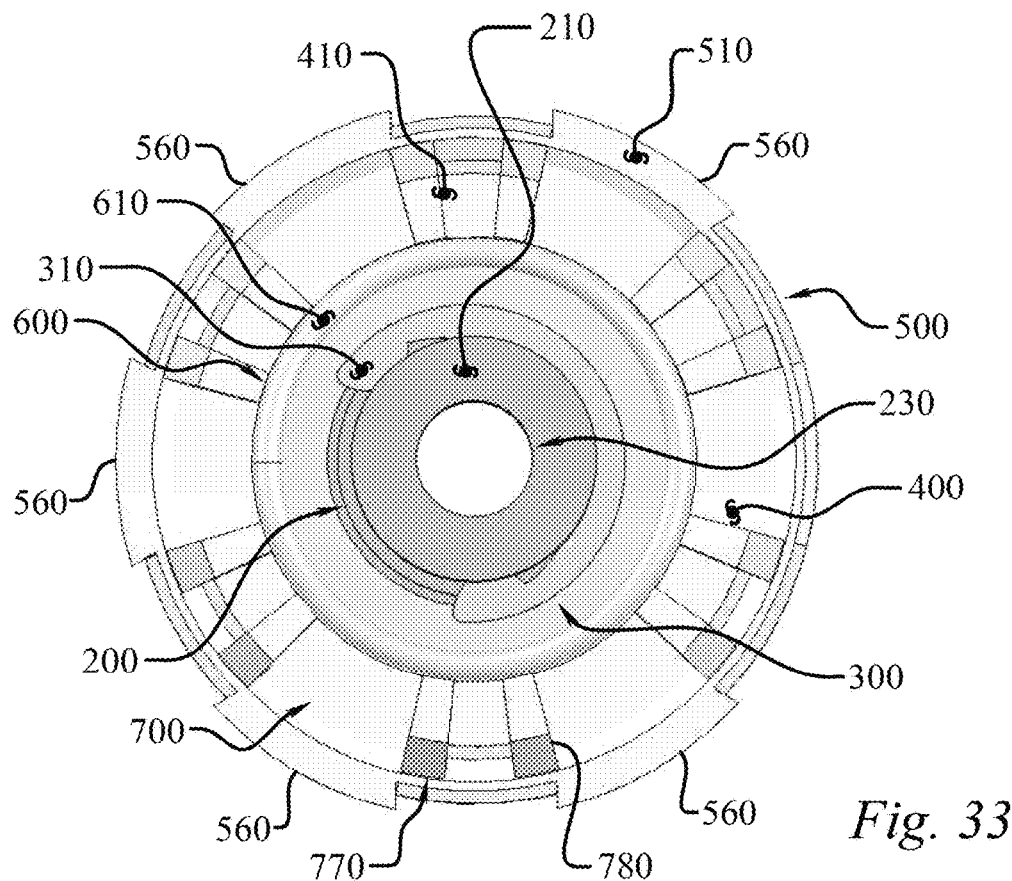
FIG. 33 is a top plan view of an embodiment of a pillar, clip, base plate, support ring, spring and prong ring.

In the illustrated embodiment the prong ring bore (760) at least partially encircles both the pillar body portion (PBP) (240) and the spring (600), as seen in FIGS. 32 and 33. Furthermore, the prong ring bore width (762) is sufficiently large enough to allow passage of the spring (600). In one embodiment the prong ring bore width (762) is such that the spring (600) must be radially deformed to fit within the prong ring bore (760).

Figure 28:
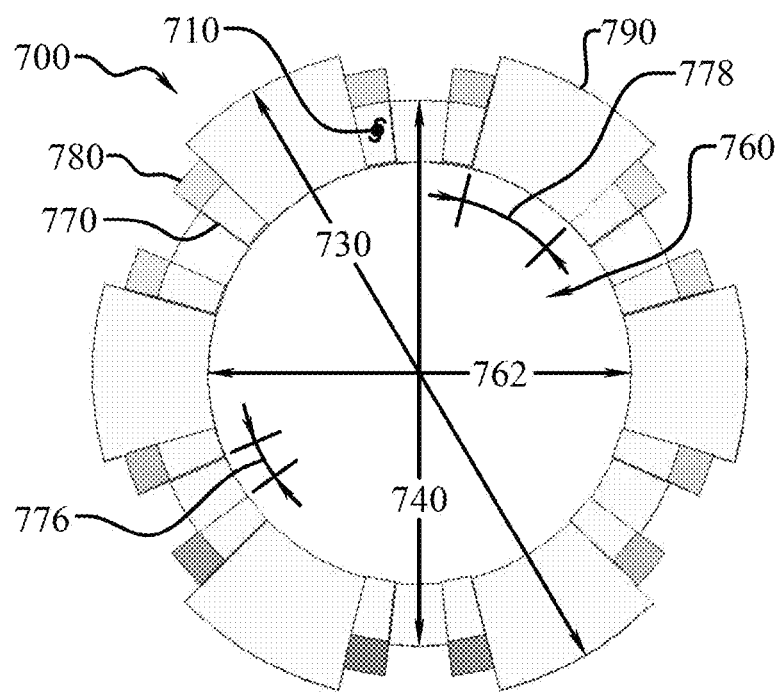
FIG. 28 is a top plan view of an embodiment of a prong ring.
Figure 29:
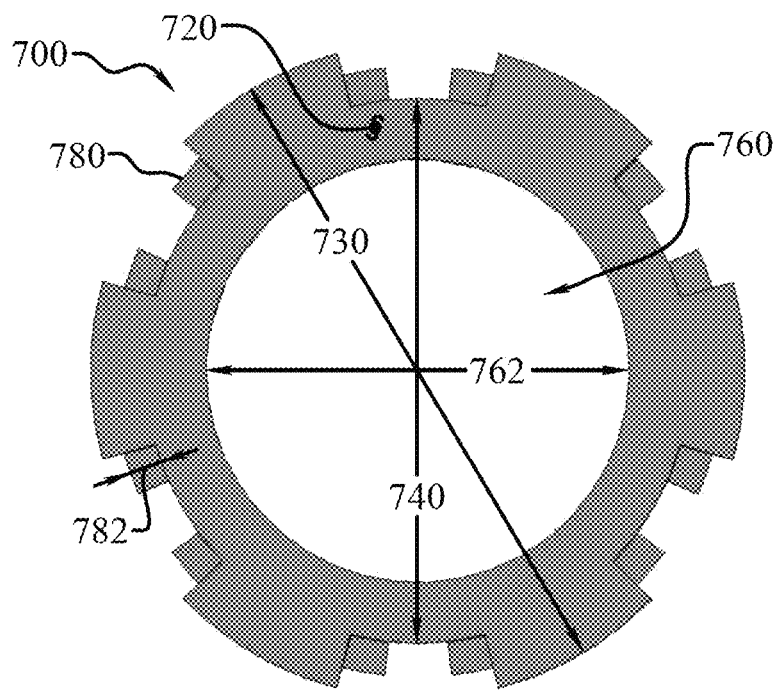
FIG. 29 is a bottom plan view of an embodiment of a prong ring.

Now directing our attention to the plurality of prongs (770), as seen in FIG. 30. In one embodiment, each prong (770) has a prong width (772) that is 10 to 70 percent of the prong length (774). In another embodiment, the prong width (772) is 20 to 60 percent of the prong length (774). In yet another embodiment, the prong width (772) is at least 25 percent of the prong length (774), and no more than 50 percent of the prong length (774) in still a further embodiment. The prong first separation angle (776) and prong second separation angle (778), as seen in FIG. 28, are configured to be geographically coordinated so the prong ring (700) may engage the top insert (900), the base plate (400), and/or the support ring (500). In one embodiment, the plurality of prongs (770) are arraigned in several dyads. The angle formed by the dyad prongs (770) closest to each other form the prong first separation angle (776) seen in FIG. 28. Similarly, the angle formed between the prong dyads, and/or the boundary of the interlocking mechanism (790), form the second separation angle (778). FIG. 28 shows an embodiment that has a total of twelve prongs (770) forming six prong (770) dyads. The invention is not limited by the number of prongs (770), prong (770) grouping, or number of interlocking mechanisms (790). For example, one embodiment may have only ten prongs (770) forming five prong (770) dyads. While another embodiment may have eight prongs (770) forming four prong (770) dyads. In still yet another embodiment may have a total of twelve prongs (770) forming 4 prong (770) triads.

In the illustrated embodiments a prong latch (780) is located on each prong (770). The prong latch (780) engages and latches the top insert (900) into place when the fastener (100) is pressed into the panel aperture (PA). The prong width (782) is a function of the prong latch length (784) and the prong latch angle (785). In one embodiment the prong first separation angle (776) is no more than the prong second separation angle (778), while in a further embodiment the prong first separation angle (776) is at least 10% less than the prong second separation angle (778), and at least 20% less, and 30% less in further embodiments. However, another series of embodiments sets a floor on this relationship such that the prong first separation angle (776) is at least 15% of the prong second separation angle (778), and at least 25%, 35%, and 45% in further embodiments.

Figure 34:
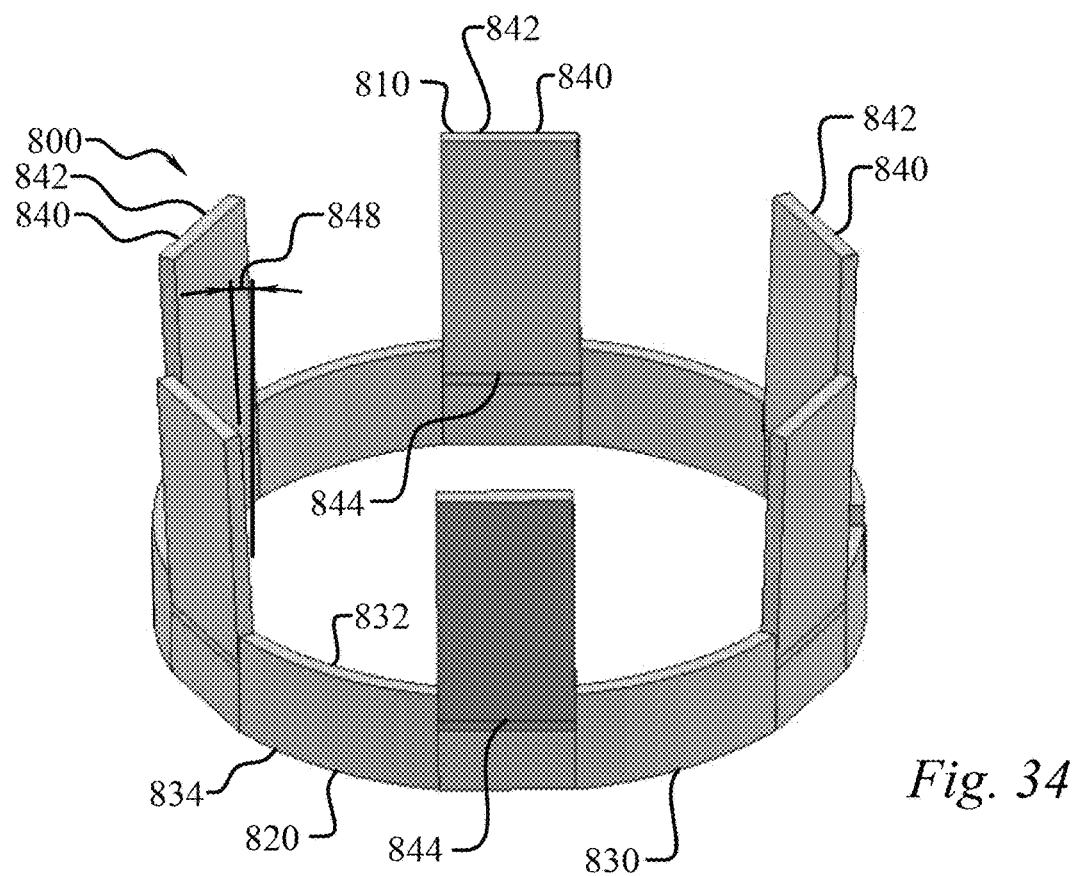
FIG. 34 is an isometric view of an embodiment of a retainer latch.
Figure 35:
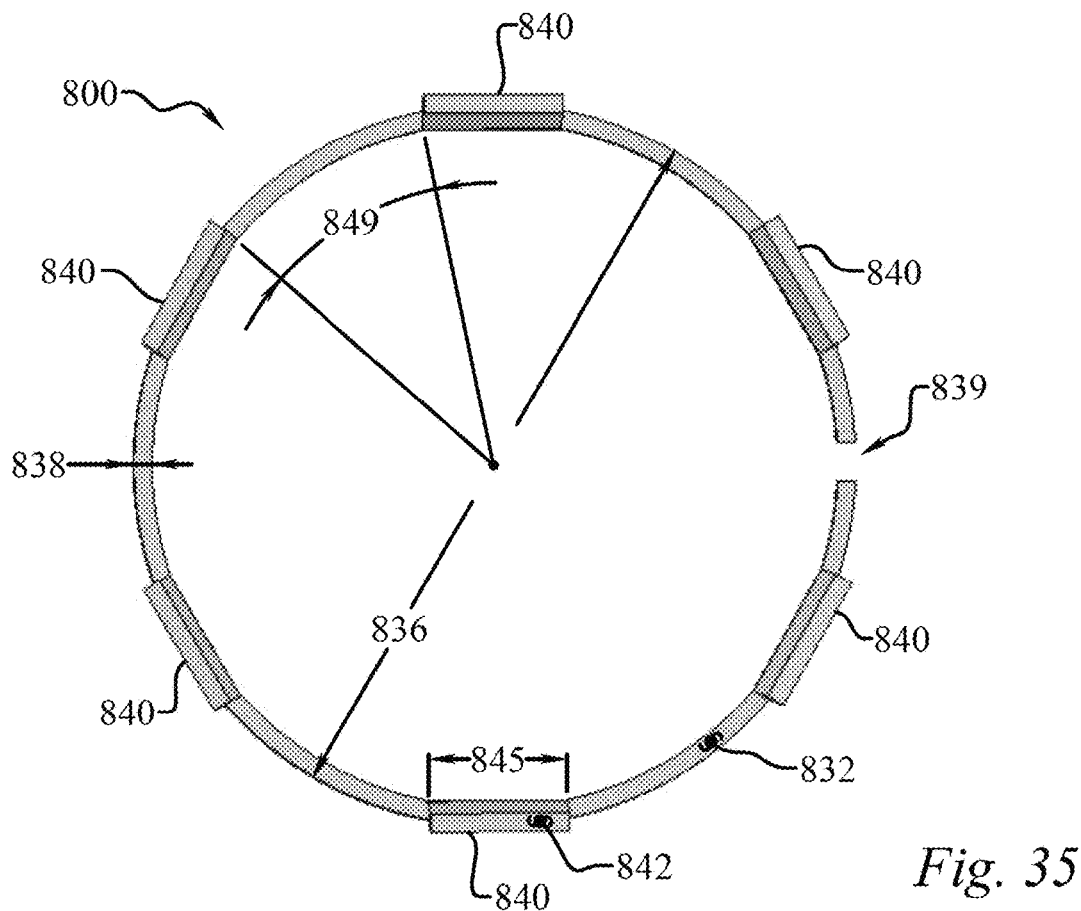
FIG. 35 is a top plan view of an embodiment of a retainer latch.
Figure 36:
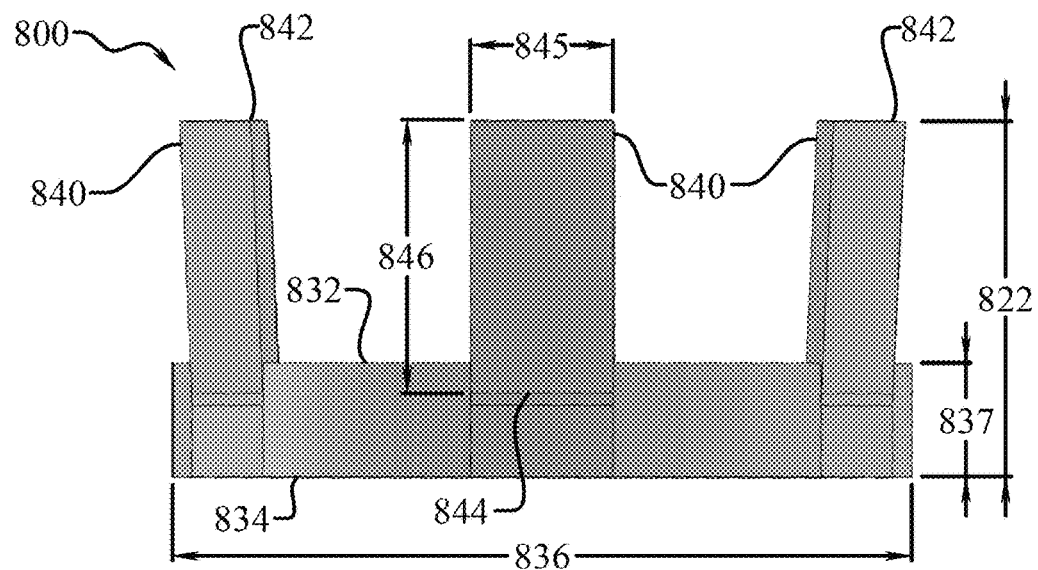
FIG. 36 is a side elevation view of an embodiment of a retainer latch.
Figure 37:
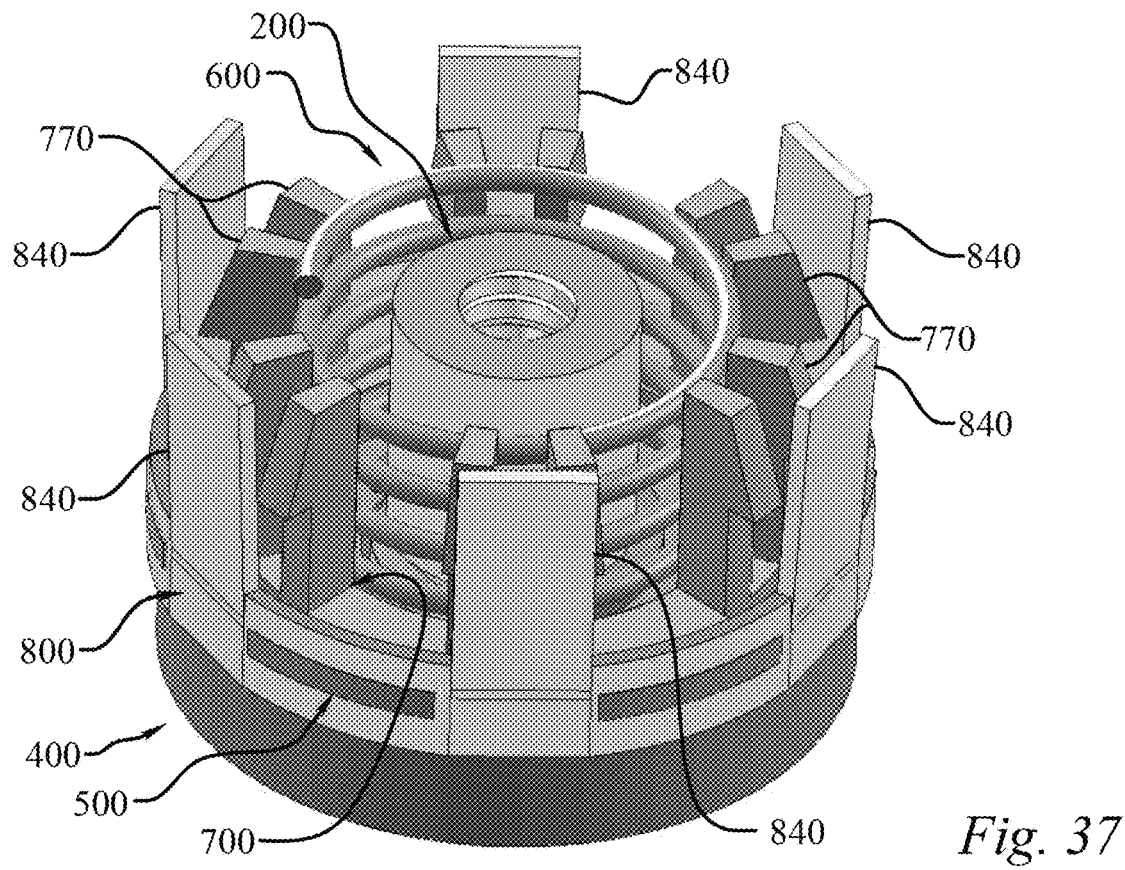
FIG. 37 is an isometric view of an embodiment of a pillar, clip, base plate, support ring, spring, prong ring and retainer latch.
Figure 38:
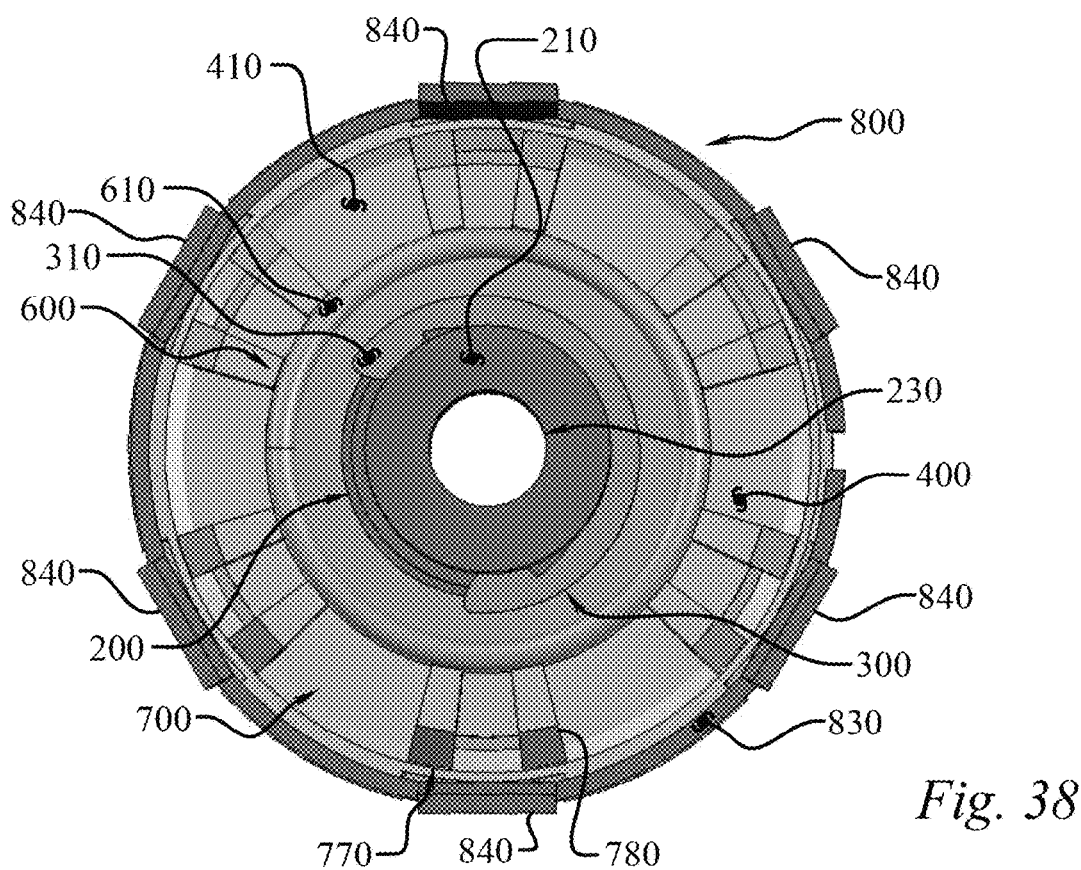
FIG. 38 is a top plan view of an embodiment of a pillar, clip, base plate, support ring, spring, prong ring and retainer latch.

Now addressing the retainer latch (800) as seen in FIGS. 33-38. The retainer latch (800) rest upon the base plate (400), and may at least partially encircle the support ring (500) and/or the prong ring (700), as seen in FIG. 37. The retainer latch (800) engages and locks with a portion of the support ring (500), namely, in the illustrated embodiments, the support ring alignment protuberances (560), which prevents both rotational and linear movement of the retainer latch (800) in relation to the support ring (500). As seen in FIG. 36, the retainer latch (800) may include a retainer latch proximal end (810), a retainer latch distal end (820), a retainer latch length (822) defined as the distance between the retainer latch proximal end (810) and the retainer latch distal end (820), and a retainer latch ring (830), which may include a retainer latch ring proximal end (832), a retainer latch ring distal end (834), a retainer latch ring width (836), a retainer latch ring length (837) defined as the distance between the retainer latch ring proximal end (832) and the retainer latch ring distal end (834), a retainer latch ring thickness (838), and a retainer latch ring expansion slot (839), seen in FIG. 35, and a plurality of retainer latch projections (840), abbreviated RLP, each having: a RLP proximal end (842), a RLP distal end (844), a RLP width (845), a RLP length (846) defined as the distance between the RLP proximal end (842) and the RLP distal end (844), a RLP tilt angle (848), and a RLP separation angle (849).

The retainer latch ring (830) provides the framework of which the plurality retainer latch projections (840) are attached, integrally or otherwise, and also encircles at least a portion of the support ring (500) and/or the prong ring (700). In one embodiment, the retainer latch ring (830) has a plurality of recesses in the inner surface of the retainer latch ring (830) to accept and cooperate with the plurality of support ring alignment protuberances (560) thereby preventing rotational and/or linear movement of the retainer latch (800) in relation to the support ring (500). In another embodiment, the retainer latch ring (830) has a plurality of apertures in the retainer latch ring (830) to accept and cooperate with the plurality of support ring alignment protuberances (560), thereby preventing both rotational and linear movement of the retainer latch (800) in relation to the support ring (500), as seen in FIG. 37.

As seen in FIG. 36, in one embodiment of an uninstalled state retainer latch (800), the retainer latch ring length (837) is 15 to 65 percent of the retainer latch length (822). In another uninstalled state embodiment, the retainer latch ring length (837) is 25 to 50 percent of the retainer latch length (822). In yet another uninstalled state embodiment, the retainer latch ring length (837) is less than 50 percent of the retainer latch length (822). The retainer latch ring width (836) is 75 to 125 percent of the prong ring first width (730), in one embodiment of fastener (100). In another embodiment, the retainer latch ring width (836) is 85 to 115 percent of the prong ring first width (730). In yet another embodiment, the retainer latch ring width (836) is less than 105 percent of the prong ring first width (730). FIG. 35 shows an embodiment of retainer latch (800) having a retainer latch ring thickness (838). In one embodiment, the retainer latch ring thickness (838) is 5 to 65 percent of the prong width (772), seen in FIG. 30. In another embodiment, the retainer latch ring thickness (838) is 10 to 50 percent of the prong width (772). In yet another embodiment, the retainer latch ring thickness (838) is less than 25 percent of the prong width (772). FIG. 35 also shows an embodiment of retainer latch (800) having a retainer latch ring expansion slot (839). The retainer latch ring expansion slot (839) allows the retainer latch ring width (836) to be temporarily enlarged in order to install the retainer latch (800) on the support ring (500). In one embodiment the retainer latch ring expansion slot (839) has a width that is at least 2.5% of the retainer latch ring width (836), and at least 5%, and at least 7.5% in further embodiments. Another series of embodiments caps this relationship so that the width of the retainer latch ring expansion slot (839) is no more than 35% of the retainer latch ring width (836), and no more than 25%, and 15% in further embodiments.

The retainer latch (800) has a plurality of retainer latch projections (840), as the embodiment in FIG. 34 illustrates. When the fastener (100) is pressed into a panel aperture (PA), the RLP proximal end (842) deflect during insertion and then rebound after passing below the outer skin, thereby engaging the top inside surface of the panel (P) and locking the fastener (100) into place. The RLP distal end (844) is permanently attached to the retainer latch ring (830), as seen in FIG. 34. Additionally, in one embodiment the RLP width (845) is 30 to 80 percent of the RLP length (846). In another embodiment, the RLP width (845) is 40 to 70 percent of the RLP length (846). In another embodiment, the RLP width (845) is less than or equal to 60 percent of the RLP length (846). The plurality of retainer latch projections (840) have a RLP tilt angle (848) with respect to the retainer latch ring (830), as seen in FIG. 34. The RLP tilt angle (848) cause the plurality of retainer latch projections (RLP) (840) to spread out in respect to the longitudinal axis of the fastener (100). When the fastener (100) is being pressed in the panel aperture (PA), the plurality of retainer latch projections (840) deflect toward the longitudinal axis as they pass through the panel (P) skin. Once the plurality of retainer latch projections (840) clear the panel (P) skin they spring back to their initial state with the RLP proximal ends (842) located beneath the panel (P) skin, thereby locking the fastener within the panel aperture (PA). In one embodiment the prong separation angle (778), seen in FIG. 28, is less than the RLP separation angle (849). The embodiment shown in FIG. 35 shows a total of six retainer latch projections (840), but the invention is not limited to having six retainer latch projections (840). For example, one embodiment of retainer latch (800) may have three retainer latch projections (840); another embodiment may have four retainer latch projections (840); while another embodiment may have eight, or more, retainer latch projections (840). The number of retainer latch projections (RLP) (840) is not limited to those listed in the previous examples and can have multiple configurations.

Now addressing the top insert (900) seen in FIG. 39. The top insert (900) may include a top insert proximal end (910), abbreviated TIPE, having a TIPE plate (912), a TIPE plate width (913), a TIPE bore (914), a TIPE plate bore width (916), a TIPE plate bore length (918), and a top insert distal end (920), a top insert width (930), a top insert length (940), defined as the distance between the top insert proximal end (910) and the top insert distal end (920), a plurality of top insert support columns (950), abbreviated TISC, each having a TISC width (952), a TISC length (954), a TISC height (955), and a TISC separation angle (956), as well as a plurality of top insert latching projections (960), abbreviated TILP, each having a TILP width (962), a TILP length (964), a TILP separation angle (966), and a TILP latch (968), as well as a top insert connection ring (970), abbreviated TICR, having a TICR proximal end (972), a TICR distal end (974), a TICR width (976), a TICR length (977), and a TICR thickness (978).

During the installation of the fastener (100) into the panel aperture (PA), pressure is applied to the top insert proximal end (910), abbreviated TIPE, thereby pressing and locking the fastener (100) into place. Each of the plurality of top insert support columns (950), abbreviated TISC, are attached to the TIPE plate (912) located at the top insert proximal end (910).

Figure 42:
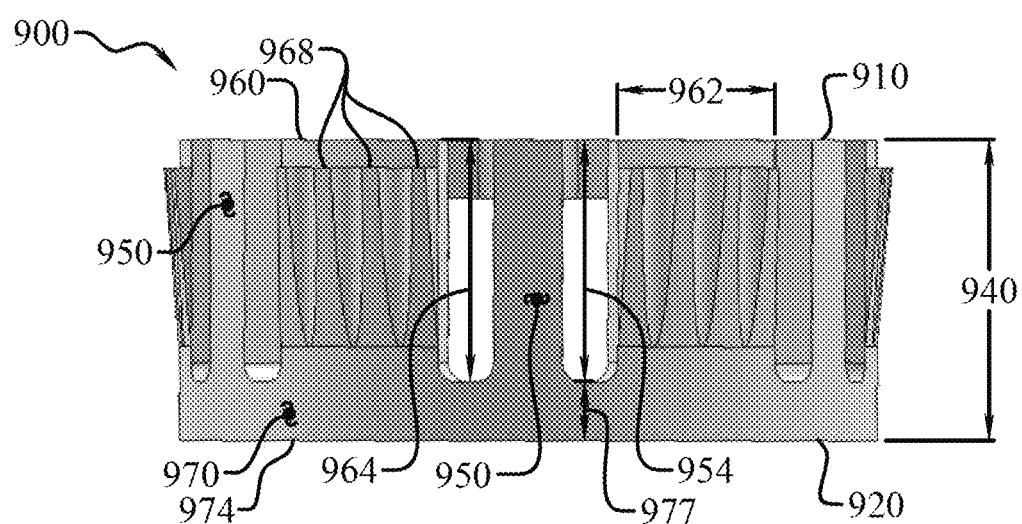
FIG. 42 is a side elevation view of an embodiment of a top insert.
Figure 43:
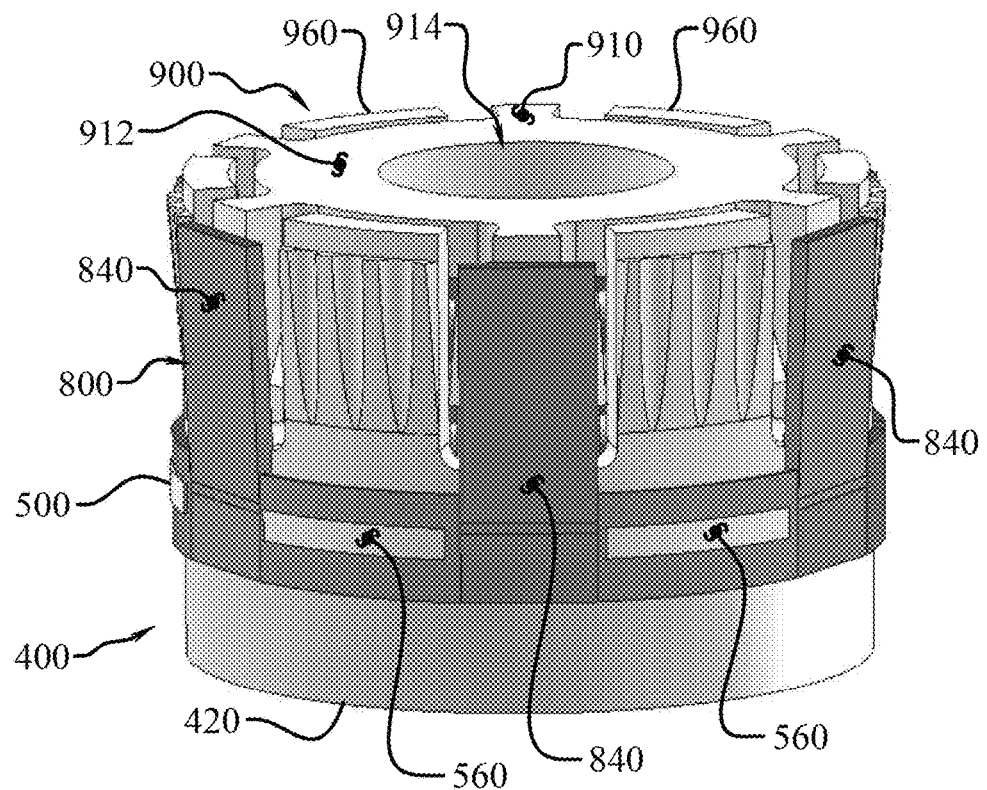
FIG. 43 is an isometric view of an embodiment showing a pillar, clip, prong ring, retainer latch and top insert.

Additionally, the spring proximal end (610) biases against the TIPE plate (912), as seen in FIGS. 2, 37 and 43. Furthermore, each of the plurality of the top insert support columns (950) are connected to the TICR proximal end (972) of the top insert connection ring (970), as seen in FIGS. 39, 40 and 42. Additionally in one embodiment of top insert (900), the TISC width (952), seen in FIG. 39, is 10 to 60 percent of the TISC length (954), seen in FIG. 42. In another embodiment the TISC width (952) is less than or equal to 50 percent of the TISC length (954). In one embodiment of top insert (900), the TISC separation angle (956), seen in FIG. 40, is 30 to 200 percent of the TIMP separation angle (966). In another embodiment, the TISC separation angle (956) is 50 to 125 percent of the TIMP separation angle (966). In yet another embodiment, the TISC separation angle (956) is less than or equal to 90 percent of the TIMP separation angle (966).

Figure 41:
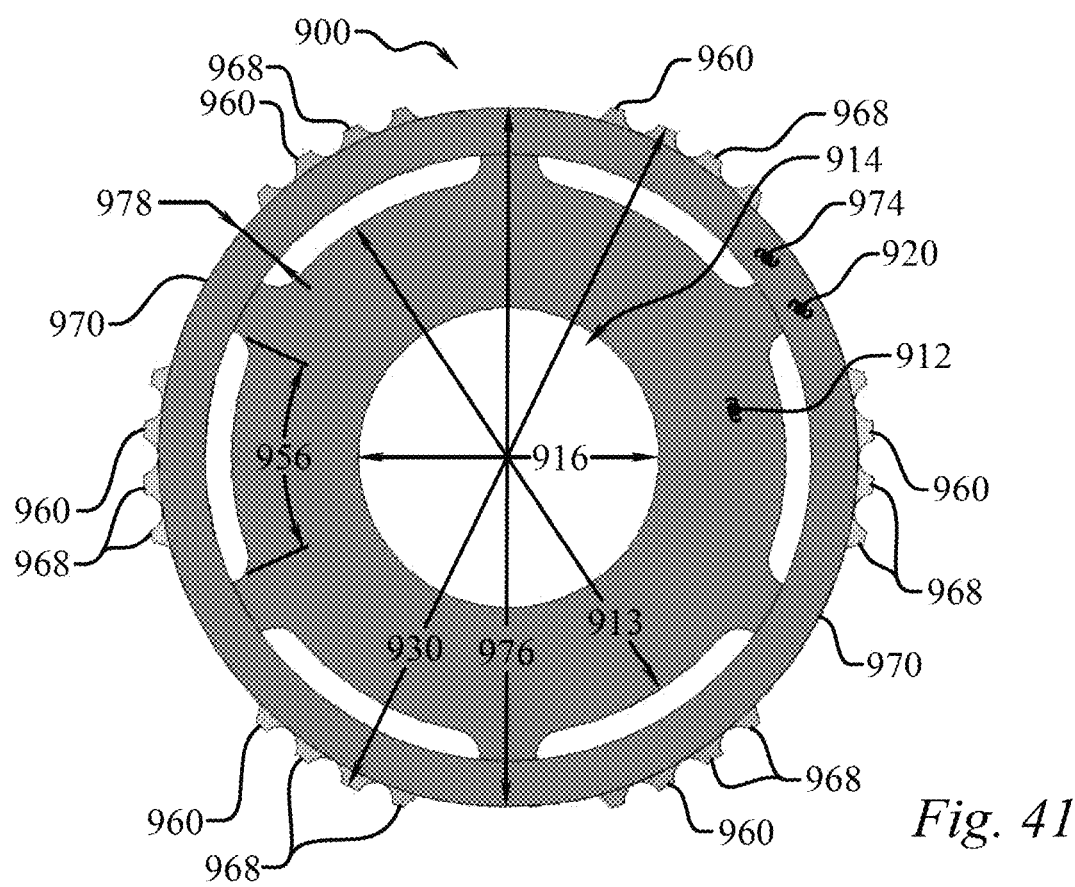
FIG. 41 is a bottom plan view of an embodiment of a top insert.
Figure 44:
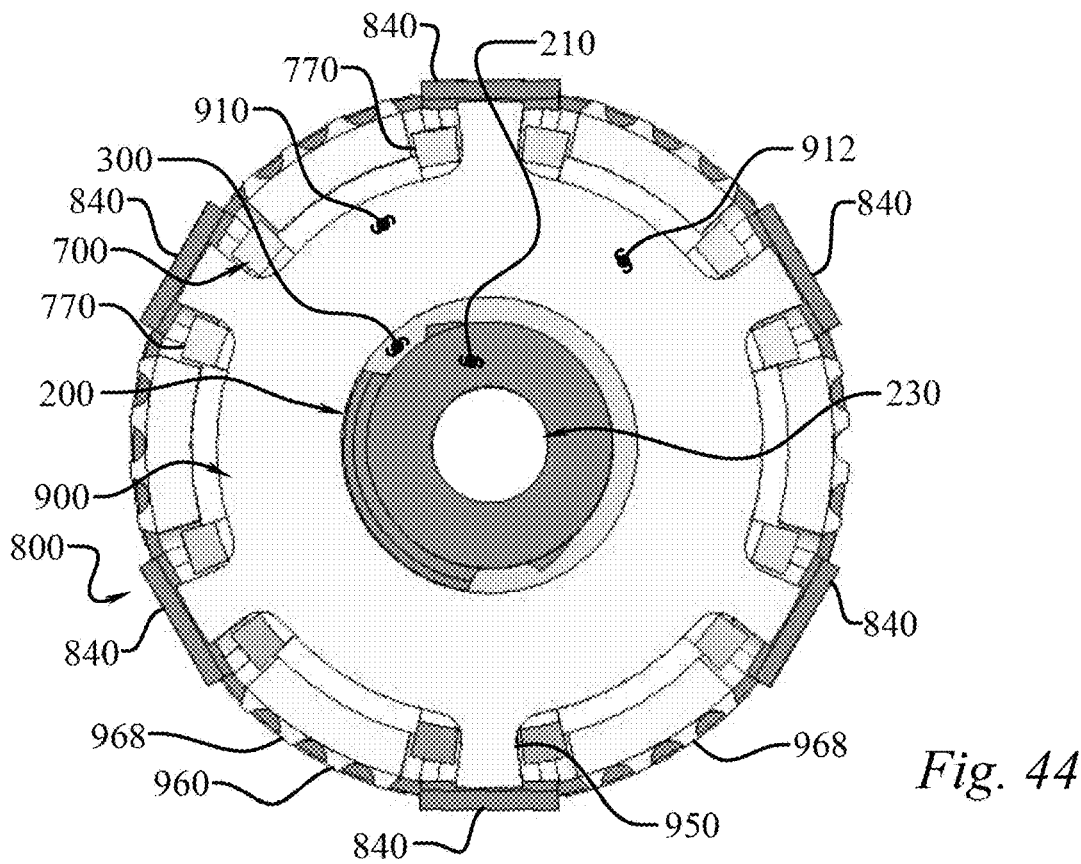
FIG. 44 is a top plan view of an embodiment showing a base plate, support ring, prong ring, retainer latch and top insert.

In similar fashion to the top insert support columns (950) being connected to the TICR proximal end (972) of the top insert connection ring (970), the plurality of top insert latching projections (960) are attached to the TICR proximal end (972) of the top insert connection ring (970). In one embodiment of top insert (900), the TILP width (962), seen in FIG. 42, is 30 to 90 percent of the TILP length (964). While in another embodiment the TILP width (962) is 45 to 80 percent of the TILP length (964). In yet another embodiment, the TILP width (962) is greater or equal to 50 percent of the TILP length (964). The TILP separation angle (966) is large enough to accommodate at least one prong (770) and a top insert column (950), while maintaining alignment of the prong (770) and the top insert (900), as seen in FIGS. 41 and 44. Furthermore, in an embodiment each of the plurality of top insert projections (960) has at least one TILP latch (968) which engages the inner surface of a panel (P) skin once the fastener (100) is installed. The top insert width (930), seen in FIG. 40, is defined as the distance between a TILP latch (968) and a TILP latch (968) on the opposite side of the top insert (900). Additionally, the top insert width (930) in the uninstalled state is larger than the panel aperture (PA). Like the plurality of retainer latch projections (840), the plurality of top insert latching projections (960) flex towards the center of the fastener (100) during installation in the panel aperture (PA), causing the top insert width (930) to decrease. Once the fastener (100) has been pressed into its final position the plurality of top insert latching projections (960) spring outwards once they clear the panel (P) skin surrounding the panel aperture (PA); thereby locking the fastener (100) in place. Having multiple components incorporating this characteristic increases the reliability and safety of the fastener (100), but also the complexity.

In order to allow for clearance of the plurality of top insert latching projections (TILP) (960) while they are flexing towards the center of the fastener (100), the TIPE plate width (913), seen in FIG. 40, is less than the TICR width (976), seen in FIG. 41. In one embodiment of top insert (900), the TIPE width (913) is 60 to 95 percent of the TICR width (976). In another embodiment the TIPE width (913) is 65 to 90 percent of the TICR width (976). In still another embodiment the TIPE width (913) is less than or equal to 85 percent of the TICR width (976). Additionally, in one embodiment the TICR thickness (978), seen in FIG. 41, is 30 to 90 percent of the TISC height (955), seen in FIG. 40. In another embodiment the TICR thickness (978) is 40 to 80 percent of the TISC height (955). In yet another embodiment the TICR thickness (978) is at least 50 percent of the TISC height (955), as seen in FIG. 40. The TIPE bore (914) is located in the center of the TIPE plate (912) and substantially aligns with the pillar proximal end (210) when the fastener (100) is in a fully assembled state, as seen in FIGS. 1 and 44. Consequently, in one embodiment the TIPE bore width (916), seen in FIG. 40, is larger than the pillar bore width (234), seen in FIG. 5a, while in another embodiment the TIPE bore width (916) is larger than the PBP width (242). In one embodiment of top insert (900), the TIPE bore width (916) at least 10% greater than the pillar bore width (234), and at least 20%, 30%, and 40% greater in additional embodiments. While another series of embodiments caps this relations and has the TIPE bore width (916) no more than 200% greater than the pillar bore width (234), an no more than 175%, 150%, and 125% greater in additional embodiments. Additionally in one embodiment the TIPE plate bore length (918), seen in FIG. 39, is 50 to 200 percent of the TICR length (977), seen in FIG. 42. While in another embodiment, the TIPE plate bore length (918) is 75 to 175 percent of the TICR length (977). In yet another embodiment, the TIPE plate bore length (918) is 90 to 125% of the TICR length (977).

Figure 45:
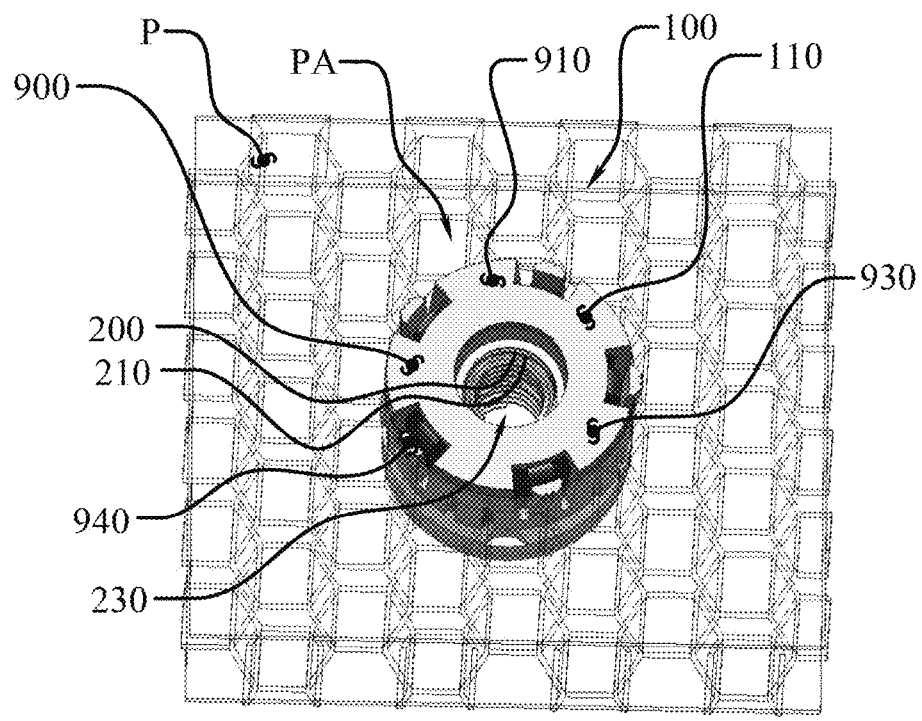
FIG. 45 is an isometric view of an embodiment of a panel fastener installed in a honeycomb panel.
Figure 46:
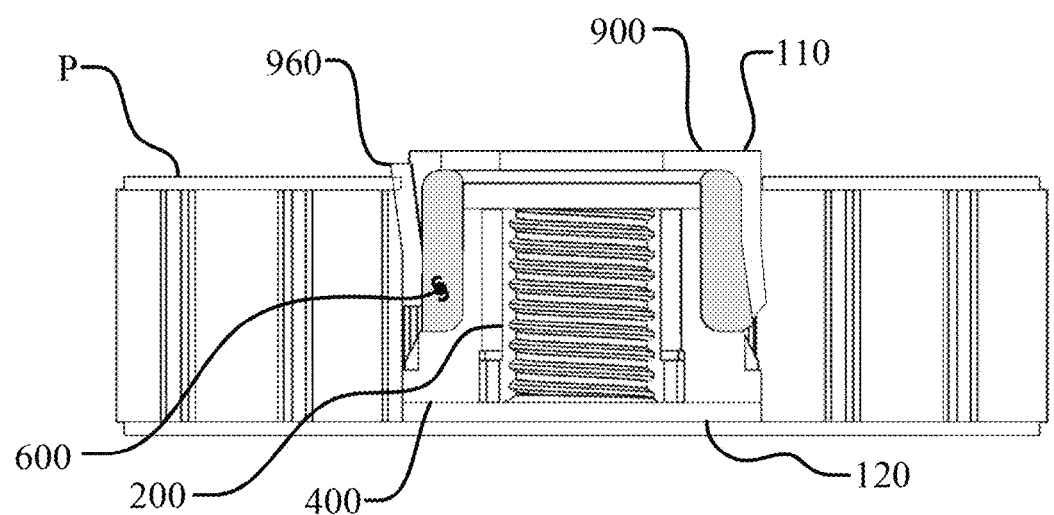
FIG. 46 is a cross-section view of an embodiment of a panel fastener installed in a honeycomb panel.
Figure 47:
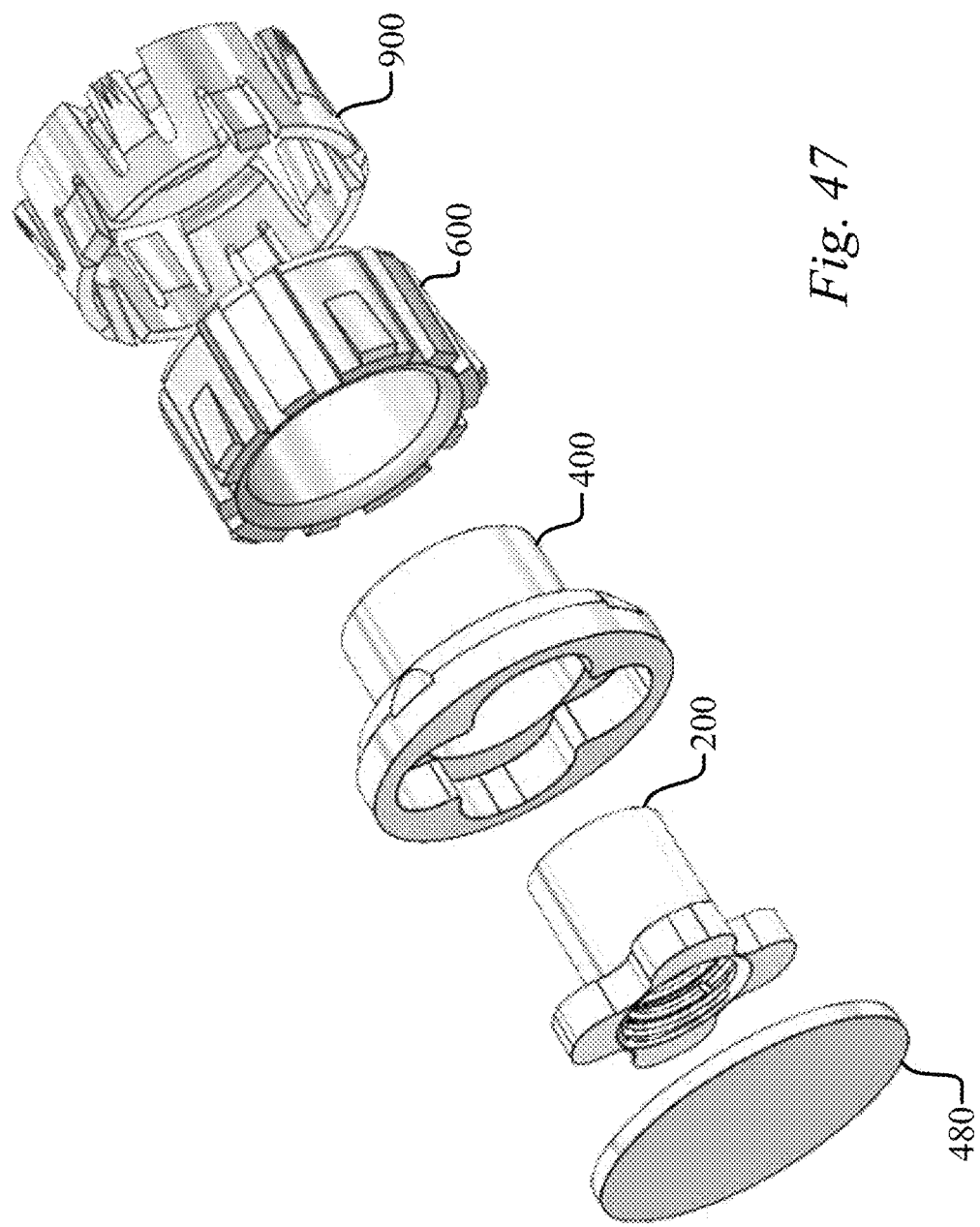
FIG. 47 is an exploded isometric view of an embodiment of panel fastener.
Figure 48:
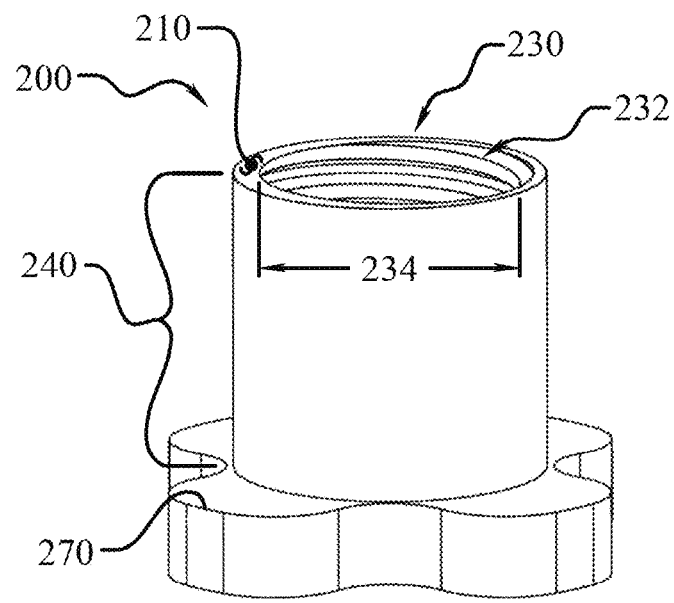
FIG. 48 is an isometric view of an embodiment of an insert pillar.
Figure 49:
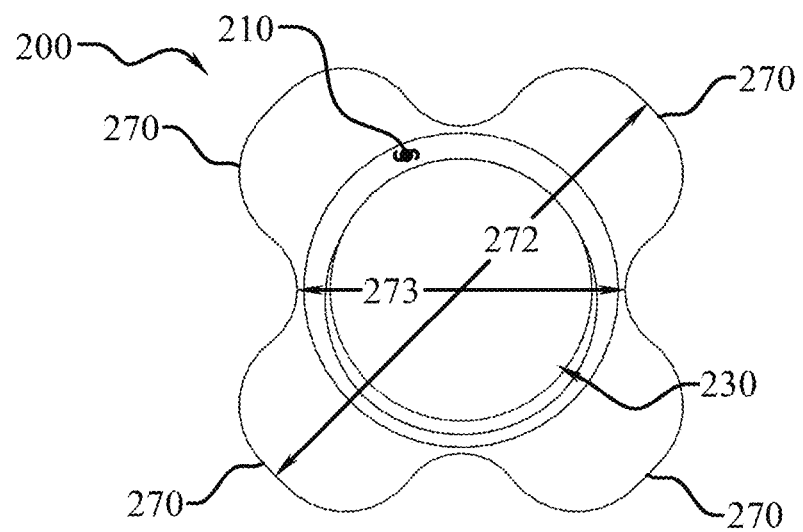
FIG. 49 is a top plan view of an embodiment of an insert pillar.
Figure 50A:
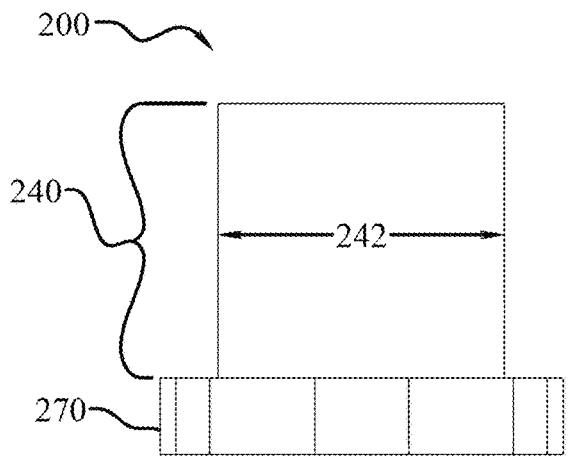
FIG. 50A is a side elevation view of an embodiment of an insert pillar.
Figure 50B:
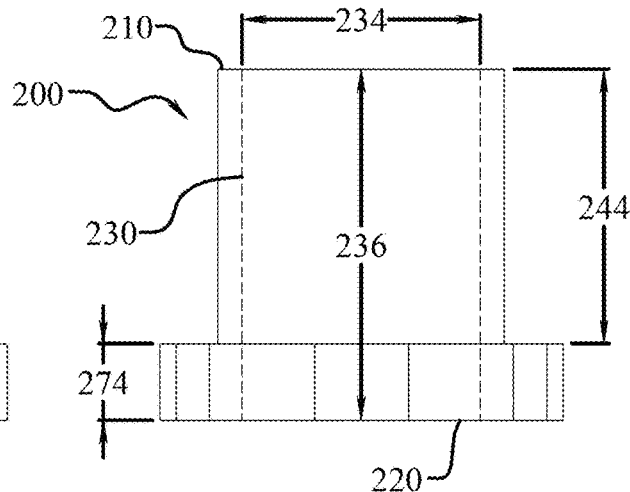
FIG. 50B is another side elevation view of an embodiment of an insert pillar.
Figure 51:
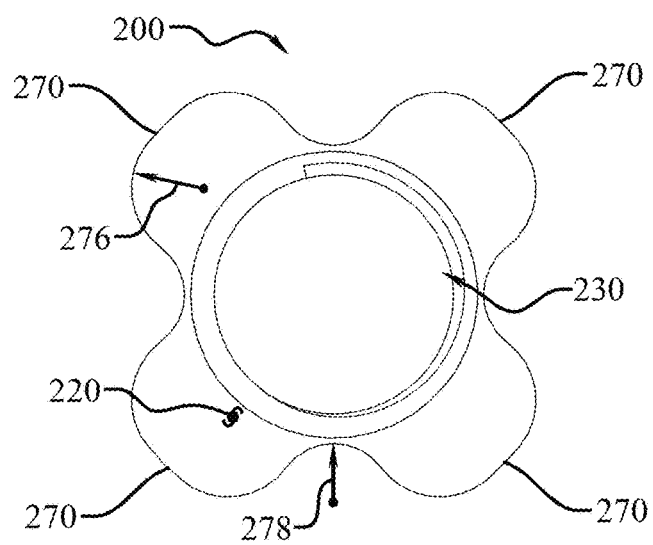
FIG. 51 is a bottom plan view of an embodiment of an insert pillar.
Figure 74:
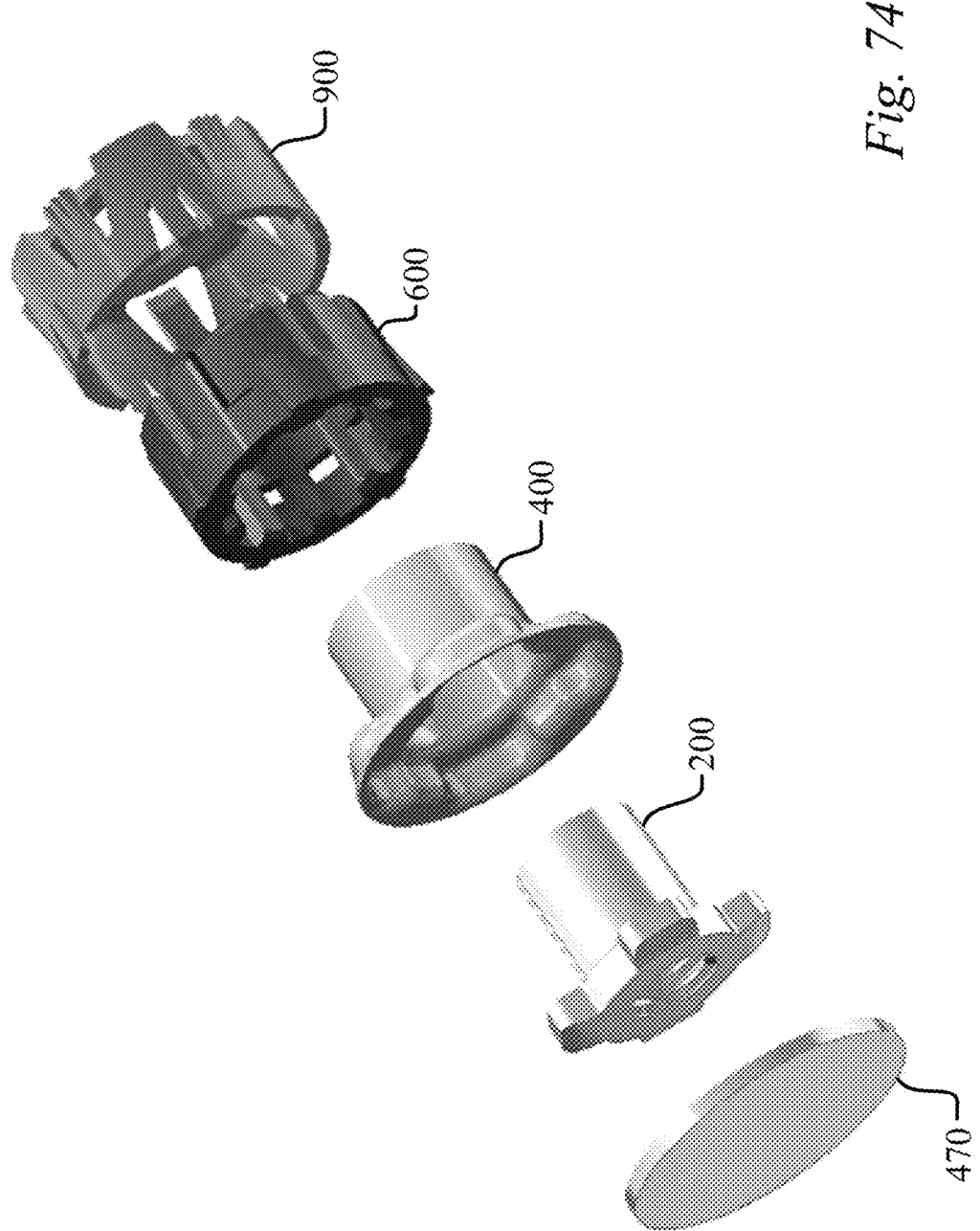
FIG. 74 is an exploded isometric view of an embodiment of panel fastener.
Figure 75:
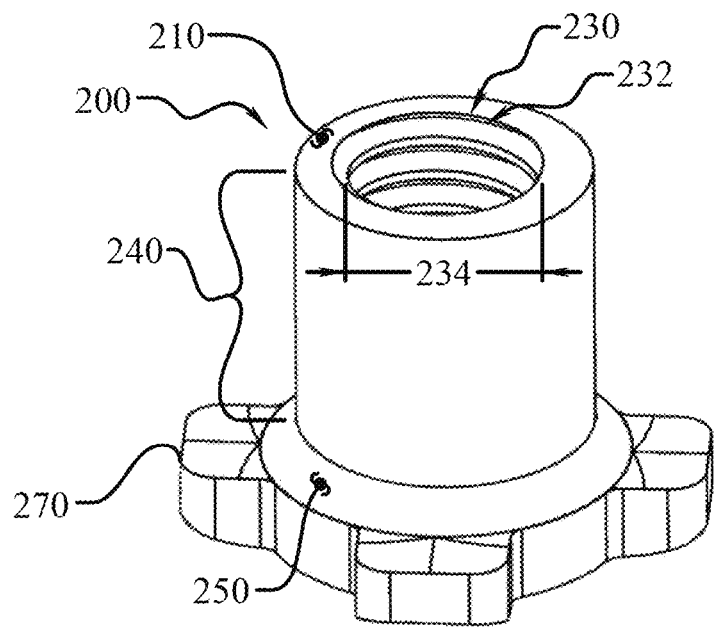
FIG. 75 is an isometric view of an embodiment of an insert pillar.
Figure 76:
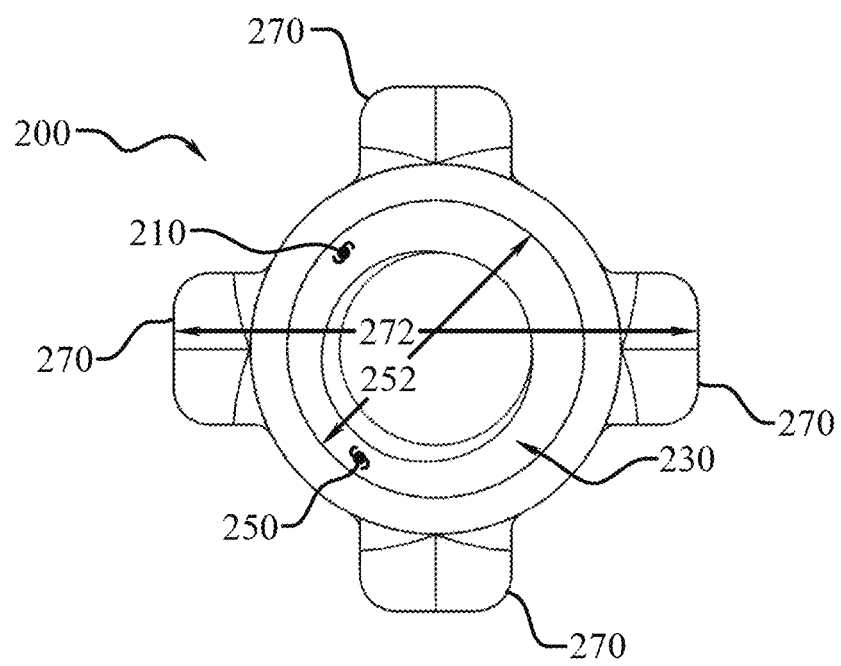
FIG. 76 is a top plan view of an embodiment of an insert pillar.
Figure 77A:
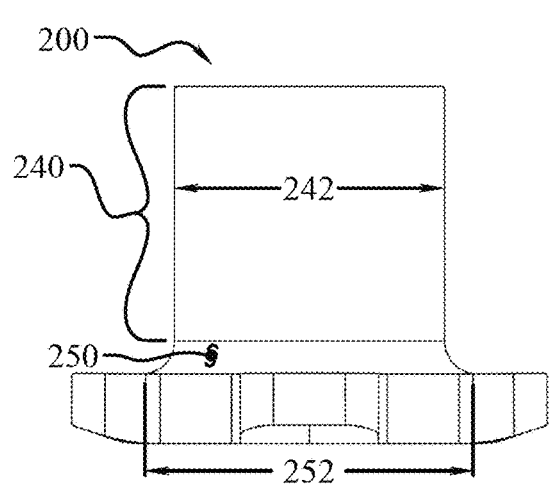
FIG. 77A is a side elevation view of an embodiment of an insert pillar.
Figure 77B:
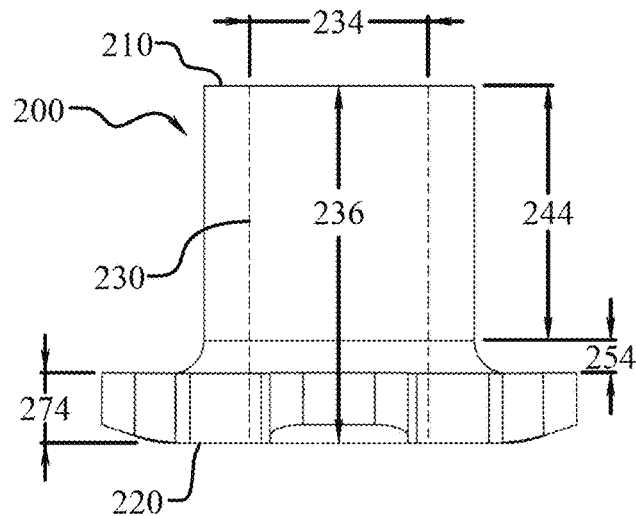
FIG. 77B is another side elevation view of an embodiment of an insert pillar.
Figure 78:
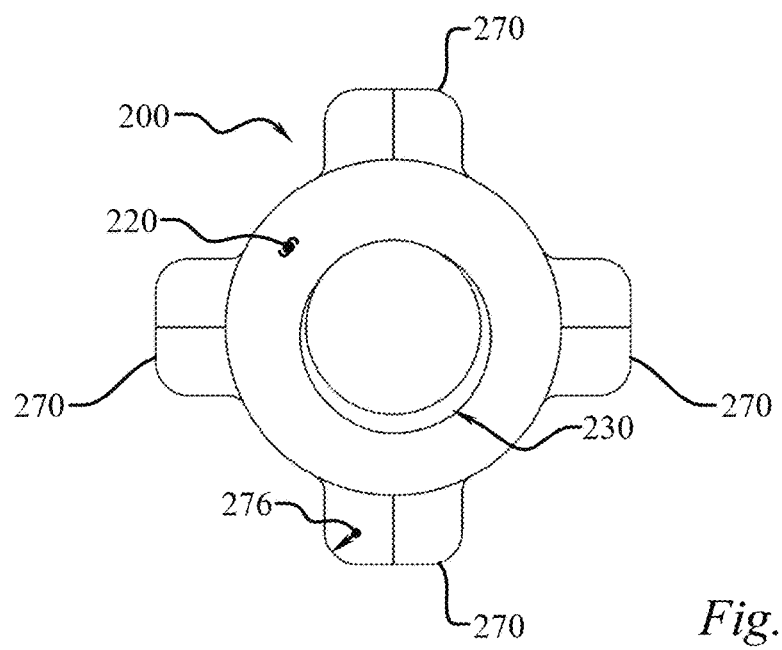
FIG. 78 is a bottom plan view of an embodiment of an insert pillar.
Figure 79:
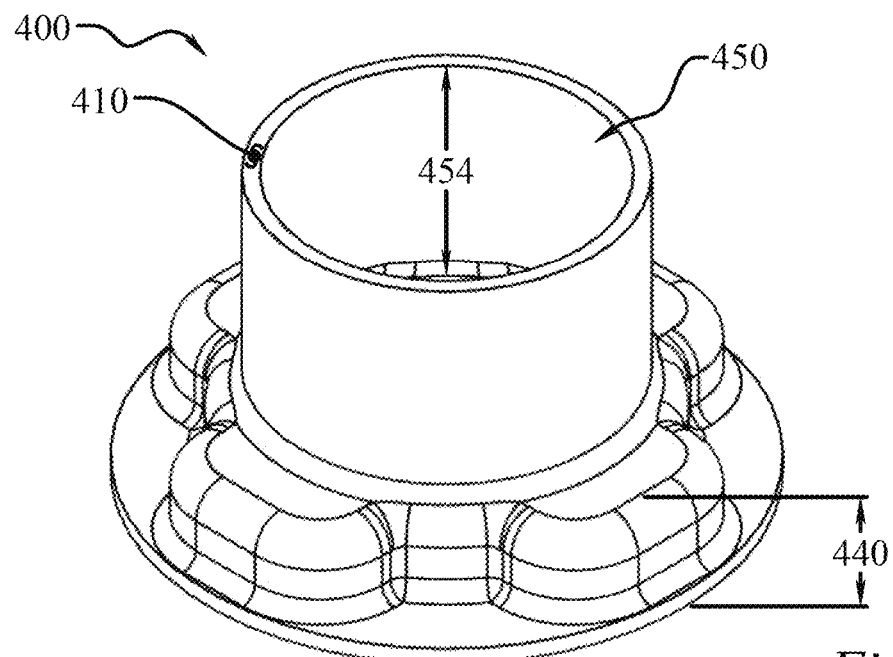
FIG. 79 is an isometric view of an embodiment of a base plate.
Figure 80:
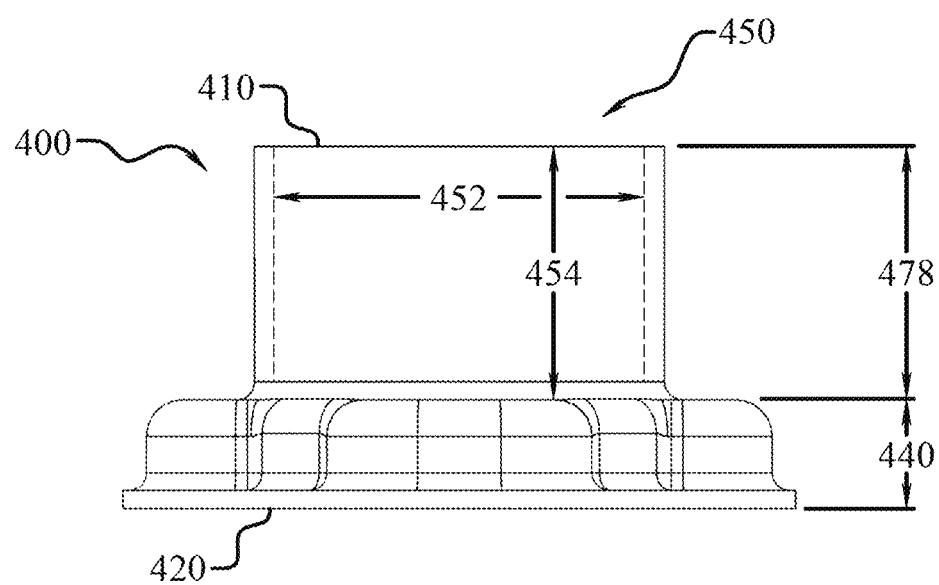
FIG. 80 is a side elevation view of an embodiment of a base plate.
Figure 81:
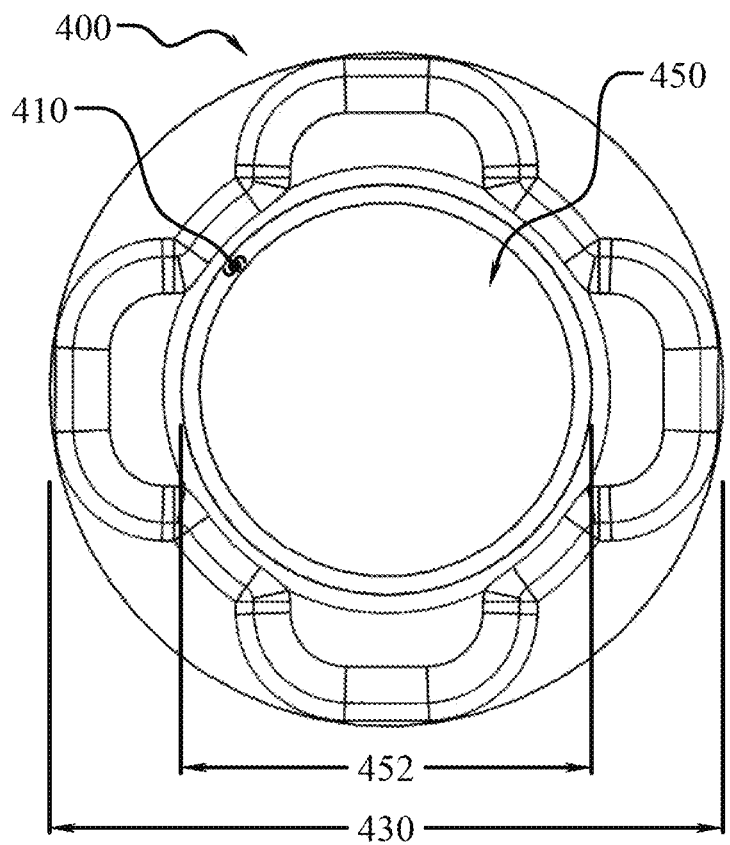
FIG. 81 is a top plan view of an embodiment of a base plate.
Figure 82:
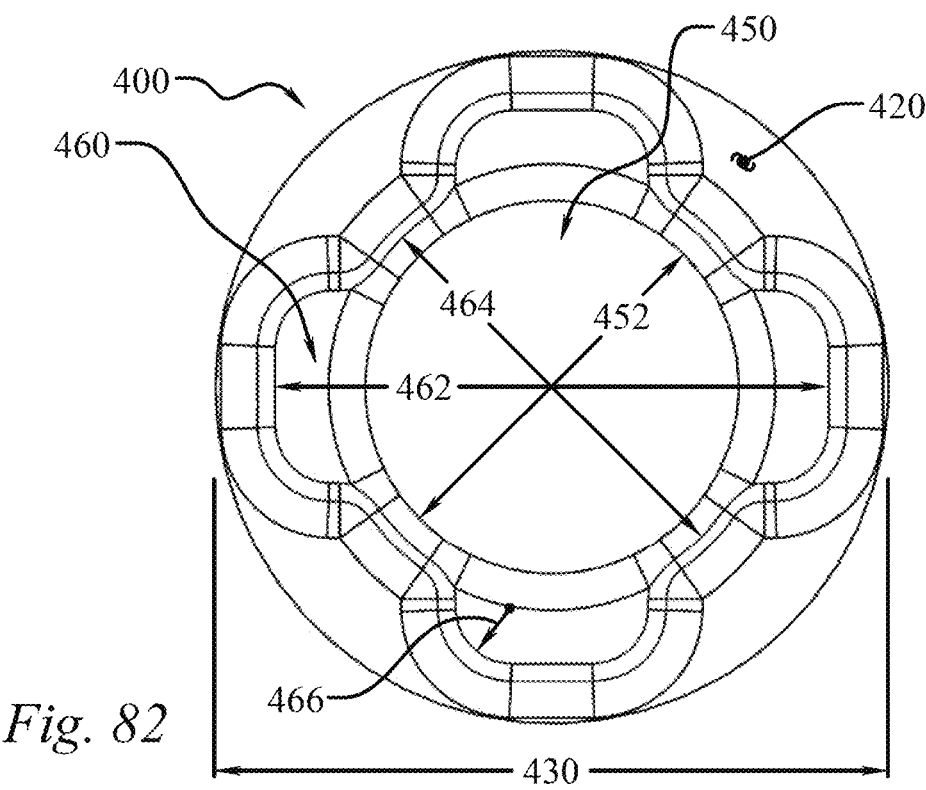
FIG. 82 is a bottom plan view of an embodiment of a base plate.
Figure 83:
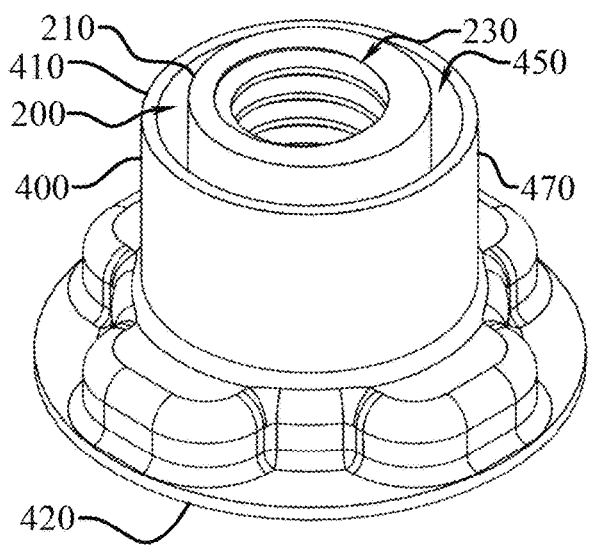
FIG. 83 is an isometric view of an embodiment of a base plate with an installed pillar.
Figure 84:
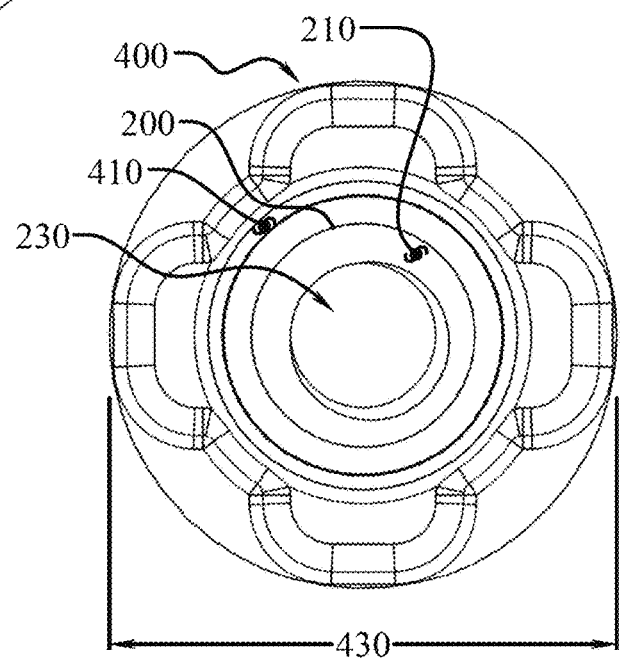
FIG. 84 is a top plan view of an embodiment of a base plate with an installed pillar.
Figure 85:
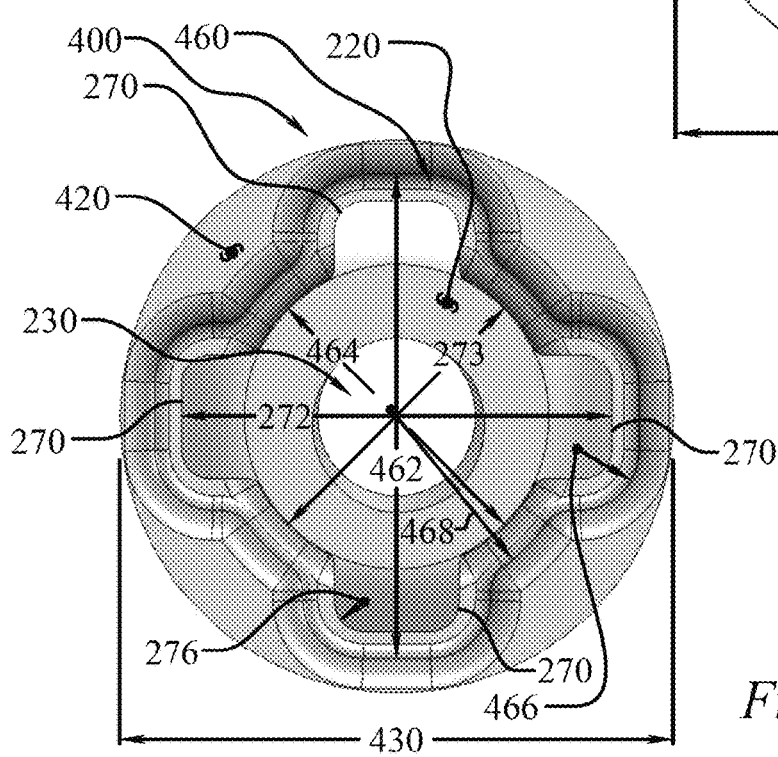
FIG. 85 is a bottom plan view of an embodiment of a base plate with an installed pillar.
Figure 86:
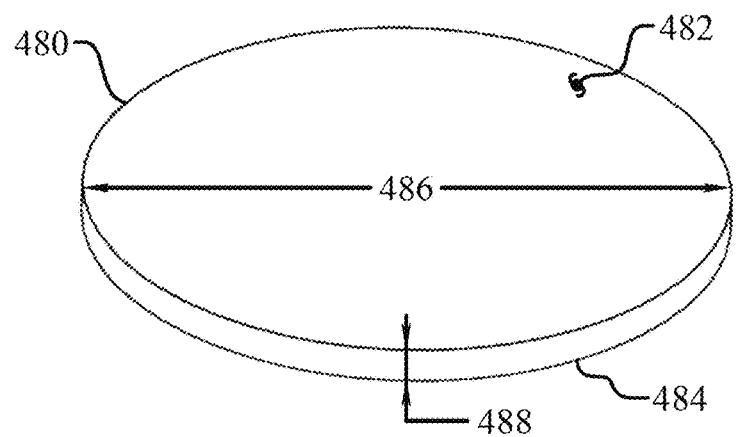
FIG. 86 is an isometric view of an embodiment of a base plate foundation.
Figure 87:
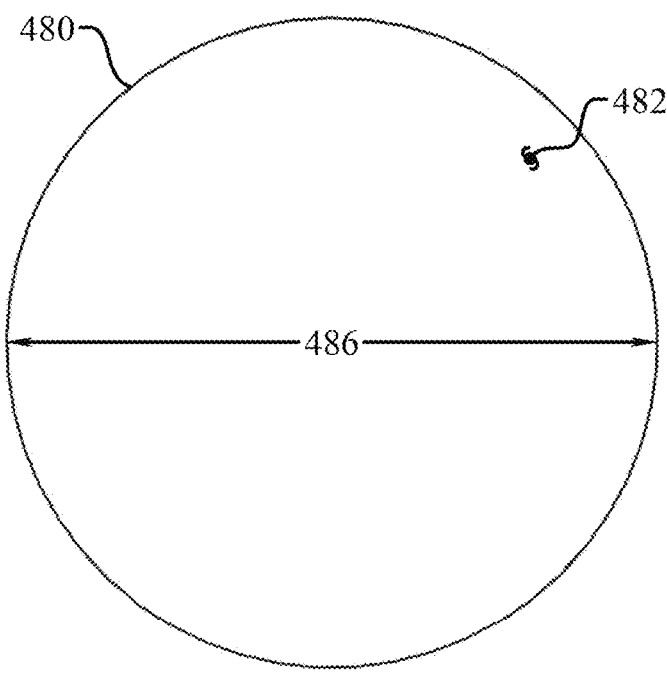
FIG. 87 is a top plan view of an embodiment of a base plate foundation.
Figure 88:
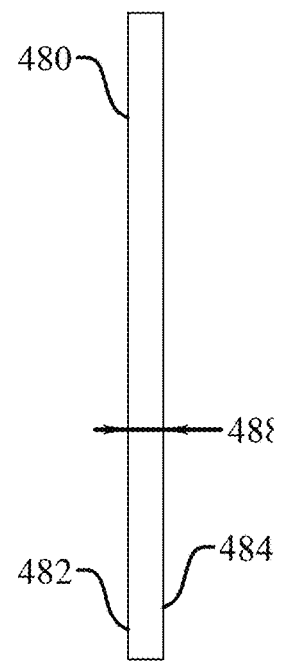
FIG. 88 is a side elevation view of an embodiment of a base plate foundation.
Figure 101:
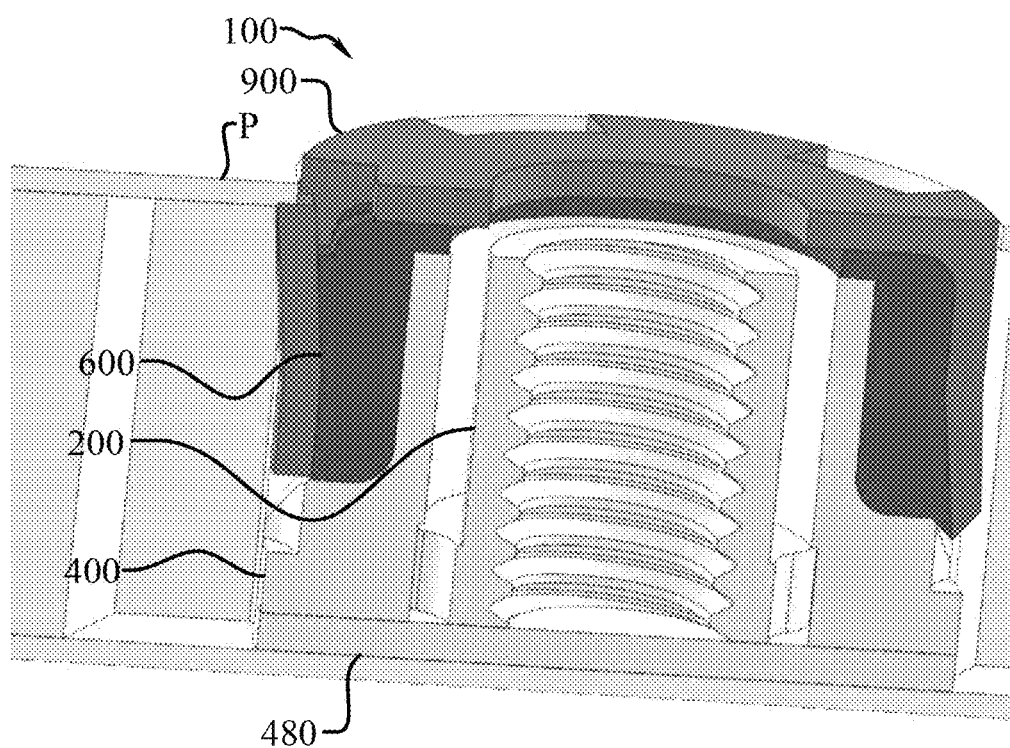
FIG. 101 is an isometric cross-section view of an embodiment of a panel fastener in an installed state within a honeycomb panel.

FIGS. 45-101 illustrate additional embodiments of the fastener (100). As seen in FIGS. 47 and 74, these embodiments may incorporate a similar insert pillar (200), which is received in a base plate (400), both containing similar cooperating structures and attributes as previously disclosed. The spring (600) of this embodiment cooperates with the base plate (400) and is entrapped by the top insert (900). These embodiments may also include a base plate foundation (480) entrapping the insert pillar (200) at least partially within the base plate (400).

Figure 52:
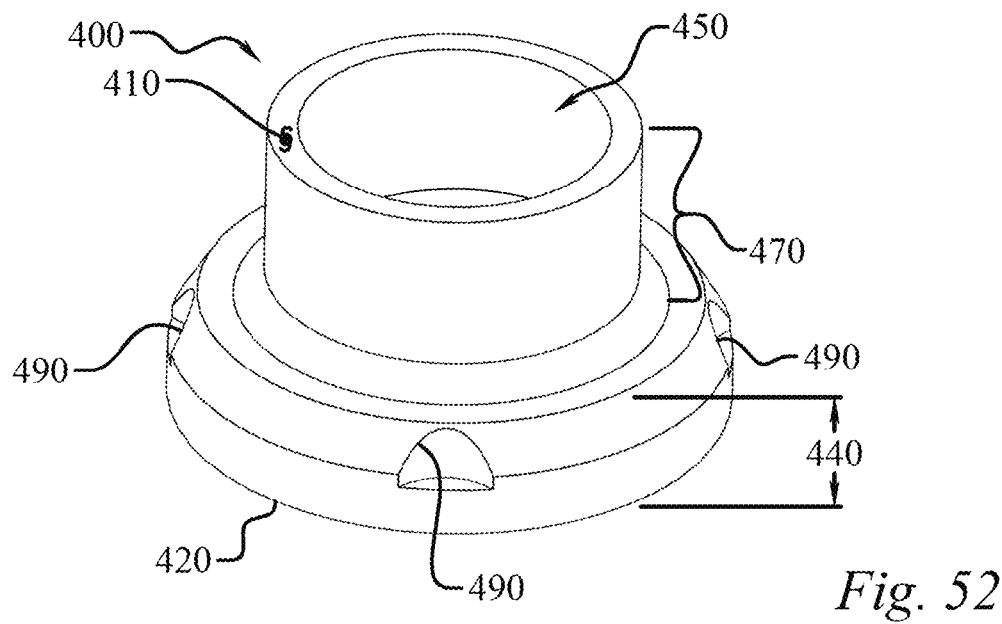
FIG. 52 is an isometric view of an embodiment of a base plate.

With respect to the insert pillar (200) of FIG. 45 and later, all of the disclosure relating to FIGS. 1-44 applies and will not be repeated for the sake of brevity. With respect to the base plate (400) of FIG. 45 and later, all of the disclosure relating to FIGS. 1-44 applies and will not be repeated for the sake of brevity. Notable differences in the insert pillar (200) of FIG. 45 and later include the lack of a pillar spacing portion (250) and pillar clip receiving portion (260), seen in FIG. 3, as they are not needed in these later embodiments. Further, notable different in the base plate (400) of FIG. 45 and later include the addition of a base plate pillar shroud (470) extending from the base plate (400), as seen in FIG. 52. As illustrated, the base plate length (440) in this embodiment extends from the base plate distal end (420) to the transition in diameter, or shelf, created by the base plate pillar shroud (470), therefore all the relationships discussed with respect to FIGS. 1-44 and the base plate length (440) are applicable to the later embodiments.

Figure 53:
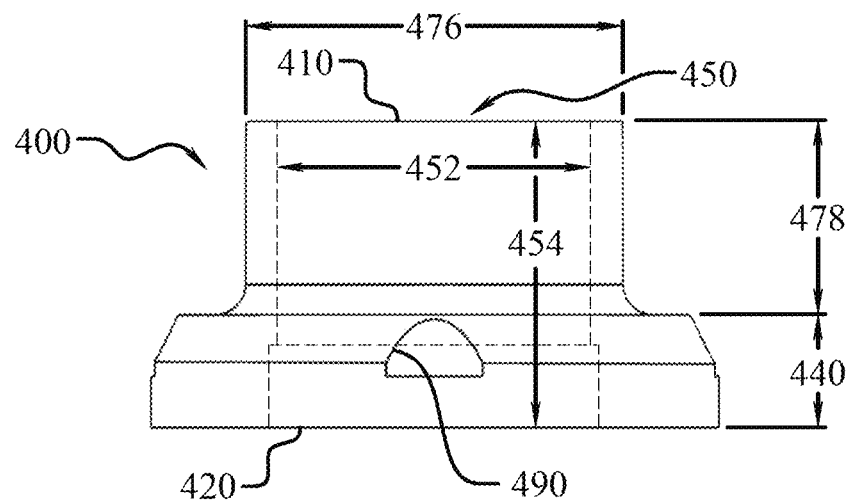
FIG. 53 is a side elevation view of an embodiment of a base plate.
Figure 54:
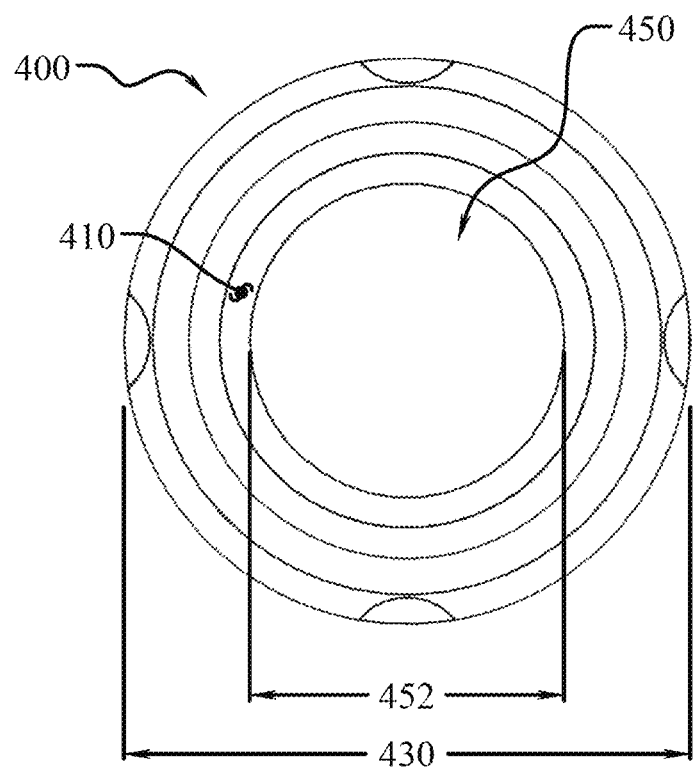
FIG. 54 is a top plan view of an embodiment of a base plate.
Figure 55:
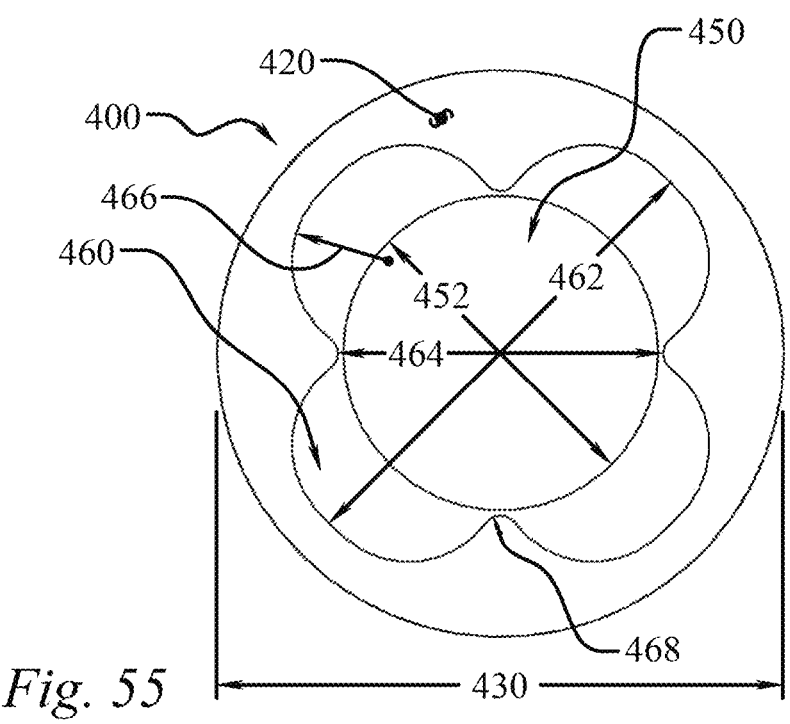
FIG. 55 is a bottom plan view of an embodiment of a base plate.
Figure 56:
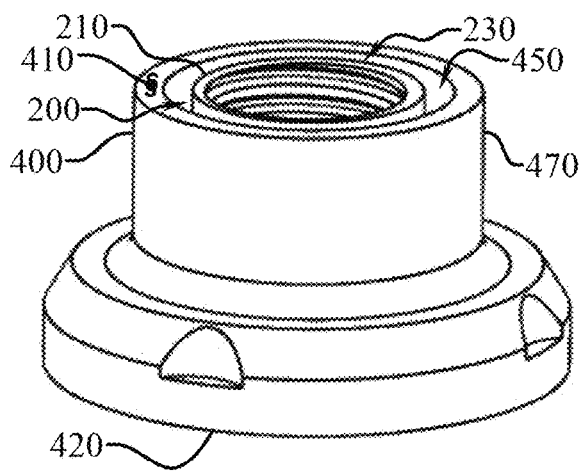
FIG. 56 is an isometric view of an embodiment of a base plate with an installed pillar.
Figure 57:
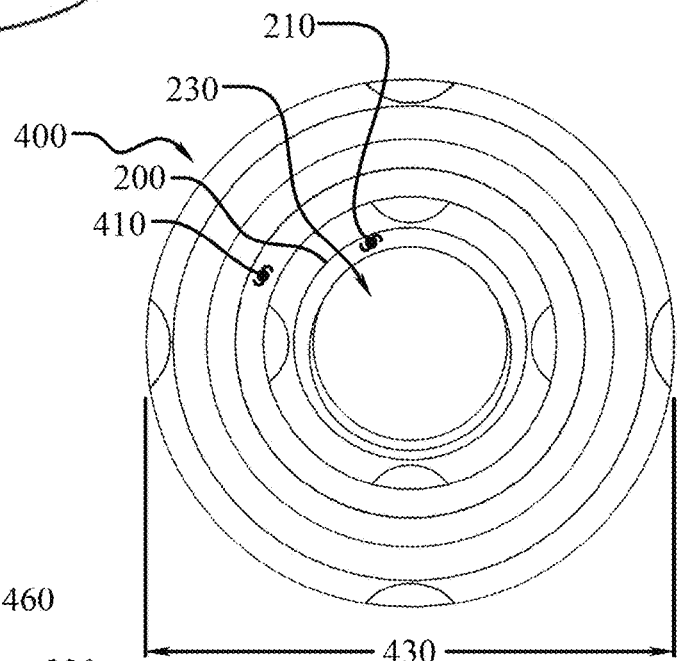
FIG. 57 is a top plan view of an embodiment of a base plate with an installed pillar.
Figure 58:
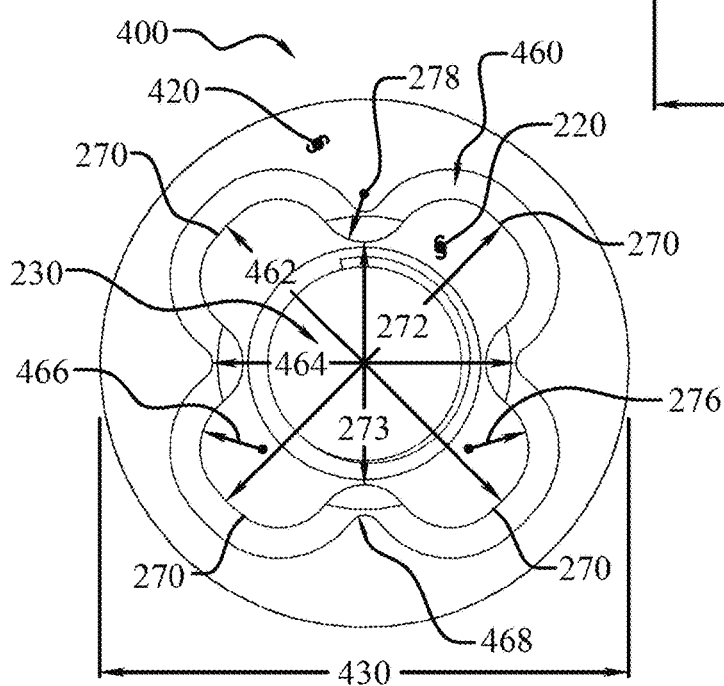
FIG. 58 is a bottom plan view of an embodiment of a base plate with an installed pillar.

The base plate pillar shroud (470), abbreviated BPPS, may be integral with the base plate (400) or permanently attached to it. The base plate pillar shroud (470) has a BPPS proximal end (472), a BBPS distal end (474), a BBPS width (476), and a BBPS length (478), as seen in FIG. 53. The BBPS width (476) is at least 5% less than the base plate width (430), shown in FIG. 11 and applicable to the base plate distal end (420) of FIG. 53, and in a further embodiment it is at least 10% less, and at least 15% less in still another embodiment. However, in another series of embodiments ensuring adequate wall thickness of the base plate pillar shroud (470), the BBPS width (476) is at least 40% of the base plate width (430), and at least 50%, and 60% in further embodiments. Additionally, the BBPS length (478) is at least 50% greater than the base plate length (440), and at least 75% greater, 100% greater, and 125% greater in further embodiments. However, another series of embodiments caps this relationship so that the BBPS length (478) is no more than 300% greater than the base plate length (440), and no more than 250% greater, and 200% greater in additional embodiments.

The base plate (400) may further include one or more bonding recesses (490), as seen in FIGS. 52-53, and equally as applicable to all embodiments, which help with the torsional strength of the fastener (100) if it is bonded, via epoxy or other potting agent, in the panel (P). In one embodiment the volume of the one or more bonding recesses (490) is at least 2.5% of the volume of the base plate (400). The volume of the bonding recess (490) is determined by filling the recesses with clay until it is indistinguishable from the contour of the adjacent portions of the base plate (400), then removing the clay and measuring the volume via a water displacement method, and comparing it to the volume of the base plate (400), also determined using a water displacement method. In an additional embodiment the volume of the one or more bonding recesses (490) is at least 5% of the volume of the base plate (400), and at least 7.5% and 10% in further embodiments. In one embodiment the bonding recesses (490) align with aspects of the spring (600) and/or top insert (900) to ensure bonding material may flow from an insertion point at the fastener proximal end (110) to the fastener distal end (120). For example in FIG. 66 the bonding recess (490) aligns with a spring slot (680), formed in the spring (600) so that bonding material may easily move from the spring slot (680) to the bonding recess (490). While the radial depth of the bonding recess (490) shown in FIG. 66 is not illustrated as being such that a portion of the bonding recess (490) is located a recess proximity distance from the longitudinal axis of the fastener (100) that is less than an adjacent distance from the exterior surface of the spring (600) to the longitudinal axis, in one embodiment, not illustrated but easily understood, the recess proximity distance is such that a portion of the bonding recess (490) is within the boundary of the spring slot (680) at the spring distal end (620) to further promote the flow of bonding agent.

Figure 67:
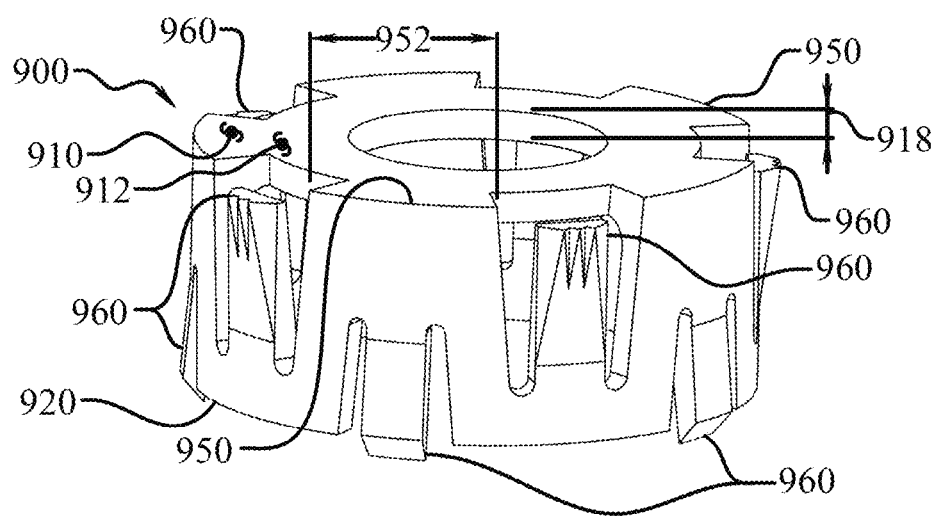
FIG. 67 is an isometric view of an embodiment of a top insert.
Figure 68:
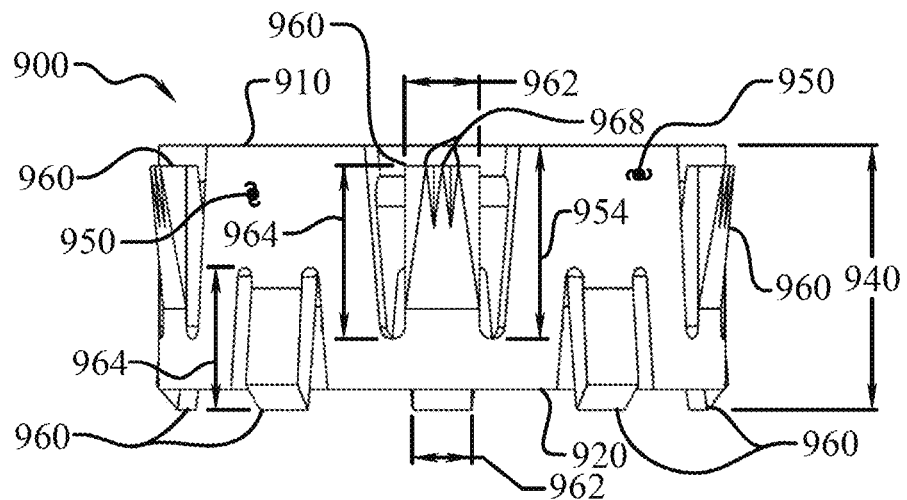
FIG. 68 is a side elevation view of an embodiment of a top insert.
Figure 69:
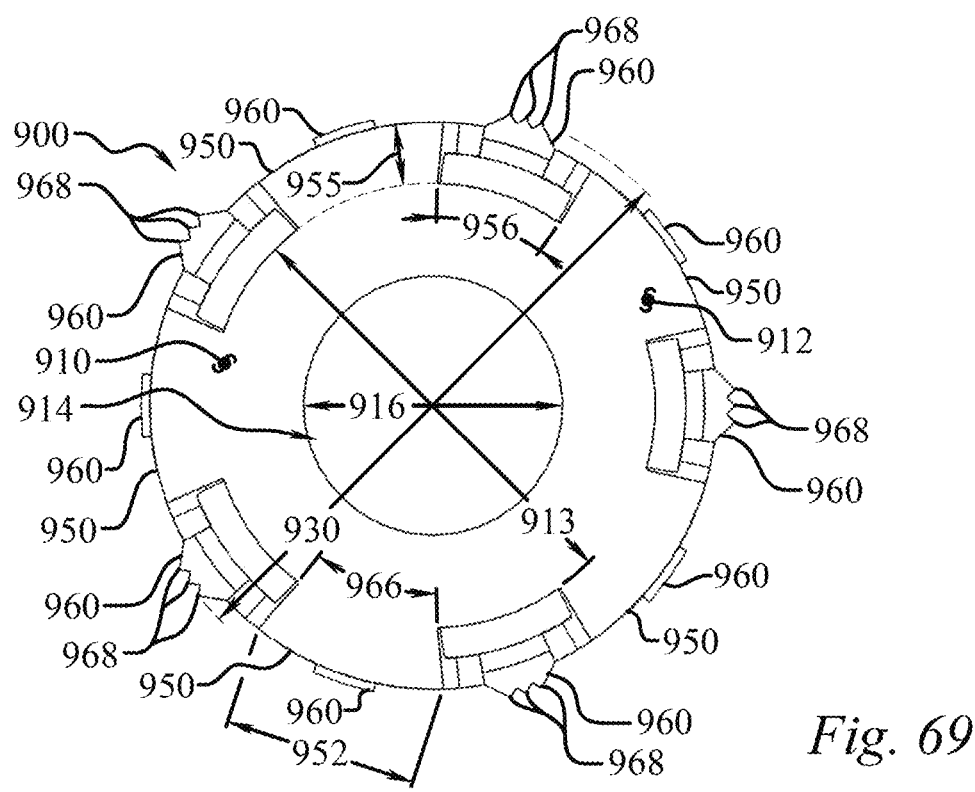
FIG. 69 is a top plan view of an embodiment of a top insert.
Figure 70:
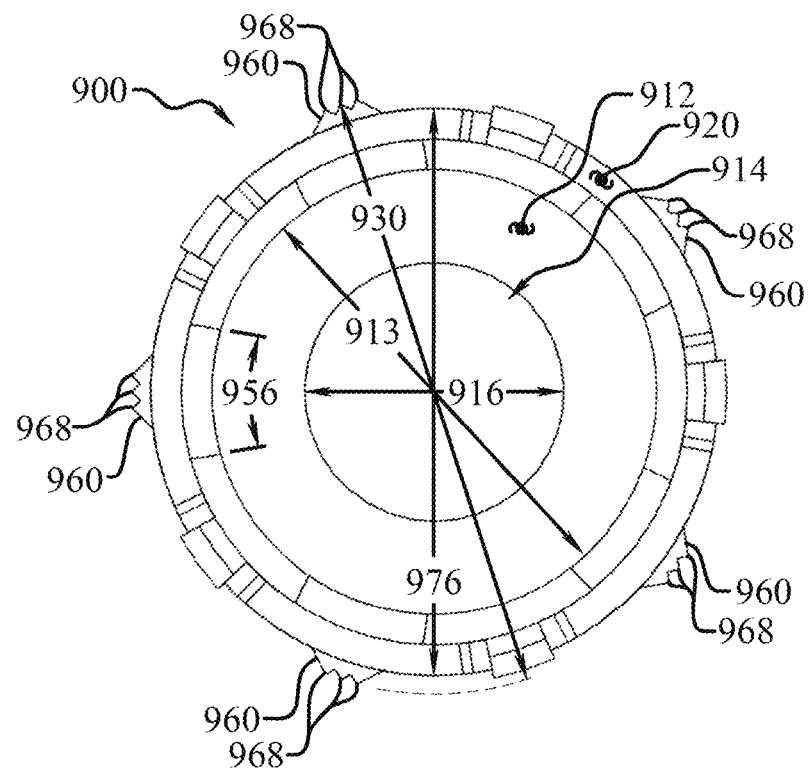
FIG. 70 is a bottom plan view of an embodiment of a top insert.
Figure 71:
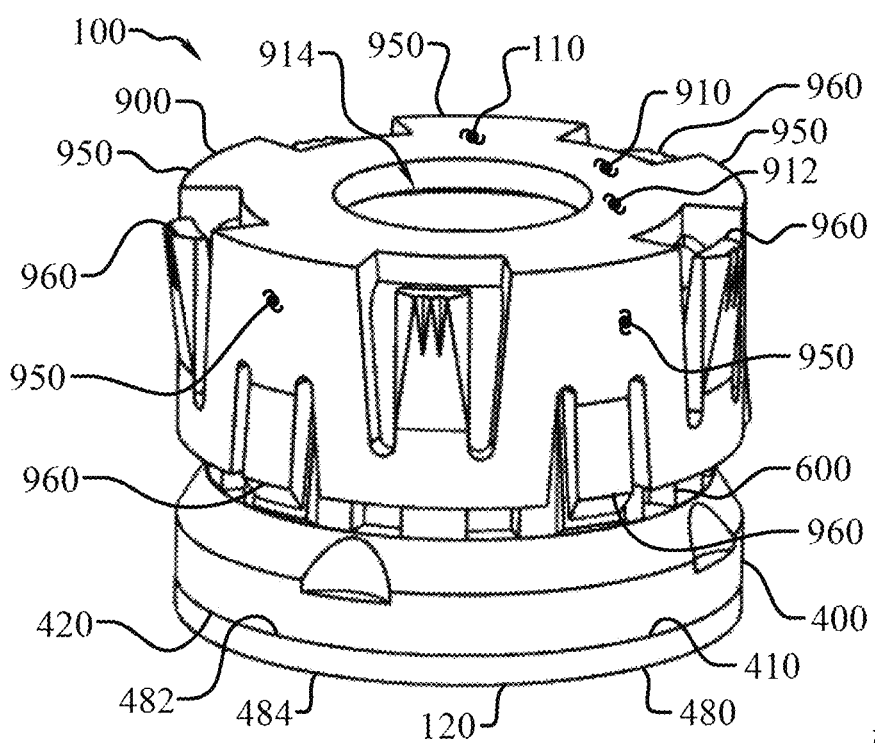
FIG. 71 is an isometric view of an embodiment of a base plate, base plate foundation, spring, and top insert.
Figure 72:
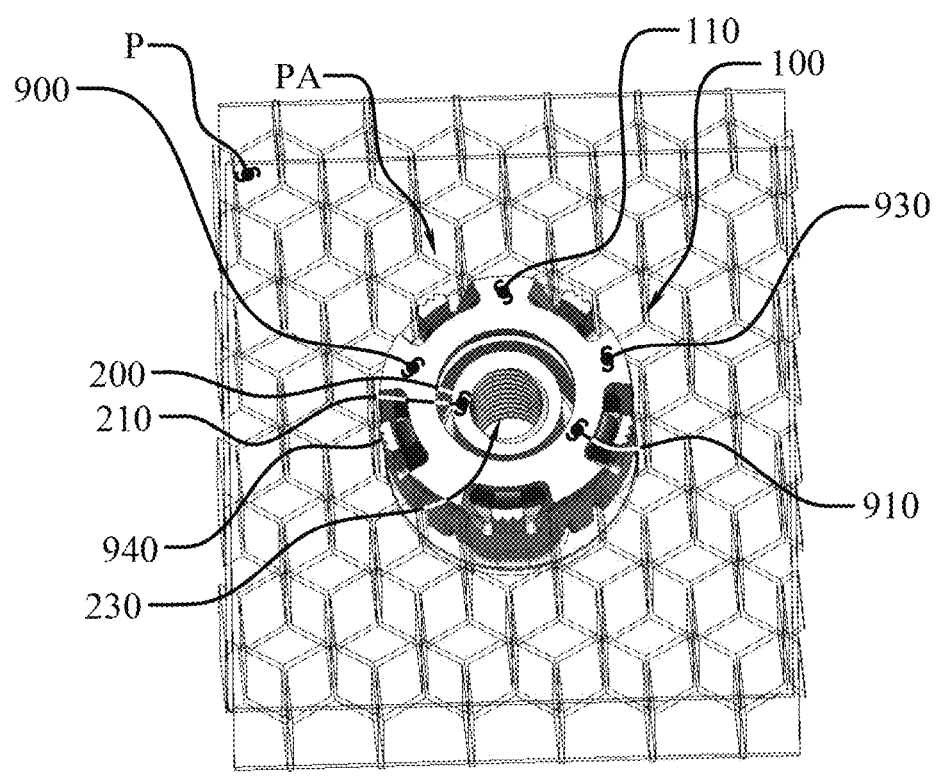
FIG. 72 is an isometric view of an embodiment of a panel fastener installed in a honeycomb panel.
Figure 73:
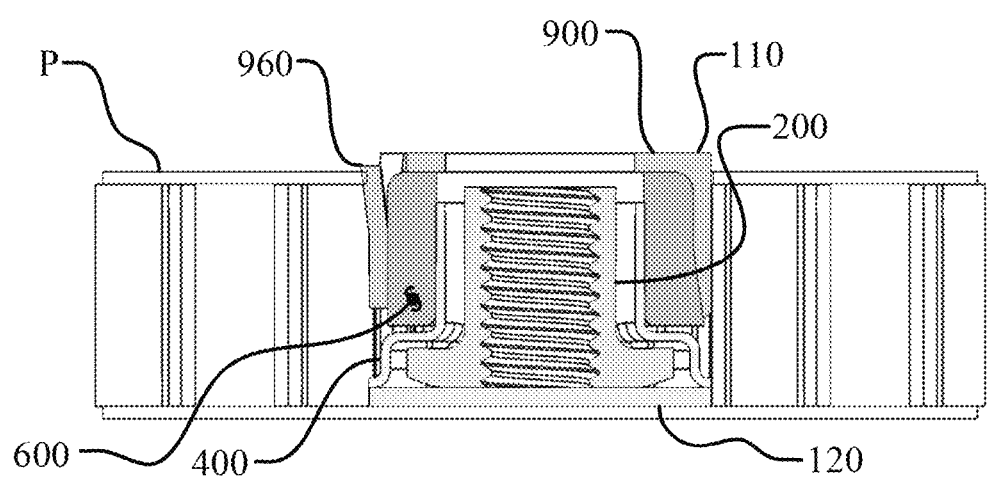
FIG. 73 is a cross-section view of an embodiment of a panel fastener installed in a honeycomb panel.

Sticking with the current subject of insertion of bonding agent, as seen in FIGS. 67-69, the top insert (900) may include openings at the top insert proximal end (910), adjacent to and/or behind the top insert latching projections (960), to easily insert bonding agent permitting flow into the panel aperture as well as between the top insert (900) and the spring (600), and out the spring distal end (620) to the bonding recesses (490). The opening created alongside the edges of the top insert latching projection (960), seen in FIG. 68, and the associated TILP length (964) ensure that the bonding agent may enter the panel within the confines of the panel aperture, but then flow out of the fastener (100) through these voids, as well as the voids associated with the remotely located top insert latching projections (960), and also fill the adjacent voids in the cellular core structure of the panel (P). Locating the openings at the top insert proximal end (910), adjacent to and/or behind the top insert latching projections (960), ensures bonding agent solidifies behind the top insert latching projections (960) so they cannot later deflect inward due to vibration and compromise the integrity of the fastener.

Figure 66:
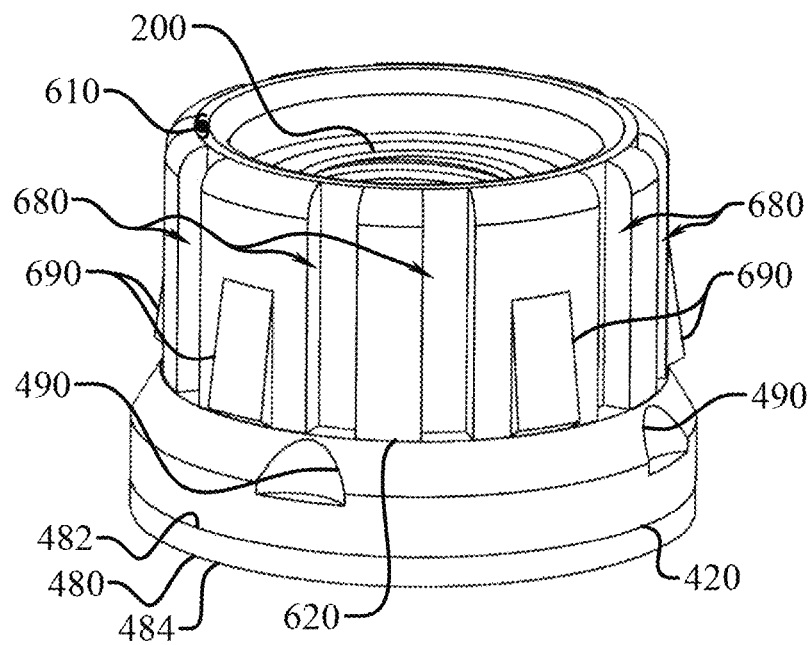
FIG. 66 is an isometric view of an embodiment of a pillar, base plate, base plate foundation and spring.

While the illustrated embodiments, such as seen in FIG. 66, show the bonding recesses (490) as a pocket that does not extend all the way to the base plate distal end (420), in a further embodiment the bonding recess (490) does extend all the way to the base plate distal end (420). In fact, in another embodiment, not illustrated but easily understood, the bonding recess (490) extends along the external surface of the base plate pillar shroud (470), and may extend all the way to the base plate proximal end (410), in other words, the full length of the base plate foundation length (478), while in one embodiment it extends throughout at least 50% of base plate foundation length (478), and in still another embodiment throughout at least 75% of the base plate foundation length (478). Thus, these embodiments with bonding recesses (490) extending along the external surface of the base plate pillar shroud (470) are analogous to the spring slots (680) seen in FIG. 62, and thus all the disclosure related to the size and location of the spring slots (680) applies equally to bonding recesses (490) extending along the external surface of the base plate pillar shroud (470).

Now sticking with the current subject of insertion of bonding agent, as seen in FIGS. 62-66 and 89-93, the spring (600) may further include at least one spring slot (680). The spring slot (680) has a spring slot width (682), a spring slot length (684), and a spring slot depth (686). The spring slot depth (686) is at least 0.25 mm in one embodiment, and at least 0.50 mm, and at least 0.75 mm in further embodiments, thereby ensuring flow of the bonding agent. However, a further series of embodiments caps the range so as to not negatively impacting the performance of the spring (600), and in one such embodiment the spring slot depth (686) is no greater than 5.0 mm, and no greater than 4.0 mm, 3.0 mm, 2.0 mm, and 1.0 mm in still further embodiments. Further, the spring slot width (682) is at least 75% of the spring slot depth (686) in one embodiment, and at least 100% in another embodiment, and at least 125% in still a further embodiment. However, a further series of embodiments caps the range so as to not negatively impacting the performance of the spring (600), and in one such embodiment the spring slot width (682) no more than 300% of the spring slot depth (686), and no more than 250%, 225%, and 200% in further embodiments. Still further, the spring slot length (684) is greater than the spring slot width (682) and/or the spring slot depth (686) in one embodiment, and at least 50% greater than the spring slot width (682) and/or the spring slot depth (686) in another embodiment, and at least 75%, 100%, and 125% greater in further embodiments. However, a further series of embodiments caps the range so as to not negatively impacting the performance of the spring (600), and in one such embodiment the spring slot length (684) is no more than 12 times greater than the spring slot width (682) and/or the spring slot depth (686) in one embodiment, and no more than 10 times, 8 times, and 6 times in further embodiments.

It is worth noting that the pillar bore (230) need not extend entirely through the insert pillar (200) in any of the embodiment, thus it may receive an external fastener from one side or both sides. For instance the base plate foundation (480) illustrated in FIG. 47 does not have an aperture, although in additional embodiments, not shown but easily understood, the base plate foundation (480) has an aperture permitting access to the pillar bore (230). The base plate foundation (480) entraps the pillar (200) within the base plate (400), and it may be attached to the base plate (400) via welding, including, but not limited to, resistance welding, spin welding, friction welding, and solvent welding, or brazing, soldering, and any adhesive technology. The base plate foundation (480) may include an external adhesive layer that is activated, or exposed, prior to the fastener (100) being inserted into the panel (P) so that it bonds against the internal skin of the panel (P) with the other end of the fastener (100) engaging the inside of the other panel skin, and the spring (600) biases the assembly to ensure adequate contact pressure as the adhesive layer cures. The present disclosure includes a method of installing the fastener (100) as described throughout, and one step may be applying an adhesive to the base plate foundation (480) and/or exposing an adhesive that resides on the base plate foundation. Thus, in one embodiment the spring (600) provides a biasing pressure of at least 5 psi, and at least 10 psi, 15 psi, and 20 psi in additional embodiments. Another series of embodiments caps the biasing pressure so it is no greater than 150 psi in one embodiment, and no greater than 130 psi in another embodiment, and no greater than 110 psi in still a further embodiment. This external adhesive layer may also be incorporated on the base plate distal end (420) and/or pillar distal end (220) of the embodiments of FIGS. 1-44. Further, the embodiments of FIG. 45 and later may incorporate a insert pillar (200) that is permanently attached to the base plate (400), with or without the addition of the base plate foundation (480).

Figure 59:
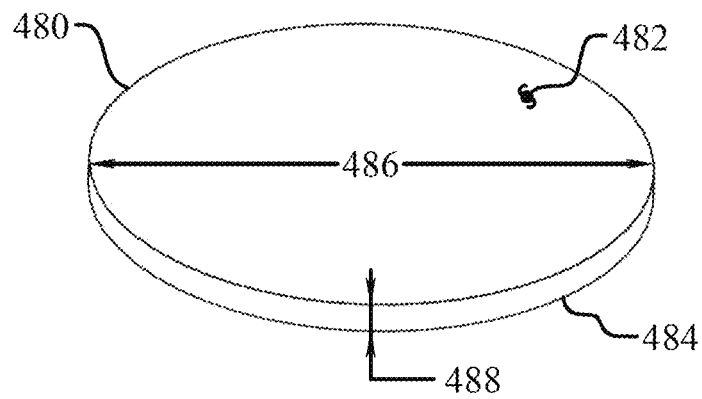
FIG. 59 is an isometric view of an embodiment of a base plate foundation.
Figure 60:
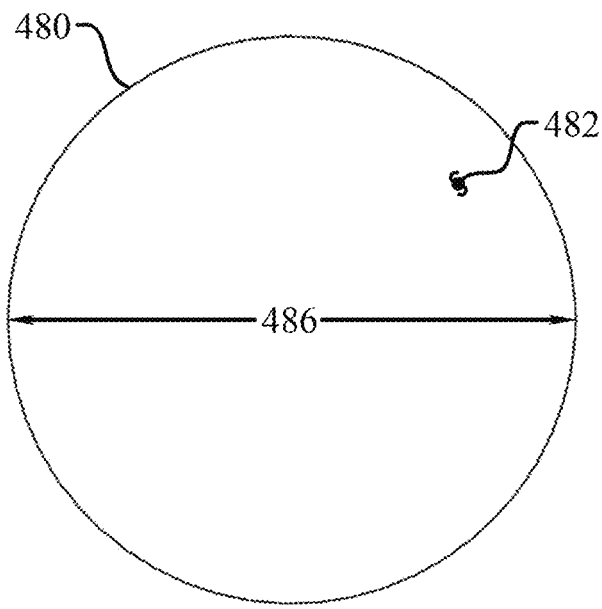
FIG. 60 is a top plan view of an embodiment of a base plate foundation.
Figure 61:
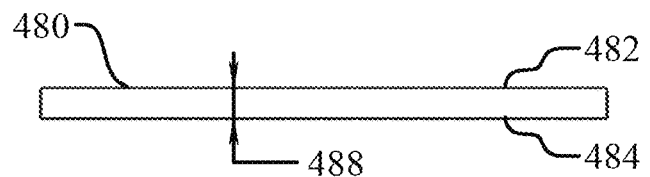
FIG. 61 is a side elevation view of an embodiment of a base plate foundation.

The base plate foundation (480), abbreviated BPF, has a BPF proximal end (482), a BPF distal end (484), a BPF width (486), and a BPF length (488), as seen in FIGS. 59-61. In one embodiment the BPF width (486) is approximately equal to the base plate width (430), and in a further embodiment is at least 2.5% less than the base plate width (430). In another embodiment the BPF length (488) is less than 60% of the base plate length (440) and/or the pillar lobe length (274), and less than 50%, and 40% in further embodiments.

A major difference in the illustrated embodiments of FIGS. 1-44 versus the embodiments beginning with FIG. 45 has to do with the spring (600), seen best in FIGS. 62-66 and FIGS. 89-93. Another major difference in the illustrated embodiments of FIGS. 1-44 versus the embodiments beginning with FIG. 45 has to do with the top insert (900), seen best in FIGS. 67-71 and FIGS. 94-98. While all of the disclosure relating to the embodiments illustrated in FIGS. 39-43 apply to the later embodiments of FIGS. 67-71 and FIGS. 94-98, some additional features in the later embodiments are worth noting, and may also be incorporated in the embodiments of FIGS. 39-43.

It is helpful to first address the top insert (900), and specifically the fact that the embodiments of FIGS. 67-71 and FIGS. 94-98 incorporate top insert latching projections (960) at locations other than at the top insert proximal end (910), as in the illustrated embodiments of FIGS. 39-43. Specifically, the embodiments of FIGS. 67-71 and FIGS. 94-98 also incorporate top insert latching projections (960) at the top insert distal end (920), although they are not limited to the top insert distal end (920) and may be located between the top insert distal end (920) and the top insert proximal end (910). While the top insert latching projections (960) at the top insert proximal end (910) are specifically configured to engage an inner surface of the panel skin upon insertion, the top insert latching projections (960) at the top insert distal end (920), or in between the ends, are configured to engage the cellular core structure of a panel (P) and increase the resistance to turning within the panel (P). Obviously, these top insert latching projections (960) must also be configured to pass through a panel aperture (PA) upon insertion and then must deflect to engage the cellular core structure of the panel (P). As noted later in the disclosure, the disclosed predetermined TILP displacement applies regardless of if the top insert latching projection (960) is located at the top insert proximal end (910), the top insert distal end (920), or somewhere in between. Further, all the disclosed length, width, and relationships associated with the top insert latching projections (960) apply regardless of the location. For convenience any top insert latching projections (960) that are not located adjacent the top insert proximal (910) will be referred to as offset latching projections. In one embodiment the offset latching projections are not inline with the top insert latching projections (960) located adjacent the top insert proximal (910), in other words, as seen in FIG. 69 the offset latching projections are angularly offset from the top insert latching projections (960) located adjacent the top insert proximal (910). In one embodiment the offset latching projections are angularly offset from the top insert latching projections (960) located adjacent the top insert proximal (910) such that they are midway between adjacent top insert latching projections (960) located adjacent the top insert proximal (910); while in a further embodiment they are not necessarily midway but are angularly offset at least 10 degrees, and offset at least 15 degrees in another embodiment, and at least 20 degrees in still a further embodiment. The offset latching projections are deflected outward as the top insert (900) is forced into an installed position, thereby compressing the spring (600) in the direction of the longitudinal axis of the fastener (100), which causes radial expansion of the spring (600) behind the offset latching projections and causing them to deflect outward, as illustrated best in FIGS. 100 and 101. Thus, the spring (600) may be configured to create a friction fit so that the base plate (400), the spring (600), and the top insert (900) remain together during handling prior to installation, or there may be selective attachment with adhesive provided the disclosed movement is achieved.

Figure 62:
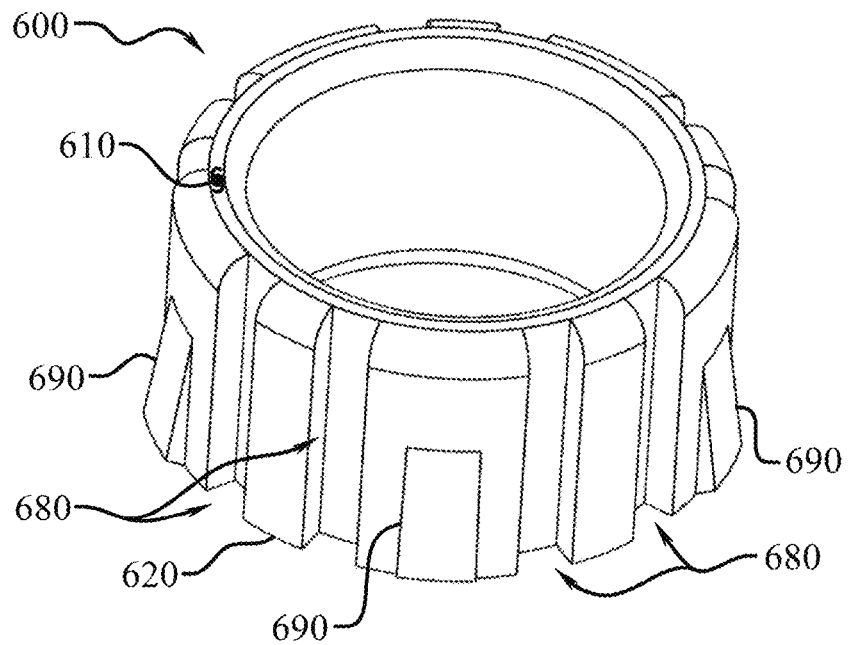
FIG. 62 is an isometric view of an embodiment of a spring.
Figure 63:
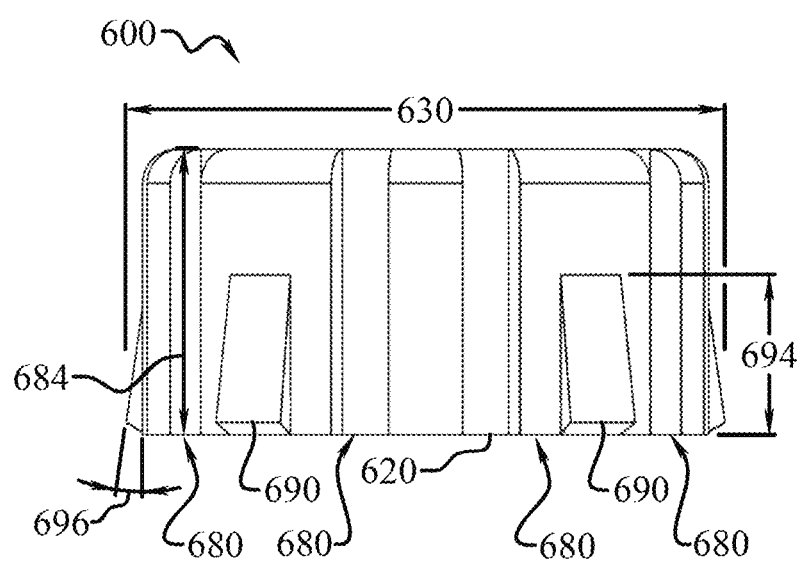
FIG. 63 is a side elevation view of a spring.
Figure 64:
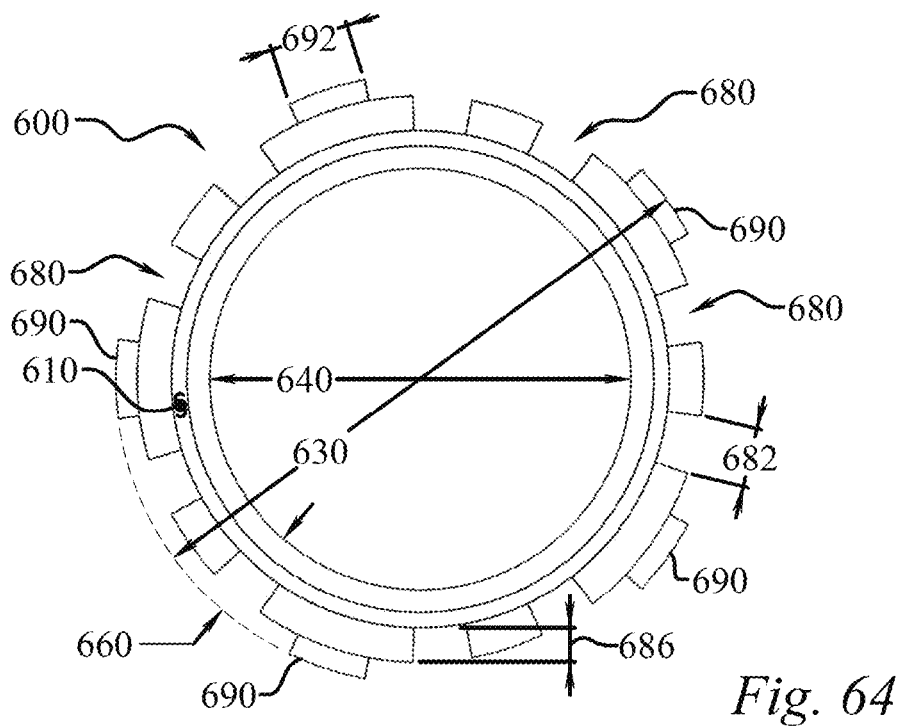
FIG. 64 is a top plan elevation view of a spring.
Figure 65:
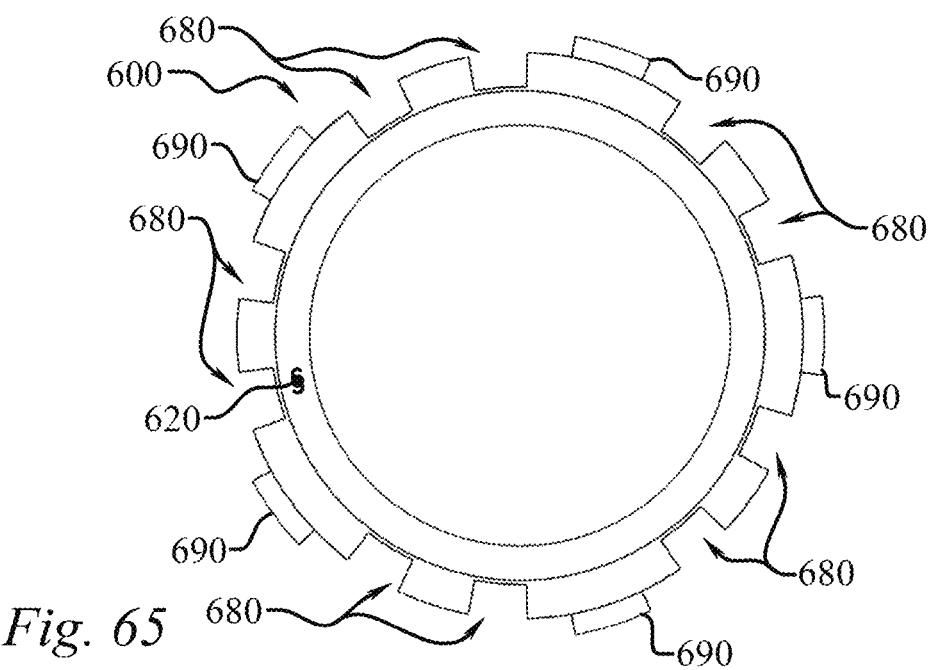
FIG. 65 is a bottom plan elevation view of a spring.
Figure 89:
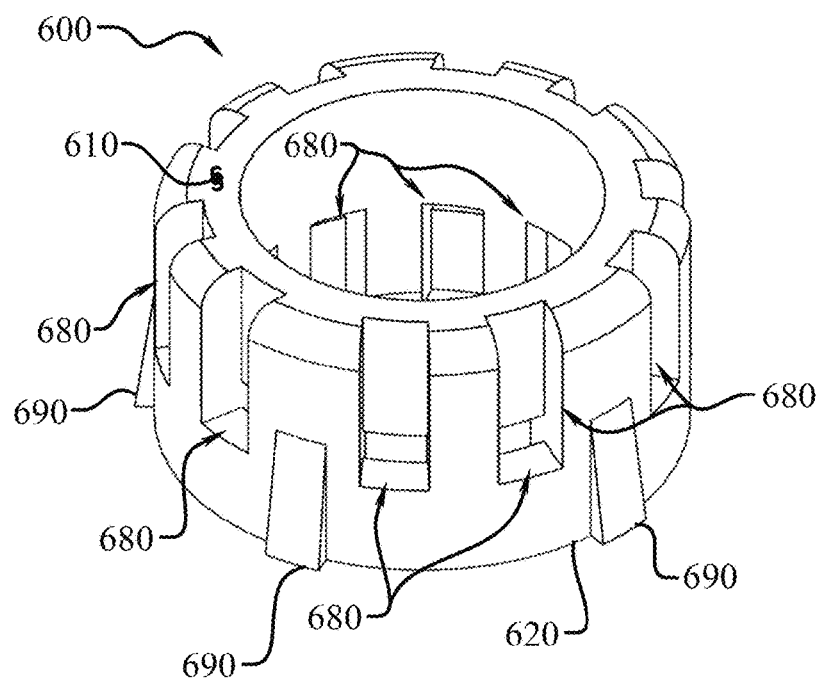
FIG. 89 is an isometric view of an embodiment of a spring.
Figure 90:
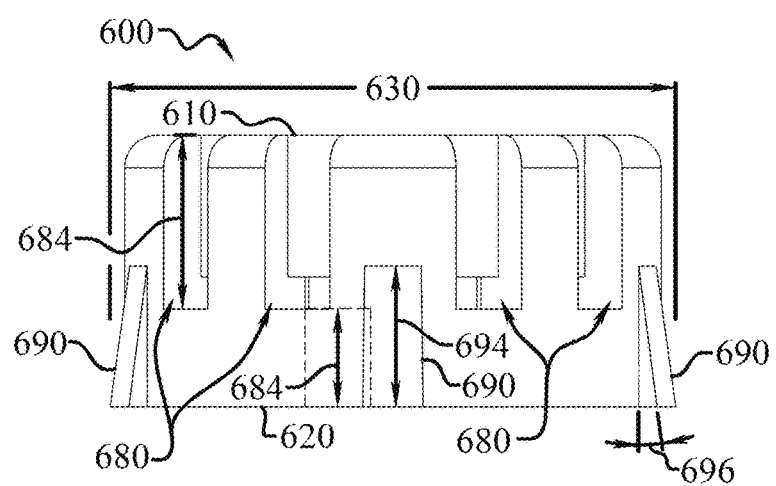
FIG. 90 is a side elevation view of a spring.
Figure 91:
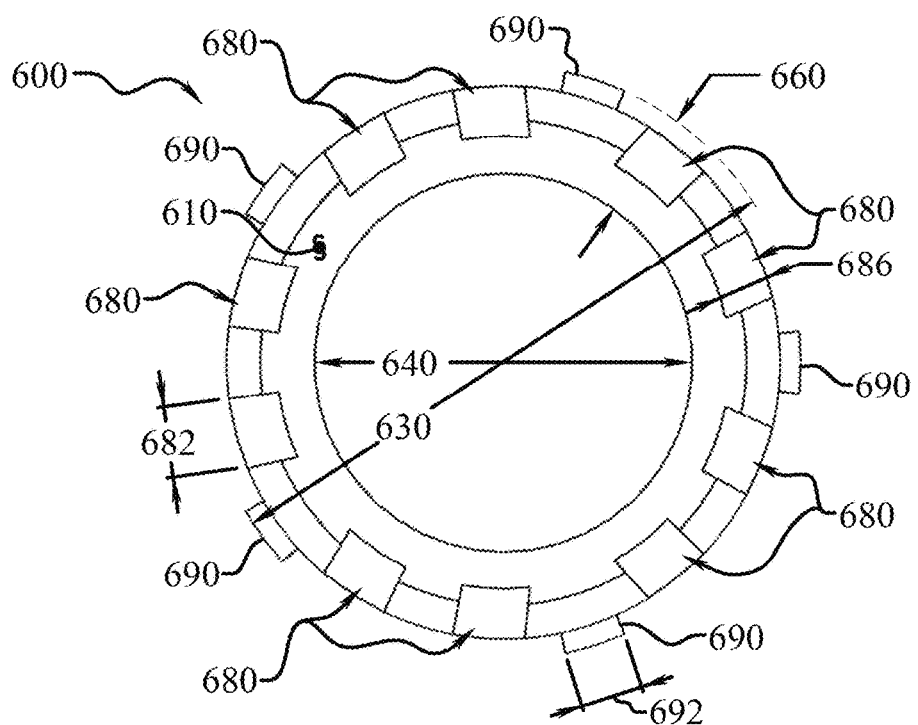
FIG. 91 is a top plan elevation view of a spring.
Figure 92:
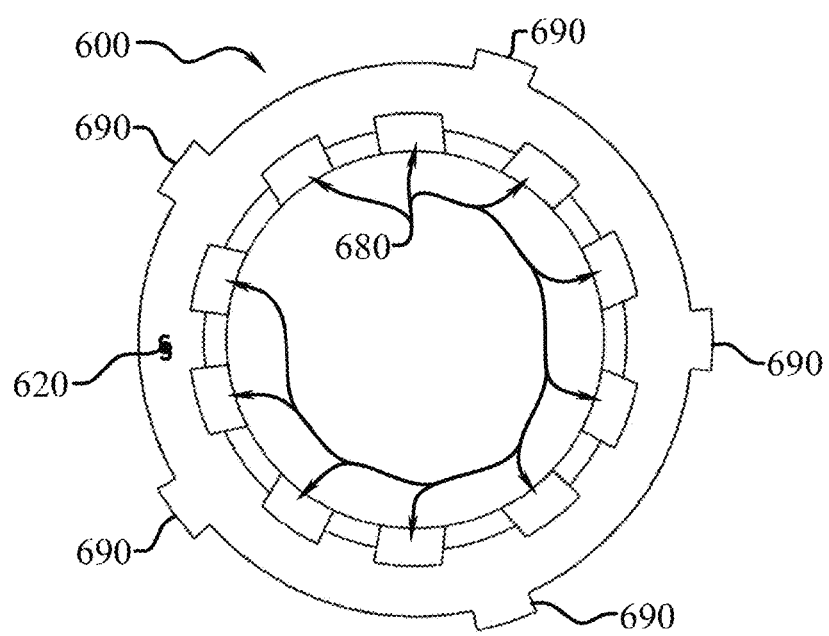
FIG. 92 is a bottom plan elevation view of a spring.
Figure 93:
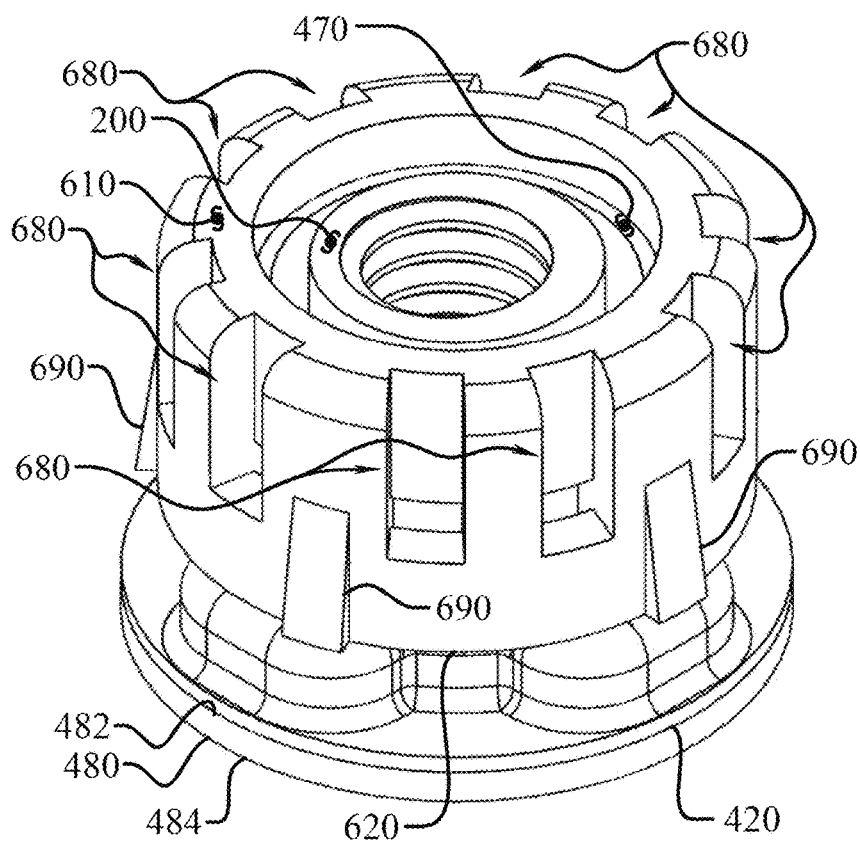
FIG. 93 is an isometric view of an embodiment of a pillar, base plate, base plate foundation and spring.
Figure 94:
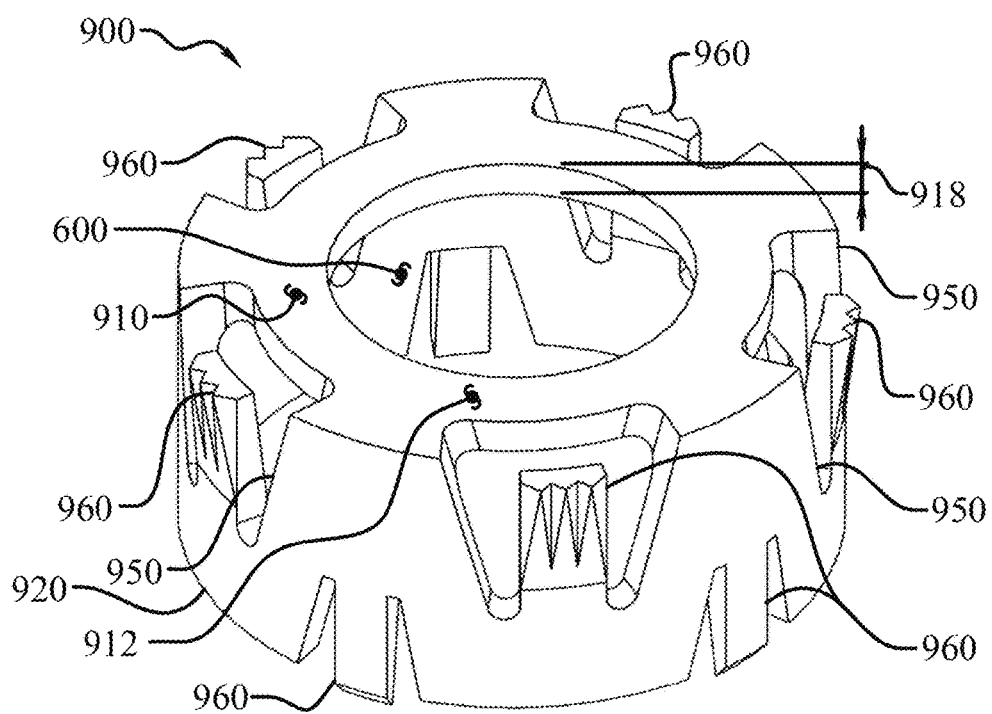
FIG. 94 is an isometric view of an embodiment of a top insert.
Figure 95:
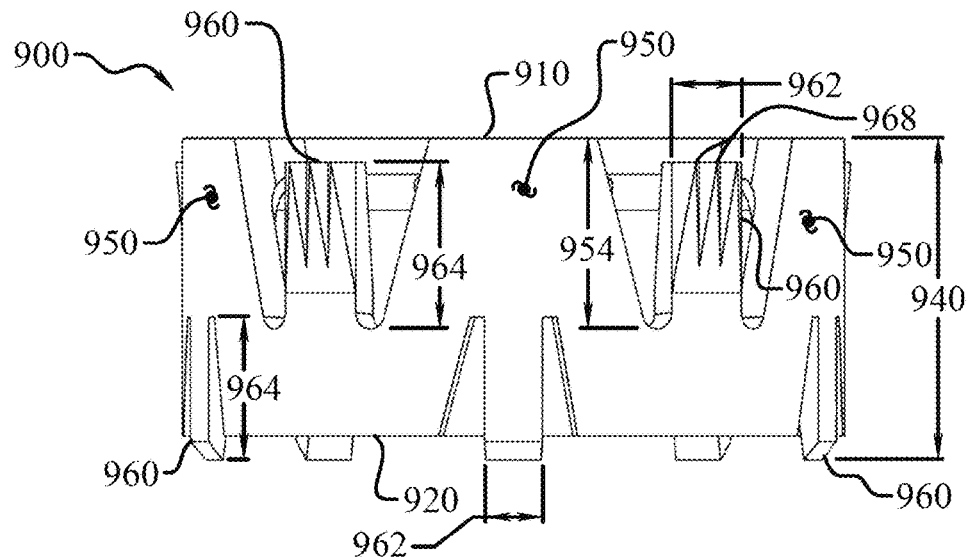
FIG. 95 is a side elevation view of an embodiment of a top insert.
Figure 96:
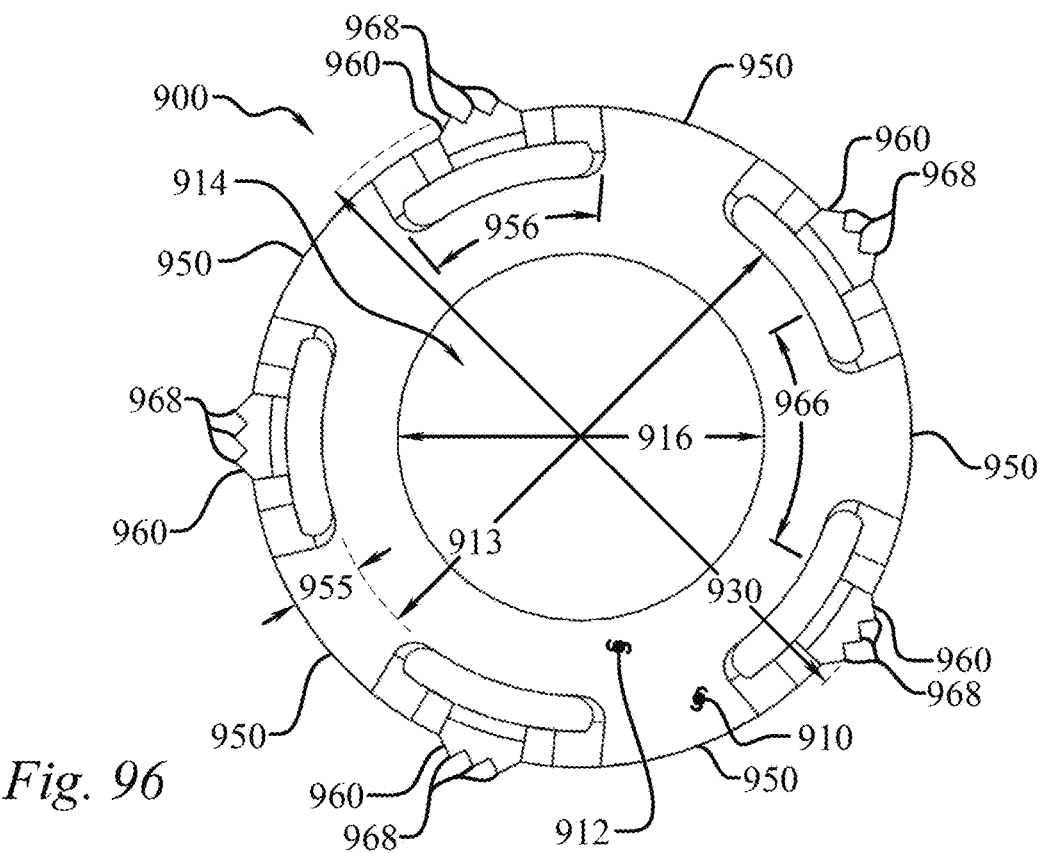
FIG. 96 is a top plan view of an embodiment of a top insert.
Figure 97:
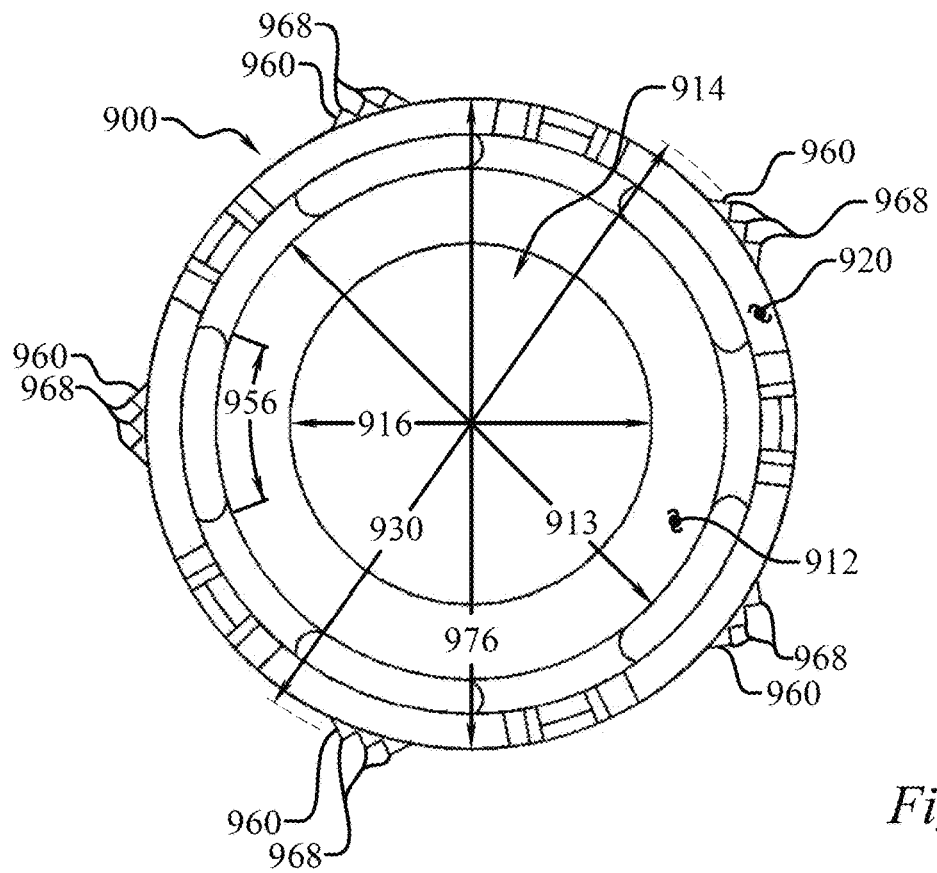
FIG. 97 is a bottom plan view of an embodiment of a top insert.
Figure 98:
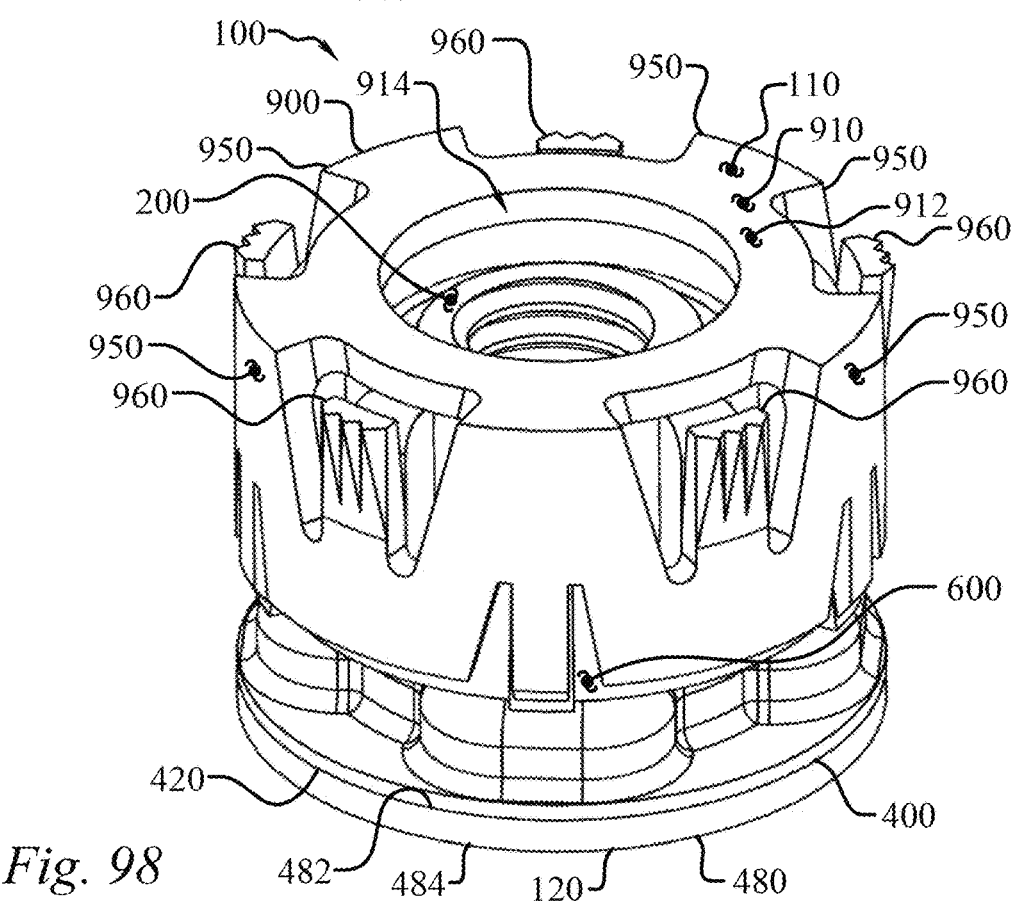
FIG. 98 is an isometric view of an embodiment of a pillar, base plate, base plate foundation, spring, and top insert.
Figure 99:
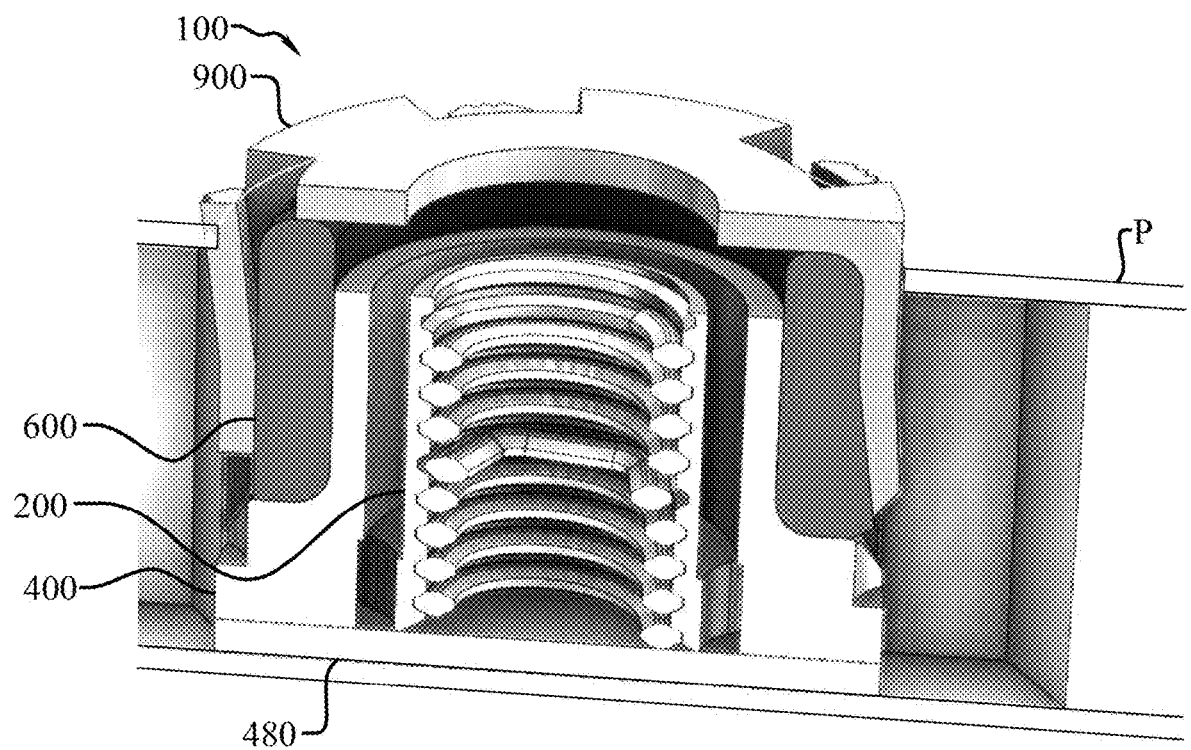
FIG. 99 is an isometric cross-section view of an embodiment of a panel fastener in a pre-installed state within a honeycomb panel, having a helical coil insert.
Figure 100:
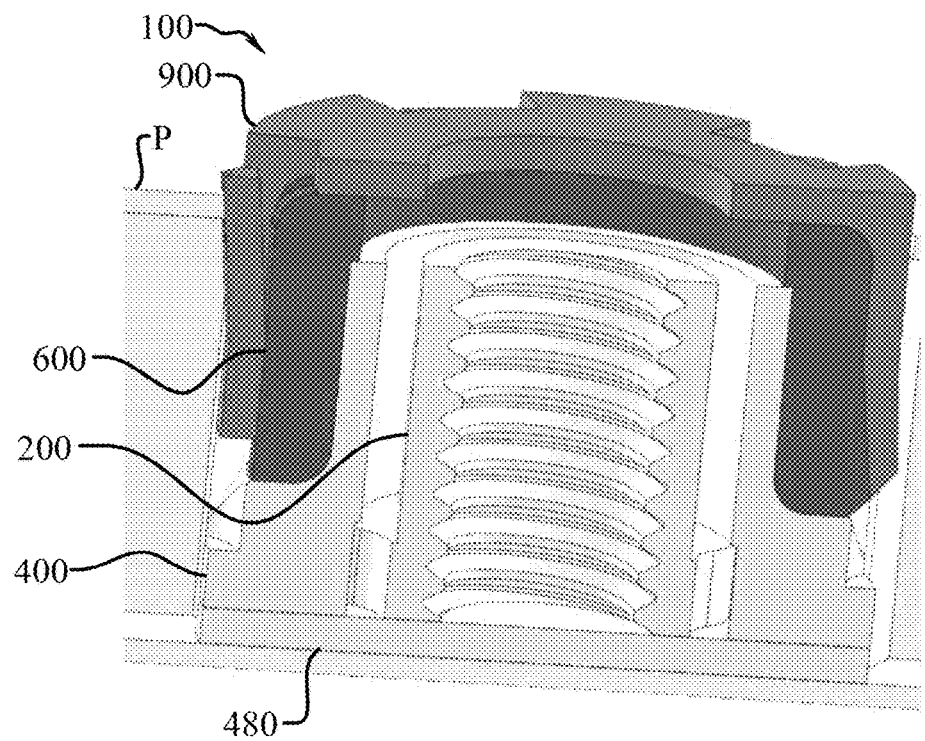
FIG. 100 is another isometric cross-section view of an embodiment of a panel fastener in a pre-installed state within a honeycomb panel.

In the embodiments beginning with FIG. 45, at least a portion of the spring (600) is compressed in the direction of the longitudinal axis of the fastener (100) thereby causing radial expansion of the top insert latching projections (960) located near the top insert distal end (920), best seen in FIGS. 99-101. The spring (600) may further include a TILP activation feature (690), as seen in FIGS. 62 and 89. In one embodiment there is a TILP activation feature (690) for each offset latching projection and is located behind the associated offset latching projection. In the illustrated embodiments the TILP activation feature (690) is configured as a ramp that cooperates with the associated offset latching projection to enhance the radial displacement of the offset latching projection relative to the longitudinal compression of the spring (600). The TILP activation feature (690) has a TILP activation feature width (692), a TILP activation feature length (694), and in some embodiments a TILP activation feature angle (696). The TILP activation feature length (694) is greater than the TILP activation feature width (692) in an embodiment, and the TILP activation feature length (694) is 25%, 50%, 75%, and 100% greater than the TILP activation feature width (692) in further embodiments. However, a further series of embodiments caps the range so as to not negatively impacting the performance of the spring (600), and in one such embodiment the TILP activation feature length (694) is no more than 5 times greater than the TILP activation feature width (692) in an embodiment, and the no more than 4 times more, and 3 times more in further embodiments. In another embodiment the TILP activation feature angle (696) is at least 3 degrees, and at least 6 degrees and 9 degrees in further embodiments. However, a further series of embodiments caps the range so as to not negatively impacting the performance of the spring (600), and in one such embodiment the TILP activation feature angle (696) is no more than 30 degrees, and no more than 25 degrees and 20 degrees in further embodiments. While the spring slots (680) are illustrated on the external surface of the spring (600), they may likewise be formed on the internal surface of the spring (600). In one embodiment the fastener (100) has at least one spring slot (680) for every top insert latching projection (960), in another embodiment there are two spring slots (680) for every top insert latching projection (960), as seen in comparing FIGS. 66 and 67. Even further, at least one spring slot (680) aligns with the void created beside a top insert latching projection (960) and the spring slot length (684) is equal to, or greater than, the TISC length (954), seen in FIG. 69, and/or equal to, or greater than, the TILP length (964). One embodiment includes at least 4 spring slots (680), while further embodiments include at least 6, 8, and 10. Another series of embodiments caps the number of spring slots (680) to ensure functionality while not negatively influencing the performance of the spring (600), therefore in one such embodiment there are no more than 36 spring slots (680), and no more than 28, 20, and 12 in further embodiments. In the embodiments illustrated in FIG. 45 and later, the spring (600) is adjacent the base plate pillar shroud (470), and in the illustrated embodiments encircles the base plate pillar shroud (470) a full 360 degrees, although this is not required and the spring (600) may consists of multiple individual sections arranged around the base plate pillar shroud (470) to achieve the disclosed goals. In these embodiments the spring material width (660), like in FIGS. 1-44, is defined as the spring outer width (630) minus the spring inner width (640) and afterwards dividing the difference by two, but may also be thought of as a maximum spring sidewall thickness, as illustrated in FIGS. 64 and 91. In such embodiments the spring (600) also has a minimum spring sidewall thickness, for instance within the spring slots (680), which in some embodiments is no more than 70% of the maximum spring sidewall thickness, and no more than 60% and 50% in further embodiments. However, another series of embodiments establishes a floor on the range with the minimum spring sidewall thickness being at least 15% of the maximum spring sidewall thickness, and at least 20% and 25% in further embodiments. In some embodiments any of these disclosed sidewall thickness relationships are true for at least 30% of the spring internal surface area, and at least 40% and 50% in further embodiments. Additionally, the spring (600) may include a chamfered surface at the spring proximal end (610), forming a transition to the spring inner bore, but it may also include a curved surface, and in one embodiment a concave surface toward the spring distal end (620). Further, the spring length (650), namely the shortest distance between the spring proximal end (610) and the spring distal end (620), is within 40% of the base plate pillar shroud length (478), and within 30%, 20%, 10%, and 5% in further embodiments. The geometry and relationships disclosed play a key role in achieving the goals disclosed throughout including the deformation of the spring (600), the associated deflection of the top insert latching projections (960), and the movement and force relationships.

As seen best in the sequence of FIGS. 99-101, the fastener (100) is inserted in the panel (P) and the base plate foundation (480) engages the inner skin of the panel (P), often with a layer of adhesive therebetween. At this point in FIG. 99 the spring (600) is largely undeformed in the direction of the longitudinal axis of the fastener (100). Then, as shown in FIG. 100, the top insert (900) is forced toward the fastener distal end (120), thereby compressing the spring (600) in the direction of the longitudinal axis of the fastener (100), and the top insert latching projections (960) located at, or adjacent, the top insert proximal end (910), deflect inwardly to pass through the panel aperture. In the process the spring proximal end (610) deforms inwardly and over a portion of the base plate proximal end (410), and a portion of the spring (600) deforms outwardly thereby radially extending the offset latching projections, namely the top insert latching projections (960) that are not located at, or adjacent, the top insert proximal end (910). Eventually, as seen in FIG. 101, the top insert latching projections (960) located at, or adjacent, the top insert proximal end (910), pass the panel skin and deflect outwardly and engage an inner surface of the panel skin thereby securing the fastener (100) within the panel (P). At this point even more of the spring (600) has been deformed inwardly and over a portion of the base plate proximal end (410) and thereby loading the fastener (100) and ensuring pressure at the interface between the base plate foundation (480) and the panel skin, which ensures any adhesive in the interface cures while under pressure. At this point the offset latching projections have fully deflected outward thereby reducing the risk of rotation of the fastener (100) via engagement with the panel's internal cellular structure. Thus, the longitudinal movement of the top insert (900) has resulted in selective deformation toward the center of the fastener (100) at the spring proximal end (610), as well as deformation away from the center of the fastener (100) at locations near the offset latching projections, generally at or near the spring distal end (620). The internal surface of the top insert (900) may include at least one inward deformation promotion feature to further assist with the inward deformation of the spring proximal end (610) to create the disclosed biasing. Such inward deformation promotion features may be similar to the spring TILP activation feature (690), and may be a wedge, ramp, or protrusion.

In one embodiment the components are configured so that the longitudinal movement of the top insert (900) is no more than 5 mm, and no more than 4 mm, 3 mm, and 2 mm in further embodiments. Another series of embodiments place a floor on the longitudinal movement range such that in one embodiment it is at least 0.5 mm, and at least 1.0 mm, 1.25 mm, 1.5 mm, and 1.75 mm in further embodiments. Further, in one embodiment associated inward deformation of the spring proximal end (610) is at least 0.30 mm, and at least 0.50 mm, 0.70 mm, and 0.90 mm in further embodiments. Additionally, in one embodiment the longitudinal movement of the top insert (900) and disclosed deformation of the spring (600) occurs when subjected to a longitudinal force of no more than 50 lbf, and no more than 40 lbf in another embodiment, and no more than 30 lbf in an even further embodiment. However, another series of embodiments places a floor on the range recognizing the relationship between the longitudinal force and the resulting biasing pressure once installed, thus in one embodiment the longitudinal force required to achieve the disclosed longitudinal movement of the top insert (900) to install the fastener (100) is at least 5 lbf, and at least 10 lbf in another embodiment, and at least 15 lbf in still a further embodiment.

The material properties of the various components of the fastener are essential to the goals. In one embodiment the top insert (900) is formed of a material different than at least one of the other components; while in a further embodiment the top insert (900) is formed of a material different than at least two of the other components, and at least 3 in an even further embodiment. In a further embodiment at least two of the following components are formed of the same material: the insert pillar (200), the base plate (400), and the base plate foundation (470); and in another embodiment at least three of the listed components are formed of the same material, and in another embodiment all three are formed of 7075 aluminum alloy or an iron based superalloy, which in one embodiment is A286 stainless steel alloy. In another embodiment the top insert (900) is formed of a thermoplastic, and in a further embodiment has a density of less than 1.5 g/cc, and in a further embodiment is formed of a thermoplastic polyetherimide (PEI) resin. In a further embodiment the thermoplastic top insert (900) has a hardness of 100-150 on a Rockwell R scale.

In still a further embodiment the spring (600) is formed of an elastomeric material, which in a further embodiment is an elastomeric polymer, and in a still another embodiment is a styrenic block copolymer. The spring (600) has a hardness in the range of 15-45 on a Shore A hardness scale in an embodiment, and 20-40 on a Shore A hardness scale in another embodiment, and 25-35 on a Shore A hardness scale in still a further embodiment.

In still another embodiment at least one of the following components are formed of a nonmetallic material: the clip (300), the support ring (500), the spring (600), the prong ring (700), the retainer latch (800), and the top insert (900); and in another embodiment the nonmetallic material has a density of less than 2 g/cc and one, or more, of the following properties: a ASTM D638 tensile strength of at least 30 Ksi at 160° F., a ASTM D638 tensile modulus of at least 3500 Ksi at 160° F., a ASTM D695 compressive strength of at least 33 Ksi at 160° F., a ASTM D695 compression modulus of at least 1000 Ksi at 160° F., a ASTM D6272 flexural strength of at least 42 Ksi at 160° F., a ASTM D6272 flexural modulus of at least 2800 Ksi at 160° F., a ASTM D5379 shear strength of at least 11 Ksi at 160° F., and a ASTM D5961 bearing strength of at least 36 Ksi at 160° F. In a further embodiment the nonmetallic material has a density of less than 1.80 g/cc, and less than 1.60 g/cc, and less than 1.50 g/cc in additional embodiments. In one embodiment the nonmetallic material is a carbon fiber reinforced plastic material. In one embodiment the strain relationships are achieved by having the primary portion 10000 formed of a polyamide resin, while in a further embodiment the polyamide resin includes fiber reinforcement, and in yet another embodiment the polyamide resin includes at least 35% fiber reinforcement. In one such embodiment the fiber reinforcement includes long-glass fibers having a length of at least 10 millimeters pre-molding and produce a finished primary portion 10000 having fiber lengths of at least 3 millimeters, while another embodiment includes fiber reinforcement having short-glass fibers with a length of at least 0.5-2.0 millimeters pre-molding. Incorporation of the fiber reinforcement increases the tensile strength of the primary portion 10000, however it may also reduce the primary portion elongation to break therefore a careful balance must be struck to maintain sufficient elongation. Therefore, one embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu XW5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

Additionally, the relative length, width, thickness, geometry, and material properties of various components, and their relationships to one another and the other design variables disclosed herein, influence the durability, ease of use, security, and safety of the fastener to achieve the goals.

Now to put the disclosed ranges and relationships into perspective with an embodiment of the fastener directed to aerospace applications where size, weight, and durability are essential, in an embodiment the BBPS width (476) is no more than 20 mm, and no more than 15 mm, and no more than 10 mm in further embodiments. Similarly, in another embodiment the BBPS length (478) is no more than 20 mm, and no more than 15 mm, and no more than 10 mm in further embodiments. Likewise, in another embodiment the base plate length (440) is no more than 10 mm, and no more than 7.5 mm, and no more than 5 mm in further embodiments. In a further embodiment the pillar lobe first radius (276) and the pillar lobe second radius (278) are no more than 10.0 mm, and no more than 8.0 mm, and no more than 7.0 mm in further embodiments. However another series of embodiments caps this range and the pillar lobe first radius (276) and the pillar lobe second radius (278) are at least 0.25 mm, and at least 0.35 mm, and at least 0.40 mm in further embodiments. Likewise, in another embodiment the base plate length (440) is no more than 10 mm, and no more than 7.5 mm, and no more than 5 mm in further embodiments. In a further embodiment the BPPLER first radius (466) and the BPPLER second radius (468) are no more than 10.0 mm, and no more than 8.0 mm, and no more than 7.0 mm in further embodiments. However another series of embodiments caps this range and the BPPLER first radius (466) and the BPPLER second radius (468) are at least 0.25 mm, and at least 0.35 mm, and at least 0.40 mm in further embodiments. In still a further embodiment the base plate bore width (452) is no more than 15.0 mm, and no more than 12.5 mm, and no more than 10.0 mm in further embodiments. In even further embodiments the pillar bore width (234) is no more than 10 mm, and no more than 8 mm, and no more than 6 mm in further embodiments. The spring length (650) is no more than 12 mm in one embodiment, and no more than 10 mm, and no more than 8 mm in further embodiments. Further, in one embodiment the top insert width (930) is no more than 22 mm, and no more than 20 mm, no more than 18, no more than 16, and no more than 14 mm in further embodiments. In one embodiment the spring length (650) is no more than 25.4 mm, and no more than 20 mm, 15 mm, 10 mm, and 8 mm in further embodiments. In another embodiment, the spring maximum sidewall thickness is no more than 4.0 mm, and no more than 3.0 mm, 2.5 mm, and 2.0 mm in further embodiments.

In one embodiment the insert pillar (200), the base plate (400), and/or the base plate foundation (470) are formed of metallic material and the density is no more than 8 g/cc, and no more than 6.8 g/cc in another embodiment, and no more than 4.8 g/cc in a further embodiment, and no more than 2.8 g/cc in still another embodiment. In another embodiment the metallic material has an elongation to break of at least 5%, at least 7%, 9%, 11%, 13%, and 14.5% in additional embodiments. The necessary strain and elongation requirements for durability must be balanced with the need for strength and durability in the connection. Traditional design practices of simply designing the components to be as strong as possible does not provide the needed durability of the blind fastener. In another embodiment the ultimate tensile strength is 754 and 960 MPa, and in another embodiment the melting point is less than 1350 degrees Celsius, while in a further embodiment the coefficient of thermal expansion is no more than 14 ($10^{-6}$/° C.), and the Young's Modulus is no more than 90 GPa in another embodiment, and the Ultimate Tensile Strength is no more than 1600 MPa in yet a further embodiment, and the Yield Strength is less than 150 MPa in still another embodiment. The metallic material may be a superelastic material in one embodiment, which may include a NiTi or Ni—Ti—Cu alloy system, Copper-Zinc-Aluminum (CuZnAl) alloy system, Fe—Mn—Si and Fe—Ni—Co—Ti alloy systems, and Fe—Ni—Al alloy systems. In another embodiment the metallic material is a high strength stainless steel alloy with a minimum tensile strength of 270 Ksi, and in a further embodiment no more than 300 Ksi.

Superelastic behavior of Nitinol is usually characterized through cyclic tensile testing per ASTM F2516. A typical cyclic tensile curve for superelastic Nitinol can be broken into several different segments. During initial loading the austenite phase exhibits typical elastic deformation up until the Upper Plateau Stress (UPS) is reached. Once the UPS has been reached an isostress condition is observed as the cubic austenite structure shears into detwinned stress induced martensite (SIM), followed by the elastic deformation of the detwinned SIM structure. Just as for the thermally induced phase transformation, the formation of SIM is reversible. During unloading elastic strain is recovered and the SIM transforms back into the parent austenite phase. The recovery stress (or Lower Plateau Stress, LPS) is lower than UPS. The hysteresis observed arises from internal friction and defects in the crystal structure. In one embodiment the expansion device (500) exhibits superelasticity up to at least 8% strain before permanent deformation begins. In another embodiment the Upper Plateau Stress (UPS) is at least 600 MPa, while in a further embodiment the Lower Plateau Stress (LPS) is at least 375 MPa, The lower plateau strength/stress (LPS) is the stress measured at 2.5% strain during tensile unloading of the sample, after loading to 6% strain per the method described in ASTM F2516. Superelasticity is defined as nonlinear recoverable deformation behavior of the shape memory alloys that occurs at temperatures above Af but below Md, where the austenite finish temperature (Af) is the temperature at which martensite (or R-phase) to austenite, and martensite deformation temperature (Md) is the highest temperature at which martensite will form from the austenite phase in response to an applied stress. At temperature above Md the shape memory alloy will not exhibit superelasticity it will rather exhibit a typical elastic-plastic behavior when loaded. In one embodiment the temperature in which austenite is complete is between −20° C. to −10° C., and provides a % elongation of at least 10% and an ultimate tensile strength of at least 1250 MPa.

In a still further embodiment the top insert (900) is formed of a nonmetallic material having a density of less than 2 g/cc and an elongation to break of at least 3% in one embodiment, and at least 4%, 5%, 6%, 7%, and 8% in further embodiments. In a further embodiment the nonmetallic material has a density of less than 1.80 g/cc, and less than 1.60 g/cc, and less than 1.40 g/cc, and less than 1.2 g/cc in additional embodiments. In an embodiment the nonmetallic material is a thermoplastic material, and a Polyetherimide (PEI) in a further embodiment, and, in still more embodiments, any of the following materials that meet the claimed mechanical properties: polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems that meet the claimed mechanical properties. In one embodiment the nonmetallic material has one, or more, of the following properties: a tensile strength of at least 20 Ksi, a tensile modulus of at least 1000 Ksi, a flexural strength of at least 30 Ksi, a flexural modulus of at least 900 Ksi, a compressive strength of at least 20 Ksi, a compressive modulus of at least 450 Ksi, a shear strength of at least 13 Ksi, and a Rockwell M scale hardness of at least 105.

In still another embodiment at least one of the following metallic are formed of a metallic material with a density of less than 4.6 g/cc in one embodiment, and less than 3 g/cc in yet another embodiment; and in another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

Some examples of metal alloys that can be used to form the components of the fastener (100) include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304 and 410 stainless steel), PH (precipitation-hardenable) alloys (e.g., 17-4, C450, and C455 alloys, just to name a few), copper alloys, and nickel alloys.

Another embodiment tunes the galvanic compatibility of the components of the blind fastener, along with the previously disclosed balancing of relationships, to provide preferential galvanic compatibility. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

In addition to the desired durability, reliability, and ease of use, the predetermined movement/deflection of certain components, also known as the goals, provided by the present fastener designs are provided by a delicate interplay of relationships of the various components, variables within each component as well as relationships across the components. The disclosed relationships are more than mere optimization, maximization, or minimization of a single characteristic or variable, and are often contrary to conventional design thinking, yet have been found to achieve a unique balance of the trade-offs associated with competing criteria such as durability, stress distribution, vibration and fatigue resistance, weight, and ease of use. It is important to recognize that all the associated disclosure and relationships apply equally to all embodiments and should not be interpreted as being limited to the particular embodiment being discussed when a relationship is mentioned. Further, the aforementioned balances require trade-offs among the competing characteristics recognizing key points of diminishing returns, as often disclosed with respect to open and closed ranges for particular variables and relationships. Proper functioning of each component, and the overall fastener, on each and every engagement can be a matter of life or death. Therefore, this disclosure contains a unique combination of components and relationships that produce reliable, consistent, and uniform deformation or deflection, that is adverse to fatigue and stress concentration failures, so that the fastener properly engages the panel (P) and provides a secure, yet adjustable, interface to secure additional components. While the relationships of the various features and dimensions of a single component play an essential role in achieving the goals, the relationships of features across multiple components are just as critical, if not more critical, to achieving the goals.

With respect to the goal of achieving dependable predetermined movement/deflection of multiple individual components, interrelations of the multiple elements is critical to achieve a predetermined RLP displacement and/or a predetermined TILP displacement, as will now be discussed in detail. As previously disclosed, in an uninstalled state the RLP proximal ends (842) of the retainer latch projections (RLP) (840) extend beyond the retainer latch ring width (836), as seen in FIG. 35. Then, during installation as the fastener (100) is being pressed in the panel aperture (PA), the plurality of retainer latch projections (840) deflect toward the longitudinal axis as they pass through the panel (P) skin. Once the plurality of retainer latch projections (840) clear the panel (P) skin they spring back to their initial state with the RLP proximal ends (842) located beneath the panel (P) skin, thereby locking the fastener within the panel aperture (PA). Each RLP proximal end (842) is designed to achieve a predetermined RLP displacement measured in the plane of the paper in FIG. 35. Thus a maximum distance from the natural position of an undeflected RPL proximal end (842) to the same located 180 degrees on the other side in FIG. 35 is equal to the retainer latch ring width (836) plus twice the predetermined displacement.

Similarly, with respect to the top insert (900), seen in FIGS. 40, 69, 70, 96, and 97, it has a top insert width (930) that changes during installation, and is designed to be larger than the panel aperture (PA). Like the plurality of retainer latch projections (840), the plurality of top insert latching projections (960) flex towards the center of the fastener (100) during installation in the panel aperture (PA), causing the top insert width (930) to decrease. Once the fastener (100) has been pressed into its final position the plurality of top insert latching projections (960) spring outwards once they clear the panel (P) skin surrounding the panel aperture (PA); thereby locking the fastener (100) in place. Further, the plurality of top insert latching projections (960) that are not located at the top insert proximal end (910), such as those shown at the top insert distal end (920) don't need to flex, or deflect, as they pass into the panel aperture (PA), but may, rather they flex, or deflect, after the base plate foundation (480) has contact the opposite panel skin and the top insert (900) is forced toward the base plate foundation (480), thereby causing these top insert latching projections (960) to then deflect outward as the spring (600) is compressed, however they may flex, or deflect, as they pass into the panel aperture (PA) as would be understood by the embodiments illustrated in FIGS. 68 and 95 with their sloped end surfaces which guide them inward as the sloped end surface contact the narrower aperture opening. Nonetheless, the disclosed predetermined TILP displacement applies regardless of if located at the top insert proximal end (910), the top insert distal end (920), or somewhere in between.

Thus, just as each RLP proximal end (842) is designed to achieve a predetermined RLP displacement measured in the plane of the paper in FIG. 35, each top insert latching projections (960) is designed to achieve a predetermined TILP displacement measured in the plane of the paper in FIGS. 40, 69, 70, 96, and 97. Therefore, the top insert width (930) is capable of changing from a maximum undeflected top insert width to a minimum deflected top insert width during installation, where the minimum deflected top insert is equal to the maximum undeflected top insert width minus two times the predetermined TILP displacement. As seen in FIGS. 69, 70, 96, and 97, the top insert latching projections (960) to not need to align 180 degrees apart, yet the maximum undeflected top insert width and the minimum deflected top insert width can be easily measured by one skilled in the art. Having multiple individual elements achieving the predetermined displacements increases the reliability and safety of the fastener (100), thus in one embodiment there are at least two individual deflectable elements, namely retainer latch projections (840) and/or top insert latching projections (960), and at least three in another embodiment, and at least, four, five, six, seven, eight, nine, or ten, or more, in additional embodiments. Another series of embodiments recognizes the diminishing returns and caps the number of individual deflectable elements to no more than 20 in one embodiment, no more than 15 in another embodiment, no more than 10 in still a further embodiment, and no more than 8 in a final embodiment.

In one embodiment the predetermined RLP displacement and/or predetermined TILP displacement is at least 0.25 mm, while in another embodiment they are at least 0.35 mm, and in a further embodiment they are at least 0.45 mm. A further series of embodiments recognizes negative consequences associated with trying to maximize the predetermined displacements and therefore caps the predetermined RLP displacement and/or predetermined TILP displacement to no more than 2.00 mm, and no more than 1.50 mm, 1.25 mm, 1.00 mm, and 0.75 mm in further embodiments.

The present designs may include a helical thread insert, as seen in FIG. 99, as disclosed in U.S. patent application Ser. Nos. 17/395,074, 15/595,620, and 15/906,549, as well as any of the design features and disclosure in U.S. patent application Ser. Nos. 17/379,488, 17/317,314, which are hereby fully incorporated by reference. The helical thread insert may include a locking thread, which is non-circular and differs from the other threads, and in FIG. 99 is illustrated approximately at the midpoint of the pillar bore length (236). However, in a further embodiment the locking thread is located between the midpoint of the pillar bore length (236) and the end of the end of the insert pillar (200) that received an external fastener threaded into the pillar bore (230). In fact in a further embodiment the locking thread is located from one of the ends of the insert pillar (200) a locking thread distance that is no more than 45% of the pillar bore length (236), and no more than 40% in another embodiment, and no more than 35% in still a further embodiment. However, another series of embodiments introduces a floor on this range with the locking thread distance being at least 20% of the pillar bore length (236), and at least 25%, and 30% in further embodiments.

The previously described adhesive on the base plate foundation (480), the base plate distal end (420), and/or pillar distal end (220) is a pressure sensitive adhesive in one embodiment. In a further embodiment the pressure sensitive adhesive is in tape form with an external release layer, while in a further embodiment it is thermally activated and/or UV activated. In one embodiment the pressure sensitive adhesive is thermally activated at a temperature of at least 150° F. for an activation period, and at least 200° F. for the activation period in another embodiment, and at least 250° F., and 275° F. in still further embodiments. In one embodiment the activation period is at least 5 minutes, and at least 7.5 minutes, 10 minutes, 12.5 minutes, and 15 minutes in further embodiments. Additional embodiments cap these ranges. For example in one embodiment the activation temperature is no more than 500° F., and no more than 450° F., and 400° F. in further embodiments. In another embodiment the activation period is no more than 30 minutes, and no more than 25 minutes, and 20 minutes in additional embodiments. The heat may be applied externally to the skin of the panel and/or directly to a component, or components, of the fastener (100) via an induction coil. For instance, in one embodiment, using the embodiment of FIG. 47 for reference, the insert pillar (200), the base plate (400), and the base plate foundation (480), in those embodiments having a base plate foundation (480) are first inserted in the panel aperture, then an induction coil is inserted in the aperture surrounding a portion of the base plate (400) and thereby heats the components to the activation temperature for the activation period. Further, the induction coil tool may engage the end of the base plate (400) and exert a longitudinal force on the components throughout the activation period. The longitudinal force produces an activation pressure on the adhesive that is at least 50 psi in one embodiment, at least 75 psi in another embodiment, and at least 100 psi in still a further embodiment. A further series of embodiments caps the activation pressure to control the spread of adhesive and reduce the potential for damaging the panel, thus in one such embodiment the activation pressure is no more than 250 psi, and no more than 200 psi, and no more than 150 psi in further embodiments. In such induction coil embodiments incorporating an activation pressure, the activation time is no more than 5 minutes in one embodiment, no more than 3 minutes in another embodiment, and no more than 1 minute in still a further embodiment. Then, the insert pillar (200), the base plate (400), and the base plate foundation (480) are allowed to cool to a temperature of less than 150° F. and the spring (600) and top insert (900) are installed, and subsequently potted in place in some embodiments. In one embodiment the pressure sensitive adhesive is a transposable pressure sensitive adhesive that exhibits properties like a removable label at application, but transposes to a high-strength pressure sensitive adhesive in a second stage, when activated by an external stimuli such as the disclosed thermal and UV activations. The activation may trigger a chemical reaction causing the adhesion properties to change after application. Whether the change in adhesion properties was to another PSA type or to structural was dependent on the application. In these embodiments, the transposition chemistry is epoxy polymerization via the activators. However, in some embodiments traditional pressure sensitive adhesives and structural adhesives having only one activation (coating/drying PSAs or mixing two-part structural adhesives) are incorporated.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

We claim:
1. A fastener (100) for attachment to a panel (P), having an inner skin and an outer skin, via a panel aperture (PA) in the outer skin, comprising:
    an insert pillar (200), a base plate (400), a spring (600), and a top insert (900);
    the insert pillar (200) having a pillar proximal end (210), a pillar distal end (220), a pillar bore (230) extending into the insert pillar (200) from the pillar proximal end (210) and defining a longitudinal axis of the fastener (100), and a plurality of pillar lobes (270) located adjacent the pillar distal end (220);
    the base plate (400) having a base plate proximal end (410), a base plate distal end (420), a base plate bore (450) that extends from the base plate proximal end (410) to the base plate distal end (420) and receives at least a portion of the insert pillar (200), a base plate exterior surface, and a plurality of base plate pillar lobe engagement recesses (460) that receive at least a portion of the plurality of pillar lobes (270) and prevent the base plate (400) and insert pillar (200) from rotating relative to one another;
    the spring (600) in contact with a portion of the base plate exterior surface and having a spring proximal end (610), a spring distal end (620), a spring bore extending into the spring (600) from the spring distal end (620) and defining a spring internal surface, and a spring external surface having a plurality of spring slots (680), extending from the spring proximal end (610) toward the spring distal end (620), and a plurality of spring TILP activation features (490), wherein each spring slot (680) has a spring slot width (682), a spring slot length (684), and a spring slot depth (686);
    the top insert (900) having a top insert proximal end (910) with a top insert opening providing access to the pillar bore (230), a top insert distal end (920), a plurality of top insert latching projections (960) adjacent the top insert proximal end (910), a plurality of offset latching projections positioned to cooperate with the plurality of spring TILP activation features (690), and a top insert interior surface in contact with a portion of the spring (600);
    wherein in an uninstalled state the top insert latching projections (960) are deflectable inward from a first radial position toward the longitudinal axis, through a predetermined TILP displacement, to a second radial position, so that the fastener (100) passes through the panel aperture (PA) and the top insert latching projections (960) automatically return to the first position and engage the panel outer skin;
    wherein in the uninstalled state the spring (600) establishes a first stand-off distance between the top insert proximal end (910) and the base plate distal end (420), and in an installed state a portion of the spring (600) is compressed in the direction of the longitudinal axis by application of a longitudinal force against the top insert (900) with a fastener distal end (120) restrained by the panel inner skin, thereby reducing the first stand-off distance to a second stand-off distance between the top insert proximal end (910) and the base plate distal end (420); and
    wherein the longitudinal compression of the spring (600) produces radial expansion of a portion of the spring (600) and the spring TILP activation features (690), causing deflection of at least one of the offset latching projections outward away from the longitudinal axis.

2. The fastener (100) of claim 1, wherein each offset latching projection is angularly offset at least 10 degrees from the adjacent top insert latching projections (960).

3. The fastener (100) of claim 2, wherein at least one spring slot (680) is located between each top insert latching projections (960) and the nearest offset latching projections.

4. The fastener (100) of claim 2, wherein the plurality of top insert latching projections (960) includes 3-20 top insert latching projections (960), and the plurality of pillar lobes (270) includes 3-24 pillar lobes (270).

5. The fastener (100) of claim 1, wherein the spring slot width (682) is at least 75% of the spring slot depth (686), and the spring slot length (684) is greater than the spring slot width (682) and the spring slot depth (686).

6. The fastener (100) of claim 5, wherein the spring slot length (684) is no more than 12 times greater than the spring slot width (682), the spring slot width (682) is no more than 300% of the spring slot depth (686), and a spring sidewall thickness is no more than 4 mm.

7. The fastener (100) of claim 1, wherein the spring (600) is formed of an elastomeric material having a spring hardness of 15-45 on a Shore A hardness scale.

8. The fastener (100) of claim 7, wherein the spring (600) creates a friction fit between a portion of the base plate (400), a portion of the spring (600), and a portion of the top insert (900).

9. The fastener (100) of claim 8, wherein the spring (600) is a unitary piece of material that encircles a portion of the base plate (400).

10. The fastener (100) of claim 9, wherein in the uninstalled state the spring (600) has a spring length measured parallel to the longitudinal axis between the spring proximal end (610) and the spring distal end (620), and the spring length is within 40% of a base plate pillar shroud length (478).

11. The fastener (100) of claim 10, wherein the spring length is no more than 12 mm, and the predetermined TILP displacement is 0.25-2.00 mm.

12. The fastener (100) of claim 7, wherein the top insert (900) is formed of nonmetallic material having a density of less than 2 g/cc.

13. The fastener (100) of claim 12, wherein the top insert (900) has a hardness of 100-150 on a Rockwell R scale.

14. The fastener (100) of claim 12, wherein the insert pillar (200) is formed of metallic material having a density of no more than 8 g/cc.

15. The fastener (100) of claim 7, wherein a difference between the first stand-off distance and the second stand-off distance is 0.5-5.0 mm when the longitudinal force is 5-50 lbf.

16. The fastener (100) of claim 15, wherein in the installed state the spring (600) biases the top insert (900) away from the base plate (400) and produces a biasing pressure on the top insert (900) of at least 5 psi.

17. The fastener (100) of claim 15, wherein a portion of the top insert (900) engages the spring proximal end (610) so that the longitudinal compression of the spring (600) causes the spring proximal end (610) to deflect inward at least 0.3 mm toward the longitudinal axis and cover a portion of the base plate proximal end (410), when the longitudinal force is 5-50 lbf.

18. A fastener (100) for attachment to a panel (P), having an inner skin and an outer skin, via a panel aperture (PA) in the outer skin, comprising:

an insert pillar (200), a base plate (400), a spring (600), and a top insert (900);

the insert pillar (200) having a pillar proximal end (210), a pillar distal end (220), a pillar bore (230) extending into the insert pillar (200) from the pillar proximal end (210) and defining a longitudinal axis of the fastener (100), and a plurality of pillar lobes (270) located adjacent the pillar distal end (220);

the base plate (400) having a base plate proximal end (410), a base plate distal end (420), a base plate bore (450) that extends from the base plate proximal end (410) to the base plate distal end (420) and receives at least a portion of the insert pillar (200), a base plate exterior surface, and a plurality of base plate pillar lobe engagement recesses (460) that receive at least a portion of the plurality of pillar lobes (270) and prevent the base plate (400) and insert pillar (200) from rotating relative to one another;

the spring (600) in contact with a portion of the base plate exterior surface and having a spring proximal end (610), a spring distal end (620), a spring bore extending into the spring (600) from the spring distal end (620) and defining a spring internal surface, and a spring external surface having a plurality of spring slots (680), extending from the spring proximal end (610) toward the spring distal end (620), wherein each spring slot (680) has a spring slot width (682), a spring slot length (684), and a spring slot depth (686), and wherein the spring (600) is formed of an elastomeric material having a spring hardness of 15-45 on a Shore A hardness scale;

the top insert (900) having a top insert proximal end (910) with a top insert opening providing access to the pillar bore (230), a top insert distal end (920), a plurality of top insert latching projections (960) adjacent the top insert proximal end (910), and a top insert interior surface in contact with a portion of the spring (600), wherein the top insert (900) is formed of nonmetallic material having a density of less than 2 g/cc;

wherein in an uninstalled state the top insert latching projections (960) are deflectable inward from a first radial position toward the longitudinal axis, through a predetermined TILP displacement, to a second radial position, so that the fastener (100) passes through the panel aperture (PA) and the top insert latching projections (960) automatically return to the first position and engage the panel outer skin; and wherein in the uninstalled state the spring (600) establishes a first stand-off distance between the top insert proximal end (910) and the base plate distal end (420), and in an installed state a portion of the spring (600) is compressed in the direction of the longitudinal axis by application of a longitudinal force against the top insert (900) with a fastener distal end (120) restrained by the panel inner skin, thereby reducing the first stand-off distance to a second stand-off distance between the top insert proximal end (910) and the base plate distal end (420), and a difference between the first stand-off distance and the second stand-off distance is 0.5-5.0 mm when the longitudinal force is 5-50 lbf; and wherein at least one spring slot (680) is located between each top insert latching projections (960), the plurality of top insert latching projections (960) includes 3-20 top insert latching projections (960), the plurality of pillar lobes (270) includes 3-24 pillar lobes (270), the spring slot width (682) is at least 75% of the spring slot depth (686), and the spring slot length (684) is greater than the spring slot width (682) and the spring slot depth (686).

19. The fastener (100) of claim 18, wherein in the installed state the spring (600) biases the top insert (900) away from the base plate (400) and produces a biasing pressure on the top insert (900) of at least 5 psi.

20. The fastener (100) of claim 18, wherein a portion of the top insert (900) engages the spring proximal end (610) so that the longitudinal compression of the spring (600) causes the spring proximal end (610) to deflect inward at least 0.3 mm toward the longitudinal axis and cover a portion of the base plate proximal end (410), when the longitudinal force is 5-50 lbf.

* * * * *